ary, fire, medical and general emergency), and transmits respective coded signals over the cable, or over a switched telephone network if cable transmission is not successful. To further insure that alarm signals are properly transmitted in the event of a cable outage, the terminal responds to a cable-sent test command from the central station by causing the dialer to dial the central station over the switched telephone network; in this way, the dialer mechanism can be tested periodically to insure that it will be operative if needed.

United States Patent [19]
Barber et al.

[11] 4,361,730
[45] Nov. 30, 1982

[54] SECURITY TERMINAL FOR USE WITH TWO-WAY INTERACTIVE CABLE SYSTEM

[75] Inventors: Tommie L. Barber; Miklos B. Korodi, both of Columbus, Ohio; Steven J. Davis, Manhattan Beach, Calif.; David A. Schuldt, Mountain View, Calif.; Paul E. Christenson, Sunnyvale, Calif.; Andrew C. Towse; Donald S. Jones, both of San Jose, Calif.; David J. Roh, Longview, Tex.

[73] Assignee: Warner Amex Cable Communications Inc., New York, N.Y.

[21] Appl. No.: 182,627

[22] Filed: Aug. 29, 1980

[51] Int. Cl.³ .......................................... H04M 11/04
[52] U.S. Cl. ........................................ 179/5 R; 455/5
[58] Field of Search ................. 179/2 R, 2 A, 2 AM, 179/2 AS, 5 R, 5 P; 358/85, 86; 455/2, 3, 4, 5, 6; 340/502, 504, 505, 506, 531, 870.02, 870.07, 870.16

[56] References Cited
U.S. PATENT DOCUMENTS 4,057,829 11/1977 Moorehead ........................... 358/86
4,119,815 10/1978 Frankfort et al. ............... 179/5 R X Primary Examiner—Joseph A. Popek
Attorney, Agent, or Firm—Gottlieb, Rackman & Reisman

[57] ABSTRACT

A security terminal for use with a two-way interactive cable system. The security terminal develops alarm and supervisory signals, and controls their transmission over the cable when polled by a central station. The terminal discriminates between four different types of alarm condition (burglary, fire, medical and general emergency), and transmits respective coded signals over the cable, or over a switched telephone network if cable transmission is not successful. To further insure that alarm signals are properly transmitted in the event of a cable outage, the terminal responds to a cable-sent test command from the central station by causing the dialer to dial the central station over the switched telephone network; in this way, the dialer mechanism can be tested periodically to insure that it will be operative if needed.

86 Claims, 23 Drawing Figures

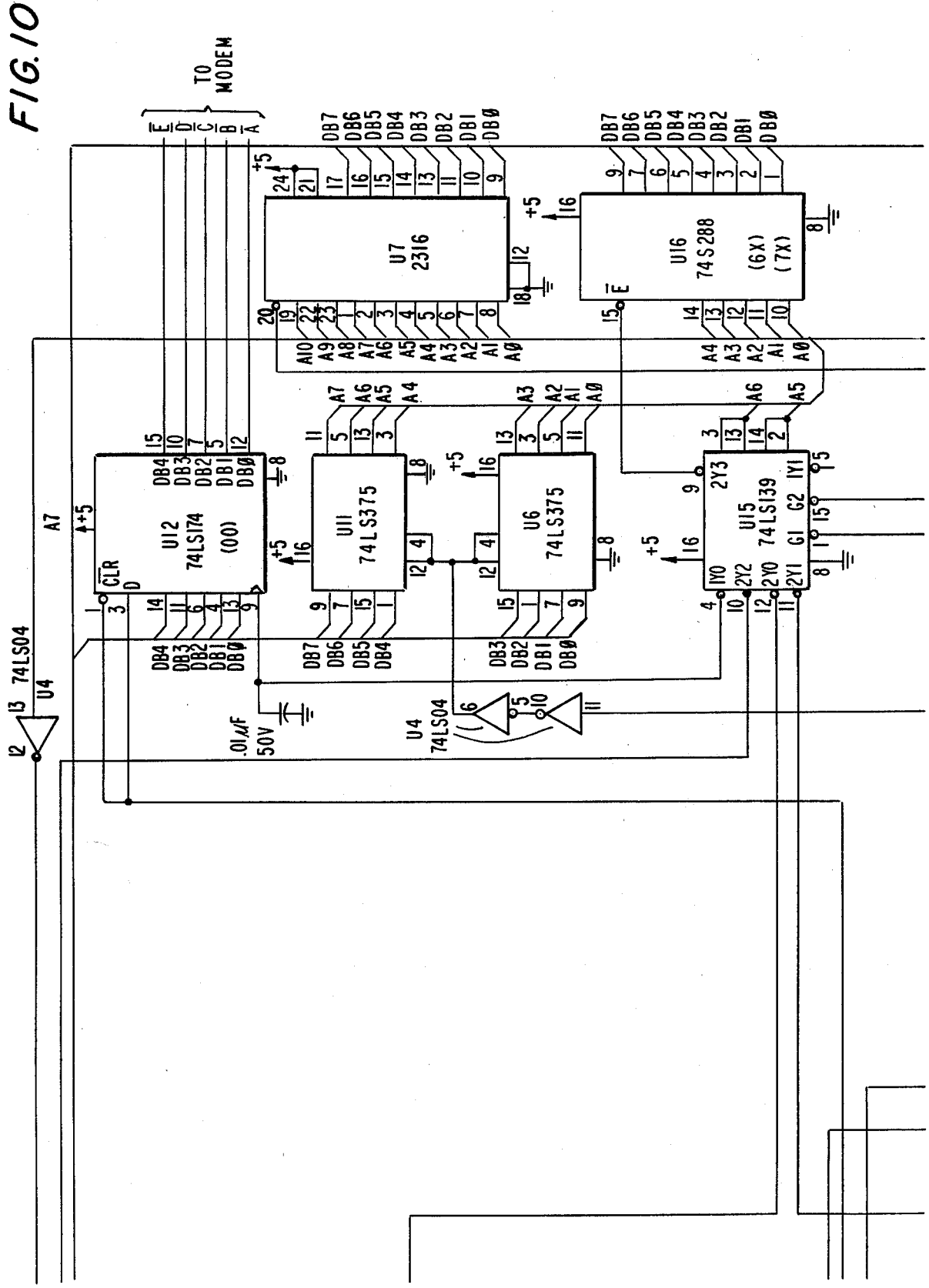

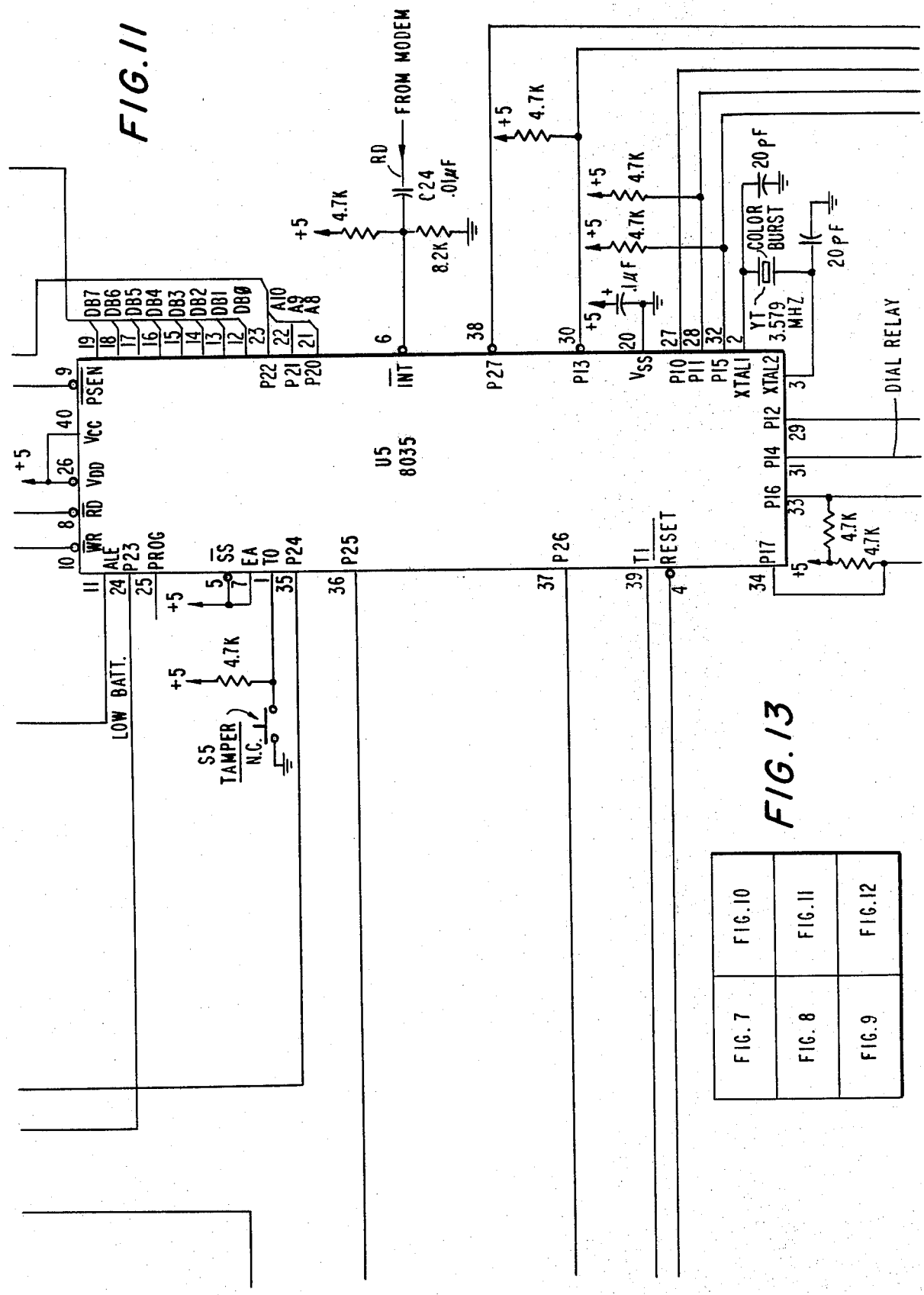

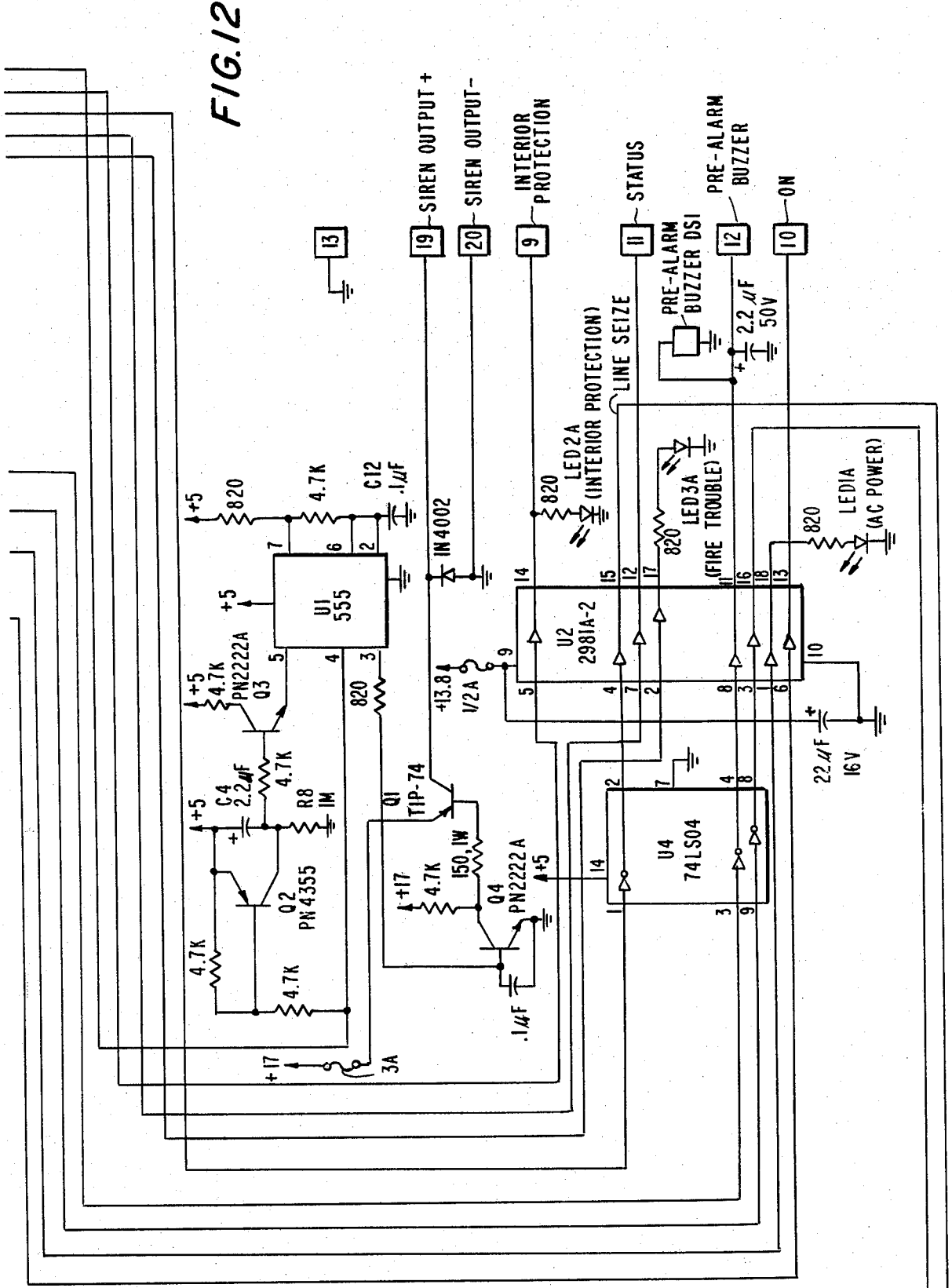

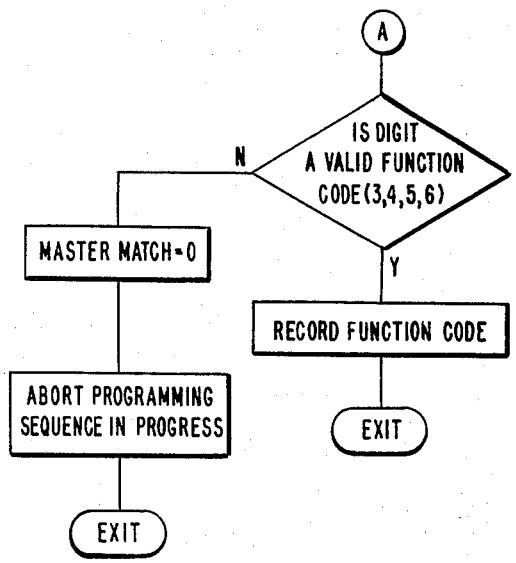
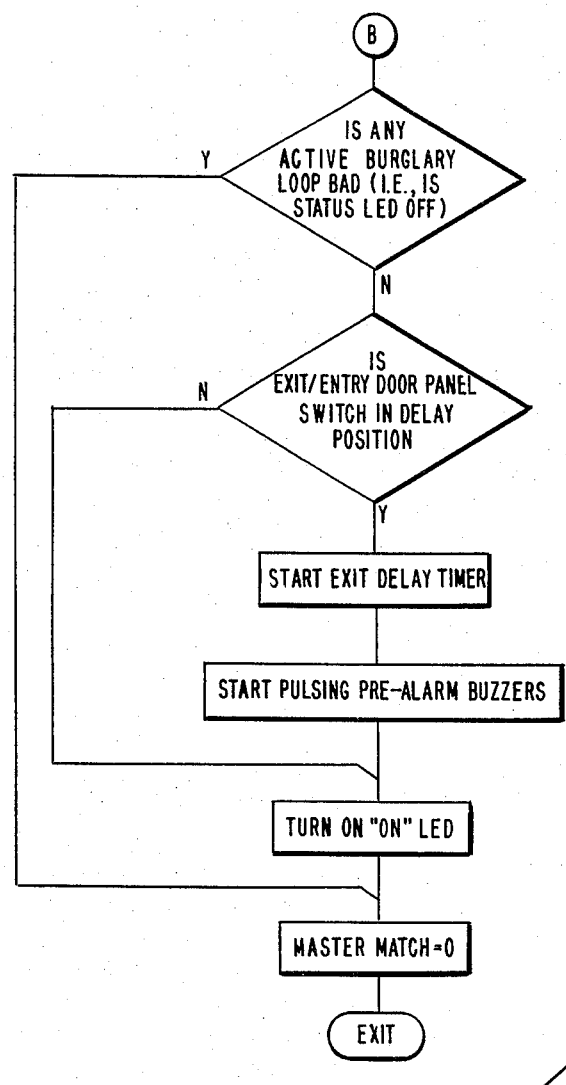
FIG. 16B
FIG. 17
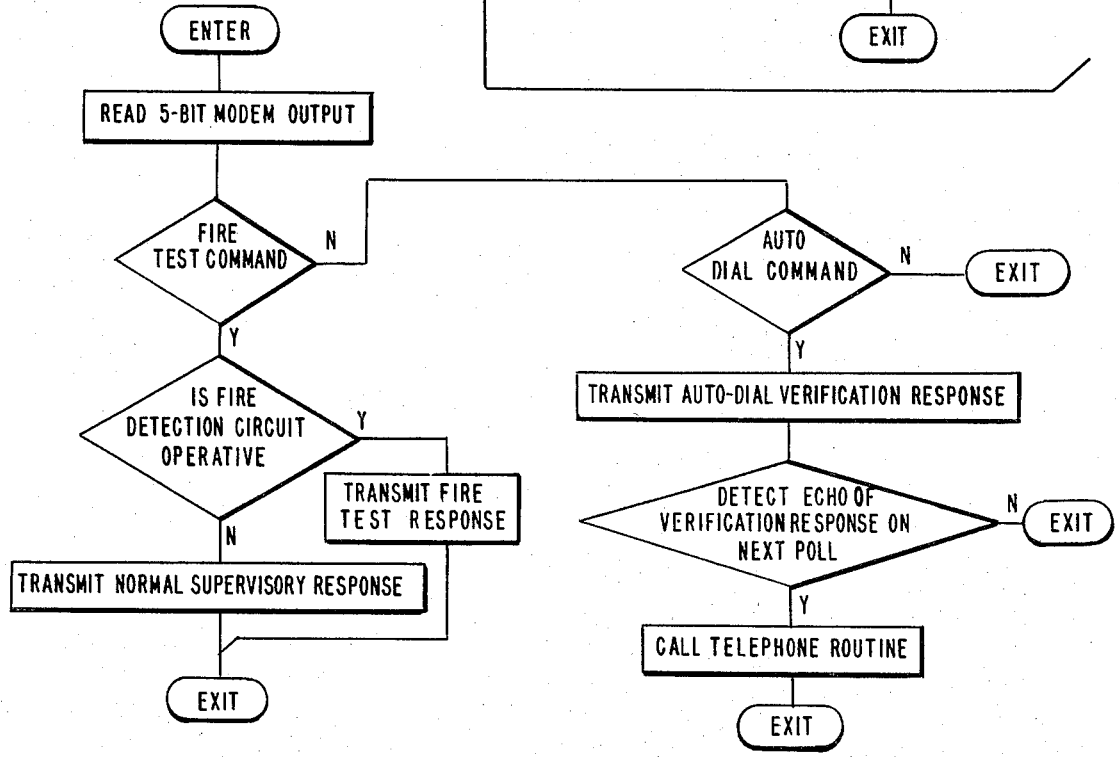

SECURITY TERMINAL FOR USE WITH TWO-WAY INTERACTIVE CABLE SYSTEM

This invention relates to security systems, and more particularly to a security terminal for use with a two-way interactive cable system.

Although many of the early television cable systems were designed for one-way communication, i.e., the transmission of programming signals from a headend over the cable to television receivers on subscriber premises, most present-day systems being built have a two-way capability; even if two-way transmission is not immediately planned, transmission from subscriber terminals to the headend at a later date is at least contemplated. It has been recognized that numerous new services may be provided if messages can be sent from subscriber terminals to a centrally located computer. A central computer at the headend transmits downstream address and control signals along with the conventional programming signals. Upon recognition of its respective address on the cable by a subscriber terminal, the terminal controls upstream transmission of a coded response.

With the ever-increasing crime rate, many homeowners are becoming more and more security conscious. The simplest form of security system detects an intrusion and sounds a siren. More sophisticated systems include dialers for automatically dialing a pre-programmed number and outputting a message; in many cases fire-detection circuitry is also provided, with the dialer controlling calls to different numbers and the outputting of different messages depending upon the alarm condition. The calls are made over the switched telephone network, which in the United States is very reliable.

Although it has been recognized that a two-way cable system could be used for the transmission of alarm codes from subscriber premises to a central station, for the most part such proposals have been rejected. The reason is simple: cable systems are not as reliable as the switched telephone network, temporary or partial cable outages are almost a daily occurrence, and there is no apparent reason to switch from a highly regarded communication facility to one which is less reliable. We have discovered, however, that there are very great advantages to be gained from "marrying" the cable and telephony technologies.

It is a general object of our invention to provide a security terminal whose basic mode of communication is over a two-way cable facility, but which is equipped with a back-up dialer for communicating over the switched telephone network in the event of a cable outage.

While the switched telephone network may be reliable, a conventional dialer itself may not be. For one thing, a conventional dialer is often battery-operated. Batteries die of old age and it is possible that when an alarm condition arises, the battery no longer has any life. Similarly, the fire detection circuit which is typically employed may be prone to fail, with the homeowner having no way of knowing that he is without fire protection. A main advantage of using a cable system for security purposes is that the central station can perform supervisory functions. It can not only request responses indicating the state of the security equipment (e.g., trouble in the fire-detection circuit, a low-battery condition, etc.), but commands sent over the cable can actually result in testing of the dialer by having the dialer seize a telephone line and control a dialing sequence. The advantage of using the dialer back-up, of course, is that a reliable form of communication is made available in the event there is a cable failure. Thus by combining the two technologies a synergistic result is obtained. The cable is used for primary monitoring and for performing supervisory checks on the security equipment (something which cannot readily be accomplished over the switched telephone network), and the telephone network is utilized for transmission of an alarm condition in the event of a cable failure. While the highly reliable transmission facility insures reporting of an alarm, it is the less reliable transmission facility which guarantees that the more reliable one really works.

All of this is achieved in the illustrative embodiment of our invention with little cost duplication. The security terminal is microprocessor-controlled, and the basic cost of the equipment is that associated with the cable transmission circuits. The back-up dialer utilizes the same microprocessor and, in addition to some extra circuit components, requires only two additional relays, one for seizing the telephone line and the other for controlling the outputting of simulated dial pulses. The net result is that at a cost approximately equal to that of a single-mode transmission system, two modes of communication are possible with the cable facility being able to test the dialer capability, and the dialer serving to take over the transmission of an alarm signal in the event of a cable outage.

In the illustrative embodiment of the invention, there are two ways in which the terminal determines that the cable is not operating satisfactorily and that the dialer should be used to transmit alarm signals. The terminal is polled by the central station once every several seconds, and the terminal responds with a transmission over the cable of a supervisory code which informs the central station of the status of the terminal. But when an alarm condition exists, an alarm code is sent over the cable. During a subsequent poll by the central station, instead of simply asking for a response from the terminal, the central station transmits to the terminal over the cable a confirmation signal which acknowledges receipt by the central station of the alarm code sent during a preceding poll. In the illustrative embodiment of the invention, the confirmation signal is an echo of the alarm code sent by the terminal; if the terminal receives back over the cable within 20 seconds the same code which it outputted, it is assured that the central station received the alarm code. (Although the echo in the illustrative embodiment of the invention is an exact duplicate of the alarm code sent by the terminal, in general the confirmation signal need not be an exact duplicate of the previously transmitted code.) If the terminal does not receive an echo of the alarm code within 20 seconds of its having been outputted, then the terminal causes a dial sequence to take place so that the alarm code is transmitted over the switched telephone network to the central station. (The telephone receiver to which the alarm code is thus sent need not be located at the headend, although it is most convenient to provide it there.) Actually, the 20-second interval is not measured from the time of transmission. As will become apparent below, what the terminal does is to load a supervisory or alarm code—independent of central station polling—in a modem which interfaces the terminal to the cable; it is the modem which controls transmission of the code to the central station over the cable when it is polled. But 20 seconds is a sufficient time for an echo to be received, taking into account the delay between loading of the code in the modem and its polling by the central station, as well as return from the central station of an echo signal. In actual practice, when the central station is made aware of an alarm condition, it interrupts normal polling and immediately transmits a confirming echo signal to the terminal at which it originated.

The other way in which the dialer operation can be triggered is if the terminal determines that there is something wrong with the cable, separate and apart from the failure to receive an echo of a transmitted alarm code. If the terminal fails to recognize polls from the central station for 20 seconds, it assumes that the cable is not functioning properly. In such a case, if an alarm condition is detected the terminal immediately causes the dialer to operate without even trying to transmit the alarm code over the cable and waiting for its echo. As soon as the cable is returned to service, however, and so long as the terminal was polled within the last 20 seconds, the terminal first attempts to transmit an alarm code over the cable, and only upon failure to detect its echo is resort made to the switched telephone network.

It should be appreciated that whenever an alarm code is to be transmitted over the switched telephone network, the terminal first seizes a telephone line, checks for dial tone, and then causes dial pulses to generated (the illustrative embodiment of the invention is utilized with a central office which requires dial pulses rather than tone signalling). After a connection is established over the switched telephone network, a sequence of handshaking signals is transmitted back and forth so that the terminal can verify that a connection has been established. The terminal then transmits tone signals which identify the particular terminal as well as the particular alarm condition which has arisen. Up to eight attempts are made to successfully transmit in this way.

Each terminal in the overall system requires four items of data which are unique to it. The first is a master code which will be described below. The second is a terminal address which allows the terminal to recognize a poll directed to it; the terminal address is contained in an "address switch block" included in the modem, since address recognition takes place in the modem. (The terminal simply loads a message in the modem, and it is the modem which causes the message to be transmitted over the cable when the modem recognizes the respective polling address.) The terminal must also be provided with a telephone number which is to be dialed and a terminal identification number so that its identity can be transmitted over the switched telephone network, the third and fourth items of data. Different groups of terminals may be provided with different telephone numbers to dial, and every terminal in each such group must have a unique identification number so that the central station, when it receives a message on a particular line, can identify the particular terminal in the associated group at which the message originated.

While the dialer back-up feature and the ability to test the dialer operation by transmitting an appropriate command over the cable are important to the system operator who bears the responsibility for reliable operation, to the homeowner there are other things which are more important. The homeowner is generally less concerned with data transmission, in which he plays no part, than he is with how the terminal affects his own habits and the local security which it affords. Toward this end, the terminal of our invention has been designed for maximum flexibility, while at the same time allowing operating procedures to be learned rapidly and with a minimum of confusion.

Although the term "security terminal" as used throughout this description might imply a single "box", that is not the case in the illustrative embodiment of the invention. The "security terminal" instead consists of a main control unit and a remote unit connected to it by a multi-wire cable. The control unit is usually mounted in an out-of-the-way place, while the remote unit is mounted near the door through which the homeowner usually leaves when the intrusion-sensing (burglary) system is to be turned on. The remote unit includes a 12-button keypad or keyboard (the two terms are used interchangeably herein) for inputting by the homeowner of a four-digit master code. (The master code is stored in the same PROM which contains the telephone number to be dialed in the event of a cable outage, and the terminal identification number.) Arming and disarming of the system, as well as the change of several different parameter values, are all controlled by the homeowner inputting the master code on the remote unit keypad.

In order to arm the system, the homeowner inputs the master code on the keypad. The various intrusion sensors throughout the house are armed immediately, in that a sensed intrusion immediately results in the transmission of an alarm code and the sounding of a siren. The most important exception is the exit/entry door (usually the door next to which the remote unit is mounted). During an "exit delay" interval, the opening of this door does not result in the triggering of an alarm. The exit delay interval, in the default case (following a power-up condition), is 30 seconds. As long as the homeowner leaves the house and shuts the exit/entry door within 30 seconds of arming the system, no alarm code is generated. The homeowner is warned that the exit delay interval is running by the beeping of a "pre-alarm" buzzer both in the main control unit and the remote unit.

On entry to the house via the exit/entry door, an "entry delay" interval is started; in the default case, the entry delay interval is also 30 seconds. After 30 seconds, an alarm code will be generated and the siren will start blasting, even if the exit/entry door is shut. The homeowner can disarm the system, however, and prevent the generation of an alarm code and the sounding of the siren, if the master code is inputted on the keypad within the entry delay interval. During the entry delay period, the two pre-alarm buzzers sound continuously to warn the homeowner that he had better disarm the system.

The nature of the exit and entry delays should be understood. A "violation" (open door) sensed by the exit/entry door sensor during the exit delay interval never results in an alarm condition being registered—as long as the exit/entry door is shut by the end of the exit delay interval, it is as though it were never opened. A violation during the entry delay interval, on the other hand, is immediately registered as an alarm condition and results in the generation of an alarm code—even if the exit/entry door is subsequently shut within the entry delay interval—unless the master code is inputted. This operation results in a form of "tacking on" of the entry delay to the exit delay when the system is first armed. Once the master code is inputted to arm the system, the exit delay interval begins. If by the time the exit delay interval expires, the exit/entry door is not closed, then an alarm condition is registered. However, the alarm code is not yet sent to the central station, nor does the siren begin to blast. Instead, the entry delay interval begins, and code transmission and alarm sounding are delayed until expiration of the entry delay interval. However, merely shutting the exit/entry door during the entry delay interval will not prevent generation of the alarm code. To do this, it is necessary to input the master code. This sequence prevents many false alarms. What often happens is that a homeowner arms the system and leaves the house, only to realize that he has forgotten something. In going back into the house, the exit delay interval may expire. What the homeowner hears during the exit delay interval is a beeping of the buzzer, but at the start of the entry delay interval it is a continuous buzzing which is heard. This change in sound warns him that to prevent the sounding of an alarm he had better input the master code.

There is only one basic operation required of the homeowner—the inputting of the master code. If the system was armed, inputting of the master code will disarm it; if the system was disarmed, inputting of the master code will arm it. A light on the remote unit labelled "on" informs the homeowner whether the system is armed or not; when the "on" light is illuminated, it is an indication that the system is armed. The remote unit also includes a "status" light which is illuminated only if none of the active intrusion sensors detects an intrusion. If the "status" light is off, the homeowner should not attempt to arm the system because some window, etc. may be open. The system in fact does not arm if the "status" light is off; the homeowner is made aware of this by the absence of the exit-delay beeping and/or the "on" light remaining off.

The remote unit, in addition to including a keypad, a pre-alarm buzzer, and "on" and "status" lights, also is provided with an "interior protection" light. Certain intrusion sensors, designed to protect the interior of the home, at times should not be enabled to operate even if the system is armed. For example, ultrasonic motion detectors, infra-red photoelectric cells, pressure pads under carpet mats, etc. may be provided to detect motion in the house, and these sensors should not be enabled even when the system is armed during the day when people are in the house; it is only at night that these sensors may (not necessarily should) be enabled, or during the day if no one is at home, assuming that there are no pets left in the house. An "interior protection" switch on the main control unit is used to enable the operation of the various interior-protection sensors, and the "interior protection" light on the remote unit informs the homeowner as he leaves the house whether these sensors are on or off.

The main control unit includes four switches, and three lights. The "AC power" light is illuminated whenever the terminal is being powered by the power line. If AC power is interrupted, this light begins to flash on and off; a corresponding supervisory signal is transmitted to the central station to indicate a loss of AC power, and the terminal is now powered by a stand-by battery. If the stand-by battery is ever too low in potential when it is being used to power the system, a supervisory signal is transmitted to the central station over the cable to indicate a "low-battery" condition.

As described above, the main control unit is provided with an "interior protection" switch for turning the interior intrusion sensors on or off. The second light on the main control unit is labelled "interior protection" and its function is the same as the corresponding light on the remote unit.

The second switch on the main control unit is an exit/entry door switch, whose two positions are "delay" and "instant". When the switch is in the delay position, the system operates as described above. But when the switch is in the instant position, all delay functions are disabled, and opening of the exit/entry door is treated just as any other sensed intrusion, resulting in the immediate generation of an alarm code and the sounding of the siren. ("Instant" protection, if used at all, is used at night when opening of the exit/entry door is not anticipated.)

The third main control unit switch is a spring-return "system test" switch. When this switch is operated, AC power is momentarily disconnected so that the battery powers the terminal. The terminal monitors the state of the fire-detection circuit and, if the circuit is functioning along with the battery, the siren will be sounded for two seconds after the system test switch is first operated. During the test sequence, an alarm condition is not transmitted to the central station. This feature allows the homeowner to test the terminal, at recommended intervals of once every month.

The last switch and light on the main control unit are both labelled "fire trouble", and the switch has two positions—normal and silence. Trouble with the fire loop sensor circuit results in the transmission of an appropriate supervisory signal to the central station, and illumination of the fire-trouble light. The main control and remote units beep every fifteen seconds to inform the homeowner he is without fire protection, but the beep can be silenced by moving the fire trouble switch to the silence position. Once this is done, the fire trouble light flashes instead of remaining on continuously. When the trouble is cleared (either through a service call, or sometimes simply by resetting the terminal with the transmission of an appropriate reset command over the cable), the fire trouble light turns off, but the buzzer starts to beep again for indicating that the fire loop is operative again. Moving the fire-trouble switch to the normal position will then silence the buzzer.

It was mentioned that the "on" light on the remote unit is illuminated whenever the system is armed. In the event of an alarm condition, however, the "on" light flashes. There are four types of alarm condition—burglary, fire, emergency and medical. The latter two are controlled by push-buttons and/or keys on the keypad, as will be described below. In the case of burglary, fire or emergency alarm conditions, the siren is blasted so that the homeowner can assume that he will receive attention. But the siren does not sound when a medical alarm is generated. In order that the homeowner be put at ease, the "on" light on the remote unit flashes whenever any one of the four alarm conditions exist. Although the flashing of the light is not really necessary for the three alarm conditions for which the siren sounds, the flashing is important in the event of a medical alarm since it constitutes the only "feedback" to the homeowner that his alarm input has been recognized.

The switches and light indicators on the control and remote units have been designed to communicate a maximum amount of information in the least confusing manner, and to allow simple control of the system by way of the four switches on the main unit and the keypad on the remote unit. But the terminal is also flexible in operation. As described above, following a power-on reset of the system, the exit and entry delays are both set to 30 seconds. Similarly, the siren is sounded, whenever it is triggered, for five minutes in the default case. (The exception is a fire alarm condition; this is such an important case that the alarm sounds non-stop until the terminal is reset by the central station, or the master code, or an alternate code to be described below, is inputted.) The homeowner, however, may desire to change any one of these three intervals. For example, he may wish to allow himself more time to exit the house before an alarm is triggered, or he may wish the siren to sound for more than five minutes. For this reason, the homeowner is allowed to change all three of these intervals, with the exit and entry delays ranging from 1–99 seconds and the siren interval ranging from 1–99 minutes. All three changes are controlled by the homeowner inputting the master code. A change is accomplished by the following sequence:

(1) inputting of a particular key on the keypad (the "left dot" key), as will be described below, in order that the terminal be advised that a change sequence is in progress, (2) inputting of the master code, a requirement which insures that only the homeowner can change one of the three time intervals, (3) inputting one of the digits 4, 5, or 6 (representing, respectively, a command to change the exit delay, the entry delay, or the siren interval), (4) inputting of a two-digit code ranging from 01 through 99 (to represent the new interval), and (5) pressing of the "left dot" key to conclude the sequence and to effect the change.

There is yet one more change which the homeowner can effect which is very important from a practical standpoint. It is often necessary to allow a "stranger" to have control of the system, i.e., to arm and disarm it. A good example is that of a babysitter who may have a need to open the door and therefore a need to disarm the system. But to give out the master code in such a case can certainly lead to a loss of system integrity; over a period of several months, numerous persons will learn of the master code. Should a thief learn of it, following a break-in he could disarm the system during the entry delay interval. For this reason, the terminal is provided with the capability of allowing an "alternate" code to control arming and disarming.

The homeowner first selects a four-digit code which will allow a stranger to arm and disarm the system. To program the terminal to accept this code, the sequence described above for changing one of the three time intervals is followed, except that instead of inputting the function code 4,5 or 6, the function code 3 is inputted, and instead of inputting a two-digit time interval, the four-digit "alternate" code is inputted. Thereafter, the terminal will recognize either the master code or the alternate code for arming and disarming purposes, and for turning off the siren (although only the master code is recognized for controlling any one of the four possible changes). A babysitter, for example, can thus use the alternate code to arm and disarm the system. Upon return by the homeowner, alternate code recognition is disabled by following the same sequence which set it, except that instead of inputting a four-digit alternate code, the master code is inputted. What is really being done here is that the alternate code is being set to the master code; there is still an alternate code capability, but since the alternate code is now being made the same as the master code, for all intents and purposes the system only recognizes the master code.

The most "complicated" procedures required of the homeowner are those which involve a change in one of the three intervals, or the inputting or erasure of an alternate code. But none of these must be done under pressure, and thus there is no problem in having the homeowner consult an instruction sheet to effect a change in the system operation. It is the other function which must be performed on a day-to-day basis or under time pressure, and it is these functions which must be quickly learned and simple to control. The system has been designed with these objectives in mind. It is arming and disarming of the system which must be performed under time pressure, as well as shutting off of the alarm if it has been triggered erroneously, and all of these are controlled simply by the inputting of the four-digit master code—which is really the only thing that the homeowner has to remember. As for the several functions under switch control, the switches are clearly labelled on the master control unit so that their respective functions can be easily understood. With respect to the indicator lights on the main control unit and the remote unit, they are similarly labelled so that their meanings are easy to comprehend.

The terminal includes numerous other features, all of which are designed to simplify homeowner operation, to insure him that the system is functioning properly, or to maximize central station control over the terminal. Some of these other features are the following:

(1) Whenever the homeowner inputs a digit on the remote unit keypad, the buzzers in the remote and main units generate a short beep to provide audible feedback, thus assuring the homeowner that the operated key has been recognized.

(2) In the event of an erroneous key depression while inputting the master code, the homeowner can simply continue by inputting the correct code—only the last four digits are recognized. In the event of a mistake in the sequence for changing a time interval or inputting an alternate code, the homeowner need only wait a few seconds before starting over again; the system times out after a few seconds if a sequence in progress is not properly concluded, and in effect "forgets" the preceding inputs.

(3) If the "interior protection" switch is in the on position when the system is first armed, the interior protection circuits are enabled to trigger alarms. But if the switch is turned off while the system is still armed, an alarm condition is immediately generated and the siren sounds. This insures that in the event a thief was hiding in the house when the homeowner left and armed the system, and the thief then first tries to disable the interior protection in order that he might move about the house, the condition is detected and an alarm is immediately generated.

(4) The system is automatically prevented from arming if the active intrusion sensors are not cleared, e.g., a window is open. If the "status" light on the remote unit is off, indicating that one of the sensors would otherwise detect an intrusion should the system be armed, then the homeowner is not supposed to arm the system. But even if he attempts to do so, the alarm is not sounded because the system does not arm. The homeowner is made aware of the fact that the system has not been armed because he does not hear the buzzer beep, nor does he see the "on" light illuminated, as he starts to leave the house.

(5) Two different siren sounds are generated so that the alarm conditions can be distinguished. The fire alarm sound is a continuous tone, whereas the emergency and burglary siren sounds are "warbled", the frequency of the tone going up and down continuously.

(6) When polled by the central station, the terminal transmits a "normal" code, or a supervisory code which indicates a loss of AC power, a low battery, or trouble with the fire circuit. But the existence of one of the four alarm conditions results in the transmission of an alarm code which has priority over the supervisory code.

(7) The central station transmits diagnostic test codes, for testing the fire circuit and the dialer, and the terminal responses to these diagnostic test commands have the highest priority of all.

(8) Transmission of a reset code by the central station over the cable shuts off the siren if it was sounding, and re-starts the sequencing of the terminal in the event the microprocessor-controlled terminal somehow got hung up.

Further objects, features and advantages of our invention will become apparent upon consideration of the following detailed description in conjunction with the drawing, in which:

FIG. 1 broadly depicts a prior art two-way cable system of the type with which the security terminal of our invention is employed;

FIG. 2 broadly depicts the manner in which the security terminal of our invention is coupled to the prior art two-way cable system of FIG. 1 and the switched telephone network;

FIG. 3 broadly depicts a prior art modem used for transmitting and receiving address and control signals over the prior art two-way cable system, the same type of modem being used to interface the security terminal of our invention to the cable system;

FIGS. 7–12 are a schematic of the main control unit of the illustrative embodiment of our invention, with the control unit being connected to the modem of FIG. 3 and to the switched telephone network as will be described below;

FIG. 13 depicts the arrangement of FIGS. 7–12;

FIGS. 15A–18B are flow charts which for the most part describe the operation of the security terminal of the illustrative embodiment of the invention.

OVERALL SYSTEM CONFIGURATION

Figure 1:
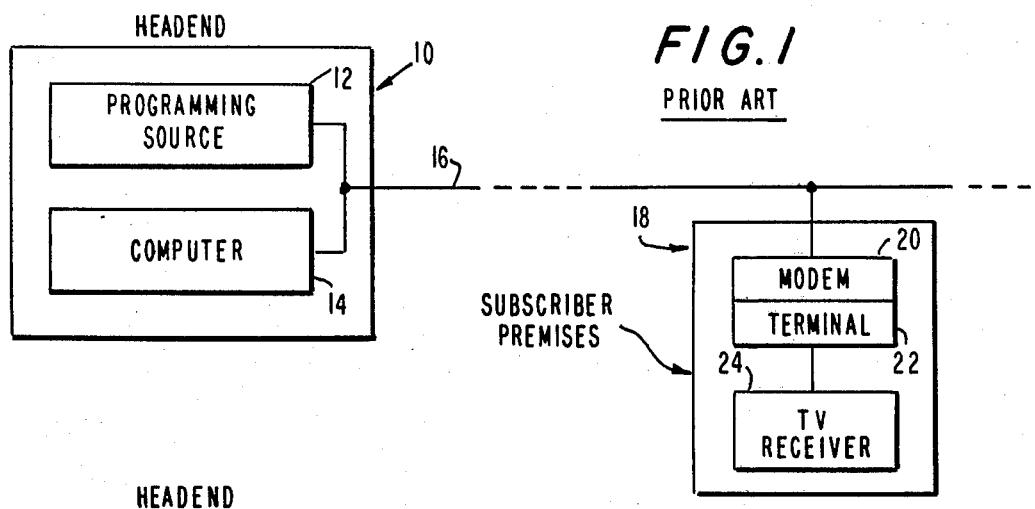

The block diagram of FIG. 1 is intended to depict a prior art two-way cable system, with all detail omitted; the construction and operation of a two-way cable system are not important for an understanding of the present invention, and in any event are well known to those skilled in the art. The system, as shown in FIG. 1, includes a headend 10 which is provided with a programming source 12 (the source of any programming material whether it be from an antenna, a TV studio, etc.) and a computer 14, the computer transmitting address (polling) and control signals to the terminals located on individual subscriber premises. Both the programming source and the computer are connected to the same cable 16 although, as is known in the art, their respective transmissions center on different carrier frequencies. The cable is connected via trunk amplifiers, trunk lines and bridger amplifiers (none of which are shown) to a plurality of terminals on individual subscriber premises 18, one of which is shown in FIG. 1. On each subscriber premises, there is a terminal 22 which connects directly to a TV receiver 24, and via a modem 20 to cable 16. The terminal includes a plurality of pushbuttons for enabling a subscriber to generate responses which are transmitted upstream by modem 20 to computer 14.

Figure 3:
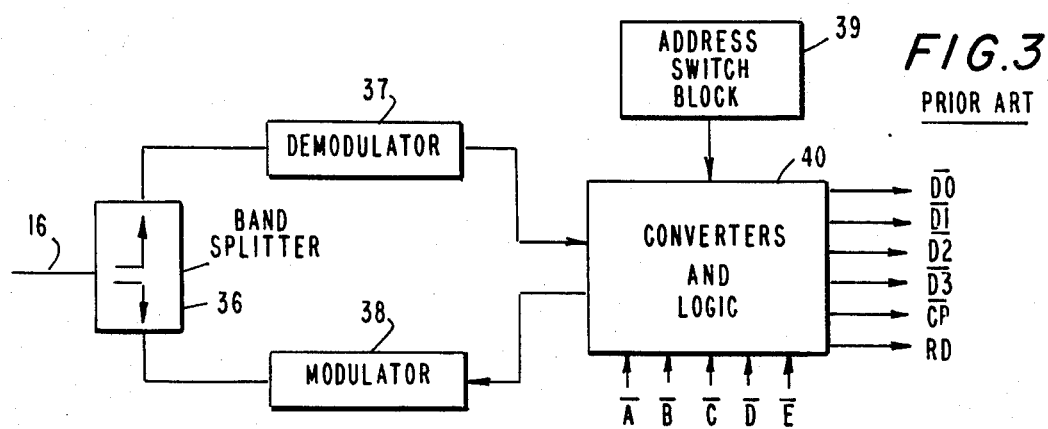

The heart of the modem itself is shown in FIG. 3. Cable 16 is connected to band splitter 36 which serves to separate downstream and upstream signals. Downstream address and control signals centered at one frequency are directed to demodulate 37, while upstream response signals centered at another frequency are transmitted from modulator 38 through band splitter 36 to the cable. Downstream signals are demodulated, and the demodulated address and control codes are applied to an input of the converters and logic block 40. Similarly, responses stored in the converters and logic block 40 are applied to modulator 38 for transmission to the headend.

A typical two-way cable system with which the security terminal of our invention may be employed is the Qube system in Columbus, Ohio, operated by the assignee of this application. The Qube system utilizes modems manufactured by Pioneer Electronic Corporation of Tokyo, Japan, the modem employing an FSK demodulator and a PSK modulator, and an assortment of converter and logic circuits. The detailed circuits, however, are not important for an understanding of the present invention. What is required is to appreciate the two types of inputs and the output from block 40 of FIG. 3.

The first type of input (pre-programmed and fixed) is derived from address switch block 39. This block is simply a programmable switch which sets address bits in the modem, and thus determines the specific address on the cable to which the modem responds. The second type of input is derived from terminal 22 in FIG. 1—five parallel bits $\overline{A}$–$\overline{E}$ which constitute a response which the modem transmits to the headend when it is polled. The message to be transmitted is not inputted to block 40 only in response to a poll. The message is delivered to the modem independently of the polling sequence so that it is available for immediate transmission when the modem recognizes its address on the cable.

A bit of value 1 is represented by a low potential on one of inputs $\overline{A}$–$\overline{E}$, and a bit of value 0 is represented by a high potential. But it is not important to understand the manner in which the five-bit code is transmitted upstream. In the Qube system, for example, the actual code transmitted consists of nine bits, with four of the bits being transmitted in duplicate. Similarly, it is not important to understand how the converter and logic block 40 operates to receive a command signal following an address, or how it delivers a command or poll code to a connected terminal 22 in FIG. 1. All that is important is that when a five-bit code is received, the code appears on conductors $\overline{D0}$–$\overline{D3}$ and $\overline{CP}$ (the modem's output). In addition, the modem applies a positive pulse to conductor RD at the same time, the RD pulse serving as a strobe to the terminal for it to read and operate on the newly received message. From the point of view of the present invention, all that is required is to understand what the input and output codes represent. The modem itself is not important for an understanding of the invention, and any conventional modem may be employed with the security terminal of the illustrative embodiment of our invention, as long as it accepts five input bits from the terminal for transmission to the headend, and delivers five output bits to the terminal together with a read strobe pulse. There are ten data bit connections between modem 20 and terminal 22 in FIG. 1, together with a single read strobe line. The same type of modem which is used in the conventional two-way cable system of FIG. 1 is used to interface the security terminal of our invention to the cable, and in the same way. As far as the modem is concerned, the security terminal is just another terminal 22 in FIG. 1, with its own unique address.

Figure 2:
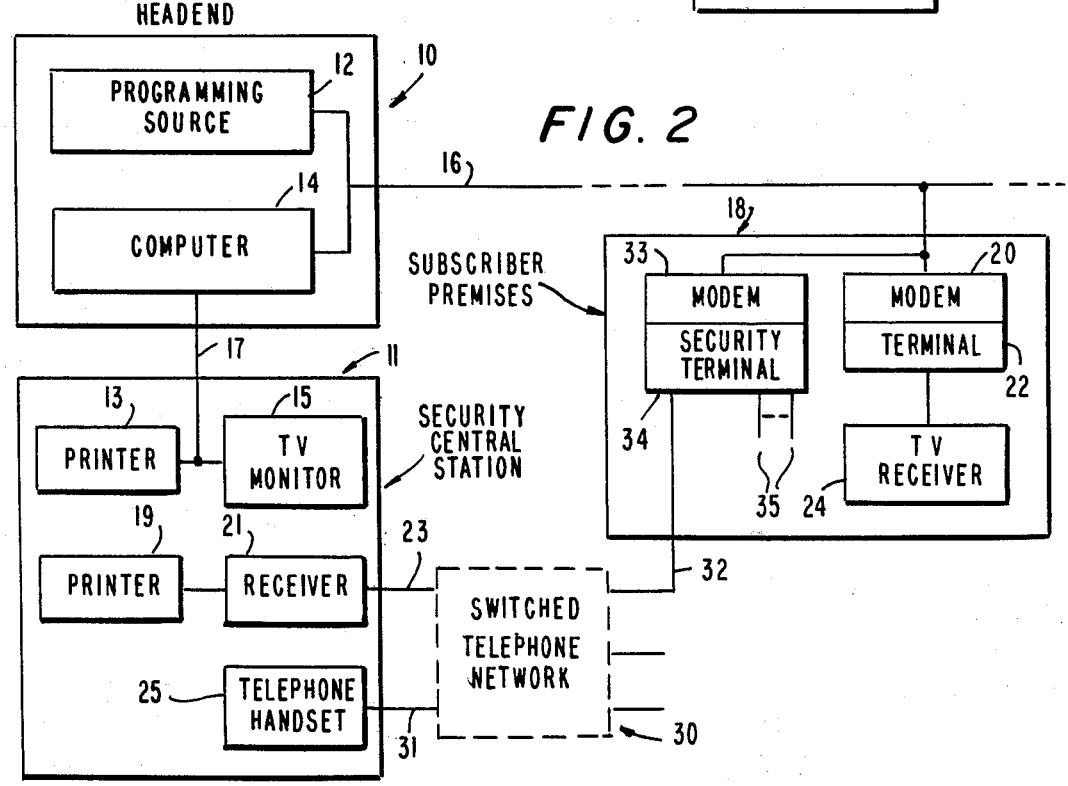

FIG. 2 depicts the manner in which the security terminal of our invention is employed, together with a security central station 11 and a switched telephone network 30 (the latter being shown only symbolically by the dashed lines). The same computer 14 which is used to poll the subscriber television terminals is used to poll the subscriber security terminals. Modem 33 and security terminal 34 are shown in FIG. 2 as being located on the subscriber premises. Modem 33 is connected in parallel with modem 20 to the cable; the two modems respond to different addresses because they are provided with differently addressed switch blocks 39. Security terminal 34 interfaces to modem 33, just as terminal 22 interfaces to modem 20, via ten data bit lines and the read strobe line. Security terminal 34 is also shown as having additional output lines 35, these being the lines which are extended to the various sensors in the home to be protected. Line 32 represents a two-conductor connection to the switched telephone network, the details of which will be described below in connection with FIGS. 7-12.

The security central station 11 is connected via cable 17 to computer 14. As the computer polls the various security terminals and receives responses, responses which should be flagged either appear on TV monitor 15 or are outputted by printer 13. Similarly, should any back-up dialer in a group associated with telephone line 23 dial the central station, a connection is established to receiver 21. The message received through the switched telephone network is outputted on printer 19. FIG. 2 also shows a conventional handset 25 connected over line 31 to the switched telephone network, an operator at the central station thus being able to dial the appropriate police, fire or medical authorities in the event an alarm code is received from a security terminal either over the cable or through the switched telephone network.

The construction of the security central station and the manner in which it operates are not important to an understanding of the present invention. Our invention is a security terminal which may be utilized with any suitably configured modem, any conventional two-way cable system, and any appropriately designed headend and security central station. Nor, for that matter, is the operation of the switched telephone network important for an understanding of the present invention. The illustrative embodiment of the invention can be completely understood simply by bearing in mind that the following interface conditions apply:

1. The modem is assigned an address which it can recognize on the cable. When that address appears on the cable, followed by a data code, modem output lines $\overline{D0}$-$\overline{D3}$ and $\overline{CP}$ are appropriately energized, and a positive read strobe pulse appears on conductor RD.

2. When a connected terminal desires to transmit a response to the headend, it simply applies a 5-bit code to conductors A-E, the data being available in the modem for subsequent transmission when the modem recognizes its address on the cable (i.e., when the terminal is polled). A strobe pulse is not required for loading the A-E bits in the modem; they are continuously furnished by the terminal.

3. The security terminal is connected to the two conductors of a telephone line in the switched telephone network, the connection and the manner in which the line is seized being described below.

Main Control and Remote Unit Panels, and Emergency/Medical Input Device

Figure 4:
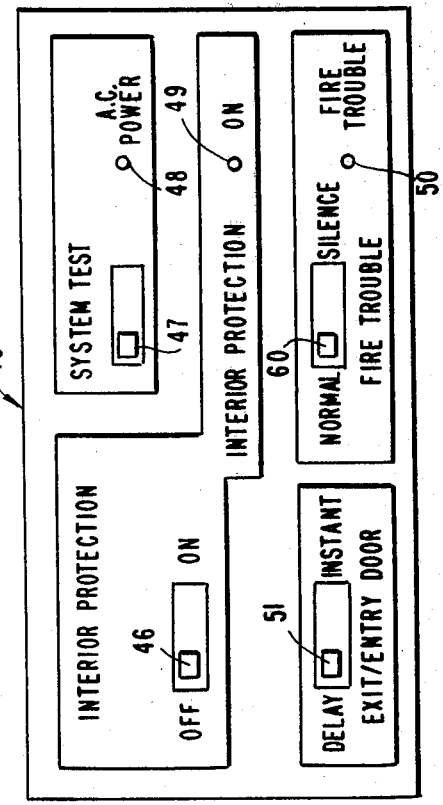
FIG. 4 depicts the switch/light panel on the main control unit of the illustrative embodiment of our invention.

FIG. 4 depicts the panel 45 on the main control unit. As described above, the panel includes four switches, and three lights on the right. The three lights 48-50 are labelled "AC power", "interior protection on" and "fire trouble", and they serve the functions described above. The interior protection light is controlled by the interior protection switch 46 which determines whether the interior protection sensors are active or not. System test switch 47 allows the homeowner to test the system as described above, and exit/entry switch 51 controls whether or not the exit and entry delay functions are operative; when the switch is in the instant position, the delays are not in effect and the opening of the exit/entry door is treated as any other intrusion, resulting in the immediate generation of an alarm. Fire trouble switch 60 is the switch, described above, which can be used to stop 15-second beeping when there is trouble with the fire circuit, and similarly to stop the beeping which starts again after being silenced when the malfunction is corrected.

Figure 5:
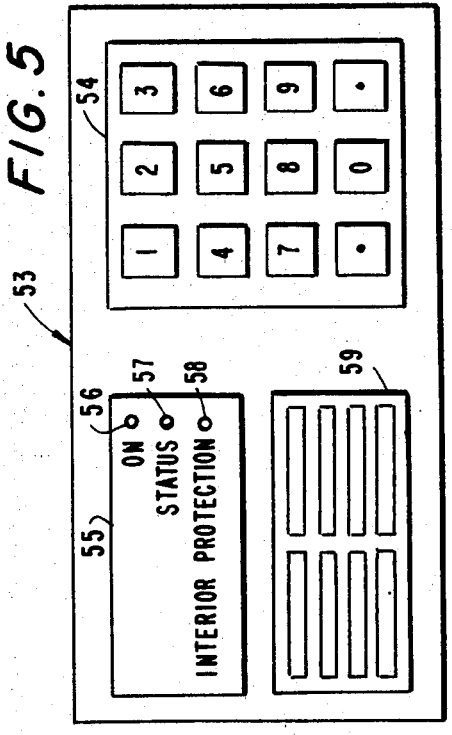
FIG. 5 depicts the keypad and lights on the remote unit of the illustrative embodiment of our invention.

The panel 53 on the remote unit is depicted in FIG. 5. It includes a keypad 54 with 12 keys—the digits 0-9, and "left dot" and "right dot" keys. The left-dot key is used, as described above, to indicate that the homeowner wishes to change one of the three time intervals, or to enter or delete an alternate code. Pressing the left-dot and right-dot keys together triggers an emergency alarm, i.e., the need for police attention. Pressing the right-dot key by itself signals the need for medical attention.

The remote unit includes a three-light block 55. The three lights 56-58 are labelled "on", "status" and "interior protection" and serve the functions described above. Finally, a grille 59 is provided on the remote unit, through which the pre-alarm buzzing is heard, as well as the audible feedback whenever a key is depressed.

Figure 6:
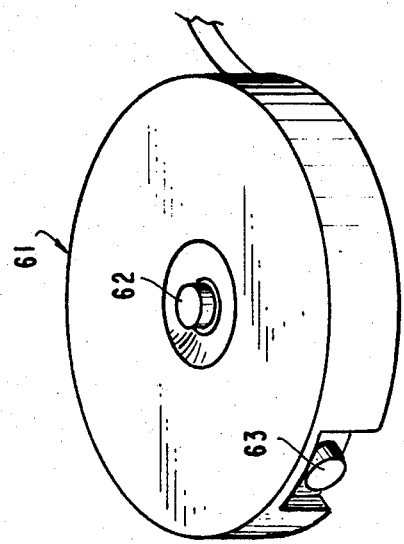
FIG. 6 depicts a preferred emergency/medical input device for use by a homeowner to generate the two respective alarm codes.

The homeowner interfaces to the system via the main control and remote unit panels, and the device of FIG. 6 which allows him to input medical and emergency alarms. The latter device simply consists of two pushbutton switches and is shown in the drawing only to illustrate a particularly advantageous mechanical feature of the invention. Housing 61 includes a top button 62 and a side button 63. Pressing the top button results in a medical alarm, and pressing the side button results in an emergency alarm. The medical alarm button is placed on top of the unit because it has been found that persons desiring medical attention are most likely to grab unit 61 and to press the button on top. Although the unit of FIG. 6 is particularly desirable in order to allow medical and emergency alarms to be inputted, conventional push-buttons distributed throughout the home can also be utilized.

Transmission Codes and Sequences

Before proceeding to a description of the detailed circuitry of the security terminal, it will be helpful to set forth the message sequences which are transmitted back and forth between the central station and the security terminal. The messages sent in the two directions are as follows:

| UPSTREAM TRANSMISSION | | | | | |
|---|---|---|---|---|---|
| | BIT PATTERN | | | | |
| | E | $\overline{D}$ | $\overline{C}$ | $\overline{B}$ | $\overline{A}$ |
| NORMAL RESPONSE | 1 | 0 | 0 | 0 | 0 |
| DIAGNOSTIC RESPONSES | | | | | |
| FIRE TEST | 1 | 0 | 0 | 1 | 0 |
| DIALER TEST | 1 | 1 | 1 | 0 | 0 |
| SUPERVISORY CODES | | | | | |
| FIRE TROUBLE | 1 | 0 | 0 | 0 | 1 |
| LOW BATTERY | 1 | 1 | 0 | 0 | 0 |
| AC POWER | 1 | 0 | 0 | 1 | 0 |
| ALARM CODES | | | | | |
| FIRE | 0 | 0 | 0 | 0 | 1 |
| MEDICAL | 0 | 0 | 0 | 1 | 0 |
| BURGLARY | 0 | 0 | 1 | 0 | 0 |
| EMERGENCY | 0 | 1 | 0 | 0 | 0 |

| DOWNSTREAM TRANSMISSION | | | | | |
|---|---|---|---|---|---|
| | BIT PATTERN | | | | |
| | $\overline{CP}$ | $\overline{D3}$ | $\overline{D2}$ | $\overline{D1}$ | $\overline{D0}$ |
| COMMANDS | | | | | |
| SECURITY POLL | 1 | 1 | 0 | 0 | 0 |
| FIRE TEST | 1 | 1 | 0 | 1 | 0 |
| DIALER TEST | 1 | 1 | 0 | 1 | 1 |
| RESET | 0 | 0 | 0 | 0 | 0 |
| ALARM CODE ECHOES | | | | | |
| FIRE | 0 | 0 | 0 | 0 | 1 |
| MEDICAL | 0 | 0 | 0 | 1 | 0 |
| BURGLARY | 0 | 0 | 1 | 0 | 0 |
| EMERGENCY | 0 | 1 | 0 | 0 | 0 |

The security terminal generates a five-bit response code which appears on conductors A-E extended to the modem. Whichever code happens to be extended to the modem is transmitted upstream to the central station in response to a poll. It is the modem which recognizes the respective terminal address, and in response to it transmits the message. The modem also decodes a five-bit message sent downstream from the central station, and delivers it to the security terminal together with the RD strobe pulse. The security terminal reads the downstream message when it is thus strobed.

The first section of the chart above depicts the messages which are sent upstream by the modem. Bit E distinguishes between a normal response, a diagnostic response and a supervisory code on the one hand, and an alarm code on the other hand. The message itself is represented by the four other bits. Bits A-D are 0000 if the security terminal logic has determined that everything is normal (the usual message).

The central station transmits two diagnostic test codes, one which controls a report of the testing of the fire-sensing circuit and the other which controls testing of the back-up dialer. The terminal constantly monitors the fire loop, as will be described below, to determine if it is operational. The state of the fire loop is represented by a bit in a supervisory message. The fire test is something different. A fire condition is automatically simulated periodically so that a check can be made to see whether the fire detection circuitry recognizes it. During the fire test the siren is not sounded since a fire alarm condition is being purposely simulated. Unlike the fire loop monitoring, the fire test results are reported only when asked for. If the most recent fire test was passed, the security terminal controls a 10010 response to a fire test command as indicated in the chart. But if the fire test was not passed, then the usual normal response is transmitted back to the central station to indicate that something is wrong.

When the central station wants to test the back-up dialer and transmits an appropriate downstream command, the dialer seizes the telephone line, dials out and then outputs a test message. But first the security terminal transmits a 11100 diagnostic response to the central station over the cable, as verification that the dialer test command has been recognized. If the dialer test command has not been recognized, then a normal response is returned to indicate that something is wrong. The terminal then looks for an echo of its 11100 diagnostic response; only if the echo is received does the dialer start operating. The dialer test thus checks not only whether the dialer is operative, but also whether messages are being transmitted correctly in both directions over the cable.

As explained above, whenever the security terminal is polled and the modem recognizes its respective address, the code word being inputted to the modem is transmitted upstream. There is no time for the modem to deliver a diagnostic test command to the terminal, and to then wait for the terminal to derive the appropriate response for upstream transmission. In order to service all terminals without any undue delay the polling is very rapid, and whatever response is contained in the modem is transmitted immediately to the central station on a poll. Long before (measured in microseconds) the security terminal has been able to respond to a diagnostic test command, the central station has already placed another address on the cable. Thus when the central station causes a diagnostic test to be performed, by transmitting a diagnostic test command following the terminal address, it will usually receive back first a normal response—which is not treated as a response to the test command. What the central station does is to transmit a diagnostic test command to the terminal, followed by another poll of the terminal within several hundred microseconds. By this time, the terminal response to the diagnostic test command has been made available to the modem, and it is on the next poll following the test command that the central station treats the response as the diagnostic response.

There are three supervisory codes shown in the chart above which are transmitted by the modem to the central station. The E bit in each case is a 1, and one or more of bits $\overline{A}$, $\overline{B}$ or $\overline{D}$ is also a 1 to indicate a respective problem (an open fire loop, a low battery, or a loss of AC power). Multiple trouble conditions are transmitted by setting two or three of the $\overline{A}$, $\overline{B}$ and $\overline{D}$ bits. It should be noted that a normal response is simply a "supervisory" code which has no bits set to indicate a problem.

As for the four alarm codes, in each case the E bit is a 0, and a respective one of bits $\overline{A}$–$\overline{D}$ is set to 1 to indicate an alarm condition. In the case of multiple alarm conditions, multiple ones of bits $\overline{A}$-$\overline{D}$ are set.

The security terminal determines which of the three types of response has priority (there are only three types of response since a normal response is a form of supervisory response). Top priority is given to diagnostic responses; if the central station wants a test to be performed, the terminal performs that test and sends back a verification code. In the absence of an alarm code and a diagnostic command, the appropriate supervisory code is sent back to the central station. But in the presence of an alarm condition, the alarm code takes precedence over the supervisory code.

The central station transmits two types of message to an addressed terminal, the two types being distinguished by the $\overline{CP}$ bit. The alarm code echo, buts $\overline{D0}$–$\overline{D3}$, is identical to the alarm code transmitted to the central station by the terminal. If the terminal receives back the same alarm code which it sent, it knows that the alarm message was received by the central station and that dialing is not required. But if the alarm code is not properly echoed or normal polls have not been received within twenty seconds as described above, the dialer is caused to operate.

The central station transmits four types of command to the terminal. The usual command is that representing a security poll, code 11000. This is the command which is sent most of the time and simply asks for a return message which represents either a normal response, a supervisory trouble condition, or an alarm code. But when the central station wants to perform a fire test, it transmits the code 11010. Similarly, to effect a dialer test, the code 11011 is sent over the cable.

The fourth command is a reset, a 00000 code. Actually, the terminal does not reset until the next command is received (which is usually a routine security poll); the reset command does not in and of itself control resetting. Why this is and what is involved in resetting the security terminal will be described below.

As will become apparent upon consideration of the detailed schematic, insofar as the hardware is concerned the coding is completely arbitrary. Any codes for normal responses, fire test responses, etc. and any codes for diagnostic commands, alarm code echoes, etc. will suffice, as long as the security terminal and the central station both treat a particular code as meaning the same thing. The only exception is the reset command sent by the central station. As will be described below, a reset command is detected by hardware in the security terminal rather than under firmware control, and thus this code cannot be changed at both ends without a change in hardware. The hardware can thus be understood, with the exception of the reset command, without any further attention being paid to the particular codes employed. For example, the central station could be programmed to transmit a fire code echo which is completely different from the fire alarm code sent by the security terminal. The same security terminal hardware could be used, as long as the firmware in the security terminal is modified to control recognition of the receipt of the new code as confirmation of the central station having received the fire alarm code from the terminal.

The Security Terminal Hardware

The main control unit is depicted in FIGS. 7–12, these six sheets being arranged as shown in FIG. 13. The unit is provided with a screw terminal strip, the individual terminals of which are connected, for example, to an input power transformer, a telephone line in the switched telephone network, the various sensors employed in the home for detecting alarm inputs, and via a multi-conductor cable to the remote unit. (An additional multi-conductor cable is utilized to connect the control unit to the modem, as will be described below.)

At the upper left of the overall schematic there are shown the terminals which are connected to the various sensors in the home. Each sensor loop has an active terminal and a ground terminal, each loop thus having two terminal connections. The several ground terminals which may be used are numbered 18, 24, 26, 29, 32, 34, 36 and 38. Each of these eight ground terminals is used to establish a loop with one of the eight input terminals 25, 27, 28, 30 31, 33, 35 and 37.

Terminal 27 is the medical alarm input. A wire is extended from one of the ground terminals to the normally-open switch contacts controlled by push-button 62 in the unit of FIG. 6, and from the switch to terminal 27. When the pushbutton is depressed, the ground potential at terminal 27 indicates that medical attention is necessary. (The other medical emergency input is the right-dot key on the keypad of the remote unit, as described above.) In a similar manner, terminal 28 is connected to the normally-open emergency switch contacts on the unit of FIG. 6. (As described above, an emergency alarm can also be inputted by simultaneously depressing the left-dot and right-dot keys on the keypad of the remote unit.)

There are several types of intrusion sensors. Terminal 31 ("instant") is used for connection to the loop containing those sensors which must trigger an alarm condition immediately following operation, if the system is armed. Sensors of this type are those traditionally employed, for example, to detect window openings, non-exit/entry door openings, etc. The various sensors used in the loop all have normally-closed contacts, and they are connected in series between terminal 31 and one of the ground terminals. Thus terminal 31 is normally grounded, but due to its return through a respective resistor to the 5-volt supply, the terminal goes positive whenever one of the sensors operates and breaks the circuit. (It should be noted that all eight of the sensor terminals are returned to the 5-volt supply through respective resistors, so that open-loop and closed-loop conditions can be distinguished.) While terminals 27 and 28 have positive potentials on them in the absence of their respective alarm conditions, and terminal 31 has a ground potential on it in the absence of its respective alarm condition, it makes no difference whether a terminal potential is at a high level or at ground when the respective condition to be monitored is normal. The eight terminal potentials are monitored as will be described below, and as long as the microprocessor which controls the system operation is aware of the respective potential levels for each terminal which represent normal and alarm conditions, that is all that is required.

While terminal 31 is used for connection to "exterior protection" sensors, i.e., those which detect window openings and non-exit/entry door openings, terminal 30 is used for connection to the sensor associated with the exit/entry door. Because a normally-closed switch is used for this door, it is a positive potential on terminal 30 which represents a loop violation. A separate input is required for the exit/entry door because of the need to provide for an exit delay or entry delay in the event the exit/entry door switch in FIG. 4 is in the delay position. The manner in which the system is advised of the switch position will be described below, but the sensing of an open exit/entry door is completely independent of the switch position.

As described above, provision is made to connect "interior protection" sensors to the security terminal. Whether alarm conditions sensed by these devices actually result in the triggering of an alarm depends upon the position of the interior protection switch on the control panel of FIG. 4, but the sensor connections to the terminal are independent of the switch position. Terminal 35 is used for connection to normally-open contact devices. These devices are all connected in parallel between terminal 35 and one of the ground terminals, terminal 35 thus normally being high in potential; operation of any one of the sensors causes a ground potential to appear at the terminal. Normally-closed contact interior protection sensors, on the other hand, are connected in series between terminal 33 and one of the ground terminals. Thus it is a ground potential at terminal 33 which is considered normal, and a positive potential appears at the terminal only when one of the connected sensors detects a violation. It should be noted that both of terminals 33 and 35 are labelled "switched zone" because together they function to protect an interior zone of the home, the protection being switched in and out depending upon the position of the interior protection switch on the control unit.

The two switched-zone circuits operate differently. A violation sensed at terminal 33 immediately triggers an alarm if the interior protection switch is in the on position; if the switch is in the off position, then the violation is ignored. A violation sensed at terminal 35, on the other hand, does not result in the immediate triggering of an alarm even if the interior protection switch is in the on position. Instead, it starts the appropriate delay timer (if the exit/entry door switch is in the delay position) and beeping of the buzzers; an alarm is triggered only if the violation is not corrected or the master code is not inputted before the timer times out. This allows a set of interior protection sensors to be provided with the "delay" feature. Arming of the system while forgetting that interior protection is afforded would otherwise result in an immediate alarm condition as the homeowner moves around inside the house and operates a floor mat sensor, for example. But by providing the delay feature, the buzzing which results warns him to either get off the mat or input the master code. (The disadvantage of using the delayed switched-zone loop, rather than the immediate switched-zone loop, is that a thief is also warned by the buzzing, and an alarm will not be triggered if he steps off the mat during the exit delay interval. That is why two switched-zone loops are provided; the homeowner can choose either interior protection option. Of course, if the thief steps on the mat after the exit delay interval has expired, then no protection is lost. The entry delay comes into play, but the only way to stop an alarm from being generated is to input the master code and presumably the thief does not know it.)

The last alarm input terminal used for intrusion protection is "day/night" terminal 37. The day/night function is standard in the art, and terminal 37 is connected to a plurality of normally-closed contact sensors coupled in series. Typically, these sensors include aluminum-foil circuits and others which are prone to break. Especially in commercial establishments, if the system is armed during the day and an aluminum-foil strip is torn at the time of arming, ringing of the alarm is not wanted. The protection is really needed only at night anyway. When the system is first armed, the terminal logic (microprocessor) examines the day/night loop. If a ground potential appears at terminal 37, indicating that the loop is good (i.e., closed), the day/night input is treated the same way as the instant input at terminal 31; the moment the potential at terminal 37 goes positive, an alarm condition is triggered. But if upon arming of the system the logic determines that the day/night loop is bad, i.e., terminal 37 is high in potential, the potential of the terminal is ignored insofar as generating alarm codes is concerned. Whenever the day/night loop is bad, a short beep is generated by each of the pre-alarm buzzers (in the control and remote units respectively) once every 15 seconds. This beeping advises the storeowner that the loop had better be repaired during the day if full protection is to be had at night. It the loop is not repaired, effectively it remains out of circuit. Operation of a sensor in the loop can trigger an alarm only if the loop is good when the system is first armed.

As mentioned above, the status light on the remote unit panel of FIG. 5 must be on in order for the system to be armed. This light represents the condition of only the "active" loops. If the instant terminal 31 is at a high potential, indicating that one of the intrusion sensors which is always in-circuit happens to be operated, the status light remains off. The status light is not affected by the potential at day/night terminal 37; if the day/night loop is no good, the system can still be armed but the loop is effectively disabled. The status light can be affected by the potentials at terminals 33 and 35, depending upon the position of the interior protection switch of FIG. 4. If the interior protection switch is off, then the interior zone associated with terminals 33 and 35 is of no concern, the system can be armed even if there are interior violations, and the status light remains on even in the presence of these violations. But if the interior protection switch is on, the status light may remain off and the system will be prevented from arming should there be a violation in one of the switched zone loops.

The status light is used in an additional capacity. On power-up, with resetting of the terminal, all time intervals and/or an alternate code which were priorly set by the homeowner are erased, and the default parameters come into play. The homeowner is advised that the default parameters apply by blinking of the status light. Following the first inputting of the master code, for any reason, the status light reverts to its normal function.

The several normally-open contact fire sensors are connected in parallel between terminal 25 and ground terminal 26. The normally-high potential at terminal 25 goes low whenever a fire (or smoke) alarm condition is sensed. The fire loop can be tested, as will be described in further detail below, and toward this end a 4.7k resistor is connected at the remote end of the fire loop, in parallel with the sensors. Although terminal 25 is returned through a 10k resistor to the 13.8-volt supply line, the potential which normally appears at terminal 25 is less than the supply potential due to the voltage-divider action of the external 4.7k resistor. This allows the integrity of the fire loop to be tested, as will be described below.

Terminals 14–17, labelled D0–D3, are connected to the keypad in the remote unit as will be described below in connection with FIG. 14. The potentials at these terminals represent a four-bit BCD code representative of the particular key which has been depressed.

Terminals 5 and 6 are connected to the telephone line coming in from the switched telephone network. Terminal 3 is connected to earth ground, which in turn is connected to common terminal 4. Conventional suppressor circuits (to protect the terminal from line-originated voltage spikes) are connected between the two lines and terminal 4. Terminals 7 and 8 are connected to the telephone instrument at the subscriber premises. Relay K1 is normally operated such that the double-pole switch is in the non-active position as shown (pin 2 connected to pin 3, and pin 5 connected to pin 6). In such a case, it is apparent that the telephone line terminals 5 and 6 are connected directly to respective telephone instrument terminals 7 and 8, and the security terminal has no effect on telephone operation. It is only when relay K1 is energized to seize the line that the line is disconnected from the instrument at the subscriber premises. At this time, with pin 2 being connected to pin 1, and pin 5 being connected to pin 4, the two telephone line terminals 5 and 6 are connected across a winding of transformer T1 and the contacts of relay K2. This is the relay which is pulsed in order to dial the telephone number of the central station should back-up dialing be required, the normally-closed contacts then remaining closed so that tone signals can be sent over the telephone line to identify the security terminal and the reason for the call.

Power for the security terminal is derived by connecting terminals 1 and 2 through a 12-volt transformer (not shown) to the power line. A varistor RV1 connected across the terminal attenuates power line transients. Diodes D1 rectify the AC current from the line, and filtering capacitor C5 has a 17.6-volt unregulated potential developed across it. Switch S3, the system test switch shown on the control unit panel of FIG. 4, is normally in the position shown, and thus the unregulated 17-volt potential at the cathode of diode D3 is extended through the switch to serve not only as the source of siren power, as indicated, but also as the input to pin 1 of voltage regulator VR1. This regulator is used to derive a 13.8-volt supply as shown in the drawing, and regulator VR2 is utilized to derive a 5-volt supply. Diode D5 and capacitor C6 ensure that noise on the 13.8-volt line does not affect the 5-volt supply. The output of regulator VR1 is extended to terminal 21. Terminal 22 is grounded, and the 12-volt back-up battery is connected between terminals 21 and 22. During normal operation, the battery is charged from current flowing from the output of regulator VR1. Should AC power be lost, however, it is the potential at terminal 21 which powers the system, the battery potential being substituted for the potential at the output of regulator VR1. Although regulator VR1 can develop a 13.8-volt potential, its output (the 13.8-volt bus) is actually limited to the potential of the battery to which it is connected. It should be noted that although during normal operation the unregulated 17-volt potential which is applied to input pin 1 of regulator VR1 also serves to power the siren, when AC power is lost and the 12-volt battery comes into play, it is only the lower battery potential which is extended through diode D6 to power the siren. This DC potential, however, is sufficient to power the siren.

Resistors RP1 and RP3 hold pin 14 of chip U9 at 2.6 volts, which can be read by the microprocessor to verify the presence of AC power. If AC power is lost, an appropriate supervisory code is sent to the central station over the cable.

Figure 9:
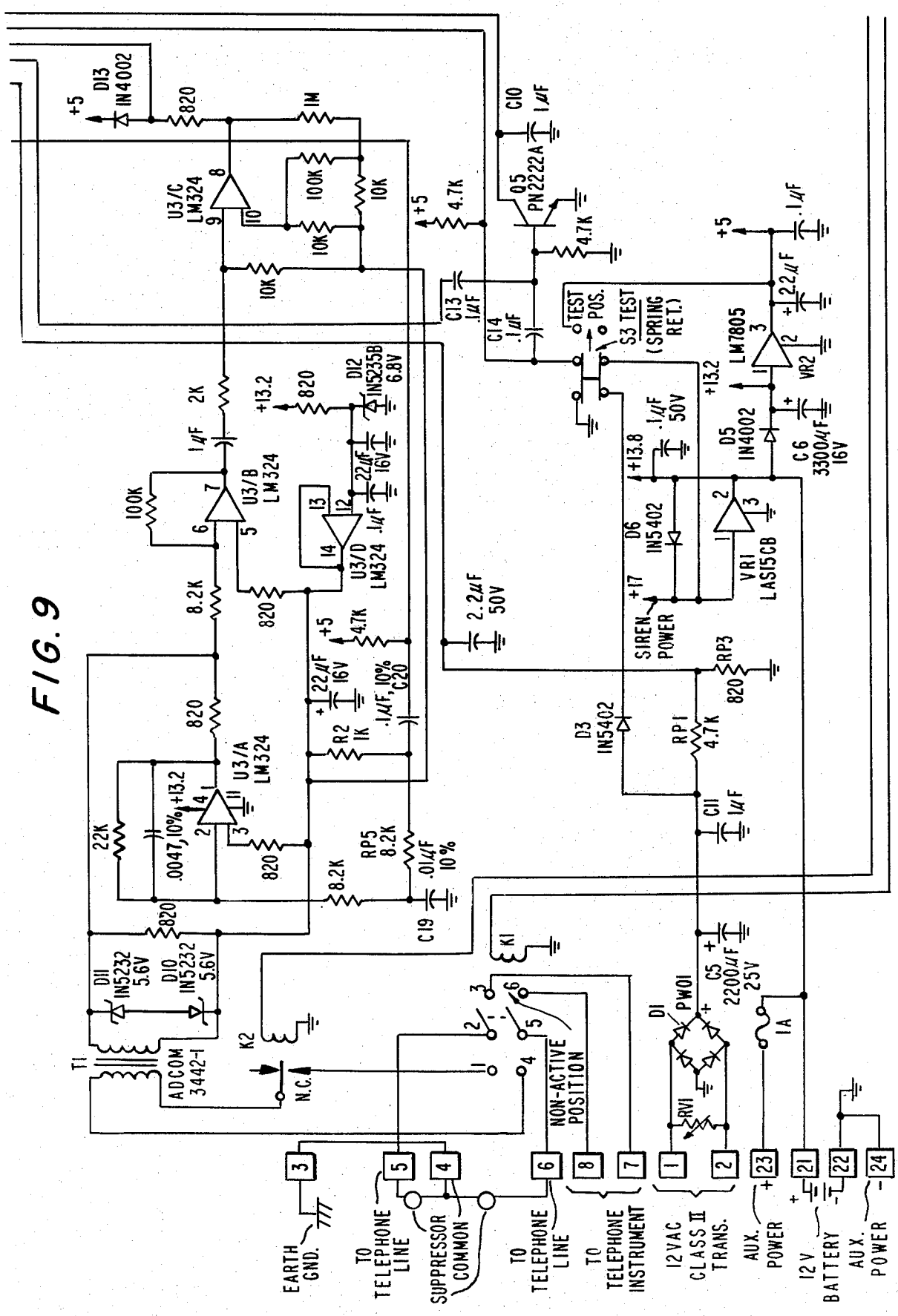

When the system is tested by moving switch S3 (the system test switch on the control panel of FIG. 4) to the right in FIG. 9, AC power is lost because the cathode of diode D3 is no longer connected through the switch to input pin 1 of regulator VR1. It is the battery which now powers the system, and the 5-volt potential at the output of regulator VR2 is extended through the system test switch to pin 39 (T1 input) of the microprocessor chip, and through capacitor C14 to the base of transistor Q5 which controls a reset of the microprocessor as will be described below. The T1 input is ordinarily held at a low potential because it is grounded through the system test switch S3. During a system test, the potential rises to 5 volts to inform the microprocessor that a system test is in progress. If the fire detection circuit, which is tested when the T1 input is high on a reset, is operative, the microprocessor causes the siren to blast for 2 seconds (under battery power) to inform the homeowner that both the battery and the fire detection circuit are in working order.

Terminal 24 is connected to grounded terminal 22, and terminal 23 is connected through a fuse to the output of regulator VR1. Terminals 23 and 24 thus provide a source of auxiliary power which is required for conventional fire sensors and some burglary sensors such as infra-red detectors.

At the bottom right (FIG. 12) of the control unit schematic there are additional screw terminals. Terminals 19 and 20 are extended to the siren (not shown). Terminal 20 is the ground connection, and the 17-volt supply for the siren is extended through a fuse and transistor Q1, when it is turned on, to terminal 19.

Chip U2, powered through another fuse, contains eight peripheral drives for extending various signals throughout the security terminal. Output pin 14 of the chip U2 supplies current to light-emitting-diode LED2A (the interior protection light on the control panel), and through a conductor connected between terminal 9 and the remote unit for powering the interior protection light in that unit. (Ground for the remote unit unit is extended over a line connected to terminal 13.) Output pin 15 of chip U2 is connected to the coil of relay K1, the relay which seizes the telephone line as described above. Output pin 12 is connected to terminal 11, a conductor being provided for connecting this terminal to the remote unit to control the status light. Output pin 17 of the chip is connected directly through a resistor to diode LED3A, the fire trouble light on the control panel.

Output pin 11 of chip U2 is connected directly to the pre-alarm buzzer in the control unit, and over a conductor connected to terminal 12 to the pre-alarm buzzer in the remote unit. Output pin 16 is connected to the coil of relay K2 for controlling dial pulses when the telephone line is seized, and also for maintaining the relay contacts closed when tone signals are to be transmitted between the security terminal and the central station. (Although relay K2 controls the generation of dial pulses, the term "dialer" broadly includes "dialing" with tone signals as well.) Output pin 18 is connected directly through a resistor to diode LED1A, the AC power light on the control unit panel. The last output pin on chip U2, pin 13, is connected to terminal 10, from which a conductor is extended to the remote unit for energizing the "on" light to indicate whether the system is armed.

The security terminal operation is controlled by chip U5, an Intel 8035 microprocessor, one of those in the MCS-48 family. The 8035 microprocessor is characterized by its lack of on-chip program memory, although it does contain a 64-byte data memory. The following brief summary of chip U5 is directed more to the way it interfaces to the rest of the security terminal logic than it does to the internal chip logic.

The chip timing is controlled by a standard colorburst crystal YT connected in the conventional way to XTAL1 and XTAL2 pins 2 and 3 of the microprocessor. Pin 7, the External Access (EA) input is held high to force all program memory fetches to reference external memory.

The $\overline{\text{RESET}}$ input pin 4 is forced low in order to reset the microprocessor. In addition to setting the program counter to 0 (i.e., starting program execution with the instruction at address 0 in the external program memory), resetting the microprocessor performs many other initialization functions, all of which are described in Intel's MCS-48 Microcomputer User's Manual. The T0 and T1 input pins 1 and 39 are testable inputs on conditional jump instructions. These pins allow respective inputs to control program branches. The T0 input is normally held high but, due to its connection through "tamper" switch S5 to ground, can be forced low when the switch contacts close. The switch is arranged (as is known in the art) in the control unit so that its contacts are held open as long as the cover of the unit is kept in place. But when the cover is removed, the switch contacts return to their normally-closed condition, at which time the T0 input of the microprocessor goes low. The input is tested periodically, and a low potential is treated as a burglary alarm condition; the siren sounds and an alarm code is sent over the cable to the central station, or dialed over the telephone line if there is a cable outage. This is to ensure that the homeowner or a thief does not tamper with the control unit. The T1 test input, on the other hand, is examined when the microprocessor is reset, as will now be described.

The microprocessor can be reset in any one of three ways—by the central station transmitting a reset command, by momentary operation of the system test switch, or when power is first applied ("power-up"). The five input conductors $\overline{\text{D0}}$—$\overline{\text{D3}}$ and $\overline{\text{CP}}$ from the modem are all connected to respective inputs of NAND gate U13 (FIG. 7), the other inputs of which are all held high. A reset code (00000) thus results in all inputs of the NAND gate being high, and the output going low. The low potential, extended through capacitor C13 (FIG. 9) to the base of transistor Q5, has no effect on the transistor which remains in its normally off state. However, as explained above, when the next non-reset command is sent by the central station, the microprocessor resets. When this command appears on the five outputs of the modem which are extended to the security terminal, the output of chip U13 goes high. A positive step is now extended through capacitor C13 to turn transistor Q5 on. The $\overline{\text{RESET}}$ input pin 4 is thus connected through the transistor to ground and the microprocessor is reset. (A central station reset terminates all alarms, but does not disarm the terminal if it was previously armed.) Capacitor C10 is provided, in accordance with Intel recommended procedure, to hold pin 4 low when power is first applied to the chip so that the microprocessor is automatically reset. When the central station resets the microprocessor, or on a power-up reset, input T1 of the microprocessor is connected through system test switch S3 to ground.

The third way in which the microprocessor can be reset is during a system test when switch S3 is moved to the test position. A 5-volt potential is now extended through the switch and capacitor C14 to the base of transistor Q5 to turn it on. But a 5-volt potential is also extended to input T1 of the microprocessor since the input is no longer grounded by the switch. A high potential on test input T1 at the time of a reset informs the microprocessor that instead of a central station or power-up reset, what is involved is a system test reset. The microprocessor causes the siren to sound for two seconds if the battery and fire loop (and, of course, siren) are operational. With switch S3 moved to the test position, there is no source of AC power, as described above. Power is derived from the back-up battery and test input T1 will be at a high potential only if the battery is not discharged. If the battery is discharged, the siren is not sounded (even if the fire loop is good), and the homeowner is thus informed that there is something wrong with his back-up battery.

The microprocessor reset requires further explanation. The reset is controlled by a homeowner system test, by power first being applied to the terminal (capacitor C10 on FIG. 9 is initially discharged and charges from the $\overline{\text{RESET}}$ input to effect a reset), or by the central station transmitting a reset signal. The microprocessor sequences in different ways following the three types of reset. For example, on a system test reset, the siren is sounded for two seconds (with the fire sound, not the burglary sound), while on a central station reset the siren is actually turned off even if it was previously on. The microprocessor must therefore have a way of distinguishing between the three different types of reset.

The system test reset is easily distinguished because it is only in this case that the T1 input is high. In the illustrative embodiment of the invention, power-on and central station resets are distinguished under firmware control. At the start of a reset sequence, the microprocessor examines the T1 input and determines that it is not a system test which is in progress. It then examines the contents of one of its internal registers. (The program listing at the end of the description reveals that it is RAM location 2C (HEX) which is looked at.) On a power-up reset, the byte stored at this location will have some random value. At the end of the reset routine, the HEX byte AA is written into memory location 2C. On a subsequent central station reset, the microprocessor verifies that location 2C contains the HEX byte AA, and it is made aware that what is involved is a central station reset, rather than a power-up reset. It is only when power is first applied to the system that location 2C will contain some random value, other than the HEX byte AA. This technique assumes that on power-up the contents of location 2C will not come up as HEX byte AA. This is a valid assumption, however, because on power-up the RAM locations in the microprocessor rarely contain alternate zeroes and ones (AA(HEX) = 10101010).

The $\overline{\text{WR}}$ pin 10 of the microprocessor is forced low when a data word is to be written in external memory, and the $\overline{\text{RD}}$ pin 8 is forced low when a byte is to be read from external memory. As will become apparent below, while there are no writes to external memory, the $\overline{\text{WR}}$ signal is used to control "writing" of a five-bit code in the modem for transmission as a response to the next terminal poll. The RD signal is used to control the accessing of three buffers which provide status signals, keypad and loop inputs, etc., or the reading of PROM data (chip U16—the master code, the telephone number to be dialed in the event of a cable outage, and the terminal identification number).

The microprocessor chip is provided with an 8-bit bus (pins 12–19), the individual conductors in which are labelled DB0–DB7. The bus is a bi-directional port controlled by the $\overline{\text{WR}}$ and $\overline{\text{RD}}$ strobes. The microprocessor includes a 12-bit program counter. The eight least significant address bits of the program counter are outputted on the bus in order to access the external program memory, or at the start of any read or write cycle the eight appropriate least significant address bits are outputted on the bus. The four most significant address bits are outputted on the lower half of port 2 during an instruction fetch (although not during a read or write cycle, since reads and writes are limited to 8-bit addresses). Because the program memory is only a 2k device, 11 address bits are required rather than 12. Thus only the three least significant bits in port 2, P20–P22, are used for accessing the program memory.

To fetch an instruction from the program memory, or to control a read or write operation, the ALE (address latch enable) signal at pin 11 goes high at the start of the cycle when address bits appear on the bus. Because the bus is used both to transmit an address, and then to receive an instruction or data byte or to transmit a byte to be written, the eight bits of the address which are originally outputted on the bus must be latched externally so that they are available to control a read of the program memory, or a read or write of data. While the ALE output is high, the previously floating bus has outputted on it the eight bits of the address which must be latched. The ALE output then goes low and the bus is floated once again, the eight bits of the address being latched in chips U6 and U11 at the trailing edge of the ALE pulse, as will be described below. During this initial sequencing, the $\overline{\text{RD}}$, $\overline{\text{WR}}$, and $\overline{\text{PSEN}}$ outputs are high. But after the ALE output goes low and the bus is floated, one of the $\overline{\text{RD}}$, $\overline{\text{WR}}$ and $\overline{\text{PSEN}}$ outputs is pulsed low. The $\overline{\text{RD}}$ output is pulsed whenever a read from external memory is required, the 8-bit data byte being outputted by the memory on the bus, at which time it is read by the microprocessor. The $\overline{\text{RD}}$ output goes high once again at the end of the read, at which time the bus is floated once again. A similar sequence takes place on a write operation, except that it is the $\overline{\text{WR}}$ output which is pulsed low, the microprocessor now applying the data byte to be written to the 8-bit bus for storage at the address previously latched.

During an instruction fetch, the microprocessor causes pin 9 ($\overline{\text{PSEN}}$) to be pulsed low. The $\overline{\text{PSEN}}$ signal ("program store enable") goes low to indicate that an instruction fetch is in progress, and it is this signal, as will be described below, which enables the external program memory. The 11-bit address which is used consists of the previously latched 8 bits which appeared on the bus, and the 3 bits which are still present at the P20, P21 and P22 port pins.

Pin 6 is the interrupt ($\overline{\text{INT}}$) input of the microprocessor. The RD positive strobe from the modem (an 82-microsecond pulse when the Pioneer modem is used) is connected through capacitor C24 to this pin. Whenever a message is received from the central station (a command, or an echo), the RD strobe is generated by the modem and it is used to interrupt the microprocessor so that it can process the message. It is the trailing (negative step) edge of the RD pulse which actually causes the interrupt, at which time the microprocessor automatically calls the subroutine starting at location 3 of the program memory.

The remaining pins which must be understood are those associated with the two ports. (No extended discussion is required for the remaining non-port pins. Pins 26 and 40 are supply inputs, and pin 20 serves as the chip ground connection. Pin 5 is the single-stepping control which is held disabled since it is used primarily for debugging. No connection is made to pin 25 which serves no function as the 8035 chip is used in the illustrated system). Each port contains eight pins which can be used on an individual bit basis for inputs or outputs. As configured in the illustrative embodiment of the invention, each individual port bit is used as either an input or an output, but not both, and all of the port 1 bits are outputs. The three least significant bits in port 2 are used as the three most significant address bits A10–A8 for accessing the program memory. Because a fetched instruction appears only on the 8-bit bus, the three P20–P22 address bits do not have to be latched under control of the ALE signal as do the eight least significant address bits on the bus; the port bit outputs, once they are set high or low during outputting of a program memory address, remain in the respective states until the end of the instruction fetch cycle.

Port output bit P27 (pin 38) is used to control a timer, as will be described below, which effects sounding of the siren. Port bit P24 is used as an output for controlling the fire test when the terminal is commanded by the central station to perform a fire test. Port bit P25 is utilized to detect dial tone and a 2300-Hz "handshake" tone from the central station during a dial sequence, and port bit P26 is used as an output to generate tone signals (terminal identification number and an alarm/test code digit) for the central station, as will be described below. Port bit P23 is used to test the battery, also to be described below.

With respect to the bit outputs of port 1, bits P10, P11 and P15 are used respectively for controlling seizure of the telephone line, illumination of the status light on the remote unit, and illumination of the fire trouble light on the control unit panel. Port bit P12 controls sounding of the two pre-alarm buzzers, and port bit P14 (normally high, for energizing relay K2 to hold its contacts open) controls dialing. Port bit P16 controls the AC power light on the control unit, port bit P17 controls the "on" light in the remote unit, and port bit P13 controls the two interior protection lights.

The 8035 microprocessor has a built-in programmable timer, a feature utilized in the illustrative embodiment of the invention which requires timekeeping, as will become apparent when the source listing is discussed.

Many of the circuit configurations throughout the drawing are conventional, both those associated with the microprocessor and others to be described below for controlling respective functions. A detailed description of individual circuits is not necessary for those skilled in the art. (For example, it is well known that individual pins of the microprocessor should be returned through resistors to a 5-volt supply so that high and low signal conditions can be distinguished. Similarly, the use of peripheral drivers at the port outputs for providing sufficient drive capability need not be explained.) What is important for an understanding of the present invention is the manner in which the various sub-systems cooperate with each other, as well as particular circuit connections which are not standard. All of these will be described below.

Back-up dialer operation is controlled by port bits P10, P14, P25 and P26. As described above, port bit P10 controls operation of relay K1 and the seizure of the telephone line by the security terminal, while port bit P14 controls operation of relay K2 and the outputting of dial pulses. After the central station telephone number is dialed, relay K2 is controlled by port bit P14 to maintain its contacts closed so that the left winding of transformer T1 is coupled through the contacts of relay K1 to telephone line terminals 5 and 6. Before the microprocessor outputs the station identification number and the alarm/test code, it verifies that a connection through the switched telephone network to the central station has actually been established. Toward this end, the central station transmits a 2300-Hz handshake tone over the telephone line, which tone is detected a port bit P25; the microprocessor checks the rate at which the port bit switches value. Only after this tone is detected does the microprocessor begin to output 1800-Hz tone signals at port bit P26 for transmission to the central station to identify the terminal and to represent a particular alarm/test code. (As will become apparent below when the flow charts are described, port bit P25 is also used to detect dial tone prior to the pulsing of relay K2 and the simulation of dial pulses.)

Dial tone and the 2300-Hz acknowledgment signal from the central station are applied through terminals 5 and 6 to the left winding of isolation transformer T1. The signal appears across the right winding of the transformer, Zener diodes D10 and D11 being provided to protect the security terminal from telephone line surges. The received signal appears at pins 5 and 6 of operational amplifier U3/B; amplifier U3/D develops a 6.8-volt reference voltage for pin 5 of amplifier U3/B as well as for pin 3 of amplifier U3/A. The reference voltage is mid-way between the minimum and maximum potential levels at pin 6 of amplifier U3/B and at pin 2 of amplifier U3/A.

The output at pin 7 of amplifier U3/B is AC-coupled to pin 9 of squaring amplifier U3/C which serves to introduce a 12-millivolt hysteresis effect so that noise around the zero level does not result in false signalling. The output of amplifier U3/C is connected to port bit P25 of the microprocessor, with diode D13 and the connected 820-ohm resistor limiting the input signal to the port to a maximum of 5.6 volts.

The tone output (alternate 0 and 1 values, switched at an 1800-Hz rate) at port bit P26 of the microprocessor is AC-coupled through capacitor C20 and referenced to the 6.8-volt reference potential by resistor R2. Capacitor C19 and resistor RP5 form a low-pass filter for "rounding off" the square wave so that square-wave signals are not applied through the transformer to the telephone line. Amplifier U3/A is configured as another low-pass filter and amplifier, and its output is extended to the right winding of transformer T1 so that coded 1800-Hz tones from the microprocessor are transmitted to the central station.

Chips U8, U9 and U10 are tri-state buffers. Each chip has eight inputs and eight outputs. The inputs are connected to respective bit sources, as will be described below, and the outputs are connected to respective lines DB0–DB7 of the system data bus. The eight outputs of each chip are normally tri-stated and do not affect the system data bus. In order for any chip to extend its inputs to the data bus, enable pins 1 and 19 must be pulled low. This is accomplished, as will be described below, by the microprocessor executing read instructions, with a respective address being outputted for each of the three buffers. The respective HEX addresses are shown in the drawing as being C0, 80 and A0 for the three respective chips U8, U9 and U10.

Figure 8:
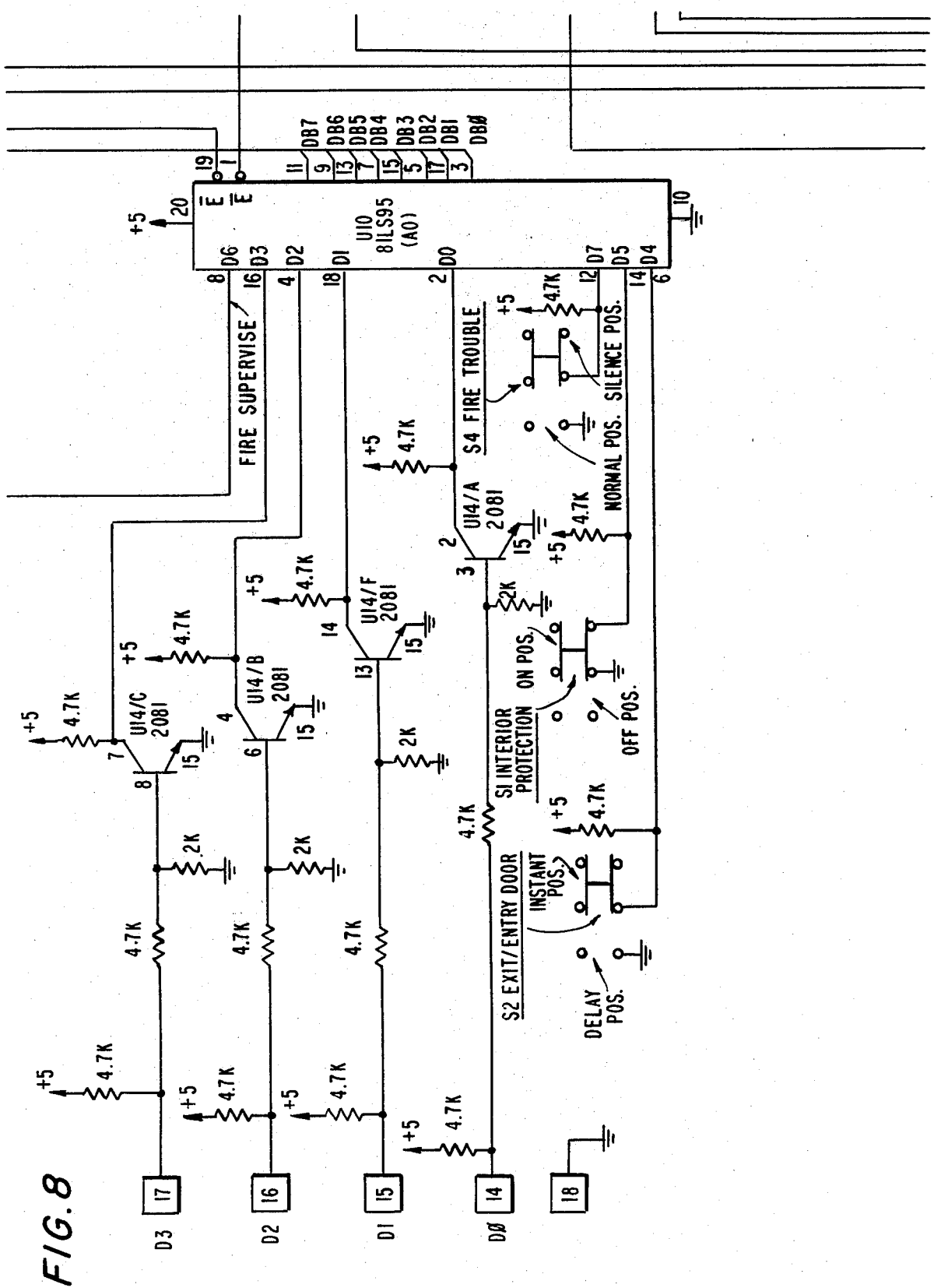

On FIG. 8, screw terminals 14–17 are labelled D0–D3. Correspondingly labelled terminals are to be found in the remote unit, the schematic of which is shown in FIG. 14. The four conductors which connect the respective D0–D4 terminals are used for transmitting a BCD code from the remote unit to the control unit for scanning by the microprocessor. The four bit values applied to terminals 14–17 on FIG. 8 control conduction in respective transistors, and the application of corresponding bit values to the D1, D2, D3 and D6 inputs of buffer U10. Periodically, during the microprocessor sequencing, the eight inputs to buffer U10 are caused to appear on the system data bus, at which time the microprocessor determines if a key on the keypad has been depressed and which key it was.

Switch S2, the exit/entry door switch, controls the potential applied to the D4 input of buffer U10. The switch is shown in the instant position in the drawing, in which case a 5-volt potential appears at the D4 input. When the switch is moved to the delay position, a ground potential is applied to the D4 input. When the microprocessor causes chip U10 to apply its inputs to the system data bus, it can determine whether the exit and entry delays are required.

Switch S1, the interior protection switch, is also shown in FIG. 8 and it controls the potential at the D5 input of chip U10 in a similar way. Similar remarks apply to switch S4, the fire trouble switch, which determines the potential at input D7 depending on whether the switch is in the normal position or the silence position.

The eighth (D6) input to chip U10 is connected to the fire supervise line. This conductor is connected to the collector of transistor U14/G in chip U14. The fire loop is connected across screw terminals 25 and 26 and, as described above, consists of a plurality of normally-open contact sensors connected in parallel, with the loop being terminated by a 4.7k resistor which is similarly connected in parallel with the sensors. The 4.7k resistor, together with resistor RP7, comprises a voltage divider which normally holds terminal 25 at about 3.5 volts. Should the fire loop be broken, the 4.7k resistor is effectively out of the circuit and terminal 25 is pulled up to the potential of the 13.8-volt bus through resistor RP7. At this time, Zener diode D9 breaks down and transistor U14/G is turned on. The collector of the transistor now goes low and instead of a high potential on the fire supervise conductor, there is a low potential. This enables the microprocessor, when it reads the inputs of buffer chip U10, to determine that the fire loop is broken so that a fire trouble supervisory code can be generated for transmission to the central station.

The fire trouble supervisory code is simply an indication that the fire loop is broken. It does not enable the system to determine whether the overall fire detection circuit (including the detection mechanism in the control unit) is operative. There are two ways that this can be checked. One is by the homeowner controlling a system test with the momentary operation of the system test switch. As described above, this results in the siren sounding for two seconds if the siren is working, the overall fire-detecting mechanism is operating, and the battery is also charged to the point that it can power the terminal (since during the system test AC power is disconnected). The microprocessor is informed that a test is to be performed when the T1 test input is high at the same time that the RESET pulse occurs. The other way that the microprocessor is controlled to perform a fire test is under repetitive program control (with the central station transmitting a command to report, this being one of the two diagnostic tests which the central station can control, as described above). The microprocessor takes the same action in both cases, although the repetitive (self) test does not also control a test of the battery since it is only when the system test switch is operated that AC power is disconnected. Also, on a self test, the siren is not sounded and an appropriate diagnostic response message is sent back to the central station when it is asked for.

In both test cases, the microprocessor pulses port bit P24 high. This causes transistor Q6 on FIG. 7 to conduct and its collector to go low in potential. The collector of the transistor is connected to terminal 25 on FIG. 7 so that what is simulated is the operation of one of the fire sensors since each of the sensors causes terminal 25 to be grounded when it operates. Transistor U14/D is normally held on by the 3.5-volt potential which appears at terminal 25 as a result of the voltage-divider action of the external 4.7k resistor in the fire loop and resistor RP7. With transistor U14/D on, its collector is low in potential, the collector of the transistor being connected to one of the inputs of buffer U8. During the fire test, however, when terminal 25 is shorted to ground through transistor Q6, transistor U14/D turns off and its collector rises to five volts. At this time, pin 4 of chip U8 goes high, just as it does when an actual fire alarm condition exists in the home. The microprocessor periodically accesses the data bits at the inputs of chip U8 to sense several different alarm conditions, as will be described below, one of these being a fire alarm condition. During the performance of a fire test, the microprocessor expects to see a fire alarm condition. If the condition is represented at pin 4 of chip U8, and the homeowner is controlling a system test, no message is sent to the central station and instead the siren is sounded for two seconds. On the other hand, if it is a self test which is being performed, the siren is not sounded and the central station, when it inquires, is informed by the appropriate diagnostic response that the fire-detection circuit is in working order. If during the test the microprocessor does not detect a fire alarm condition, the alarm is not sounded in the case of a homeowner system test, and the central station is informed that the fire-detection circuit is not working in the case of a central station-instituted fire test report.

Port bit P24 goes high to control a fire test if the microprocessor is told to perform the test by the homeowner operating the system test switch, or periodically in the main loop processing. The test for checking the integrity of the fire loop is also performed every 0.1 seconds in the illustrative embodiment of the invention since that is the rate at which the inputs of chip U10 are read, which inputs include the D6 input connected to the fire supervise conductor. But trouble with the fire loop is communicated to the central station on every poll, whereas the central station can learn of a problem in the terminal fire-detection mechanism only in response to a diagnostic test command.

Figure 7:
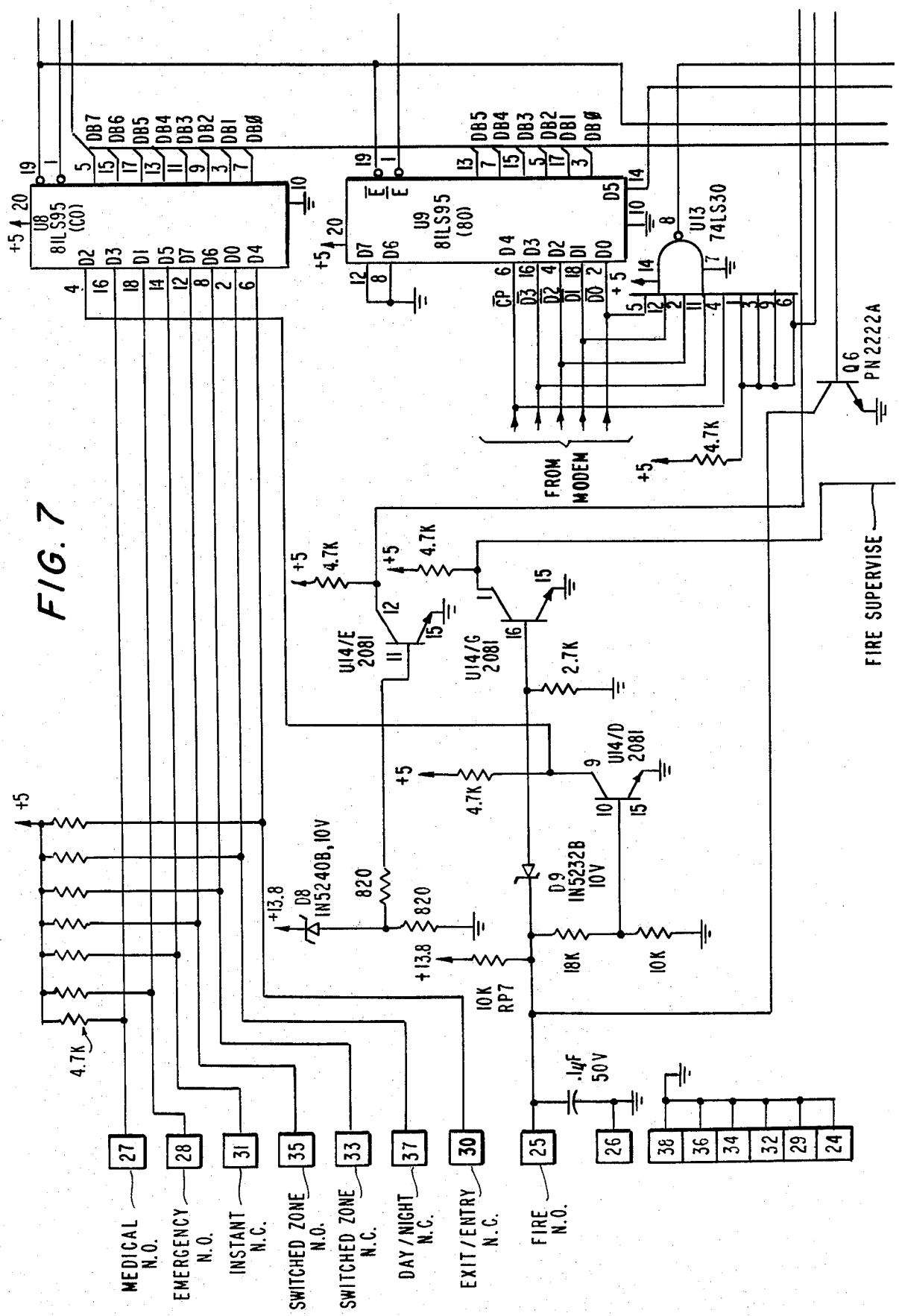

Transistor U14/G on FIG. 7 allows the microprocessor to determine the condition of the fire sensor loop, and transistor U14/D is used for detecting a fire alarm condition. Transistor Q6 is used to simulate a fire alarm condition during either type of fire test. There is one other transistor on FIG. 7, transistor U14/E, and it is used to check whether the battery potential too low. The output of regulator VR1 on FIG. 9 powers the 13.8-volt bus. As long as AC power is present and the potential on the bus is above 10.6 volts, Zener diode D8 on FIG. 7 conducts and transistor U14/E stays on. In such a case, the collector of the transistor is returned to ground through the transistor. But if AC power is lost, and the potential of the battery—which now powers the bus—drops below 10.6 volts, the Zener diode turns off and the collector of transistor U14/E rises in potential. The collector is connected directly to input port bit P23 over the low-battery test line. It is in this way that the microprocessor can test directly the state of the battery in order to develop a low-battery supervisory code if there is trouble with the battery. The low-battery supervisory code should be distinguished from the AC power supervisory code. The latter is determined by the potential at the junction of resistors RP1 and RP3 on FIG. 9, this junction being connected to input D5 of chip U9. As long as AC power is available and the potential at input D5 of chip U9 exceeds 1.9 volts, when the inputs of chip U9 are read by the microprocessor it determines that AC power is available. But if input D5 of chip U9 drops below 1.9 volts, on reading the inputs of chip U9 the microprocessor determines that AC power has been lost and an appropriate supervisory code is sent to the central station.

Thus far, only one input (D5) of chip U9 on FIG. 7 has been described, the input which allows the microprocessor to determine whether AC power has been lost when the chip is accessed. Five other inputs of chip U9 are connected to the $\overline{D0-D3}$ and $\overline{CP}$ outputs of the modem, and it is by accessing chip U9 that the microprocessor learns which command has been transmitted by the central station (or whether a proper alarm code has been echoed). The microprocessor accesses chip U9 as soon as the modem receives a message from the central station because at the same time that the D0-D3 and CP outputs of the modem are changed to reflect the latest message, the RD strobe output of the modem is pulsed high. Since this conductor is connected to the interrupt input of the microprocessor (see FIG. 11), its trailing edge immediately notifies the microprocessor to access chip U9. Although there are two other inputs available at chip U9 (D6 and D7), they are not required and for this reason pins 8 and 12 are simply grounded.

The D2 input of chip U8 has already been described; it represents a fire alarm condition. The other seven inputs of the chip are connected respectively to the medical, emergency, instant, switched zone, day/night and exit/entry terminals of FIG. 7. Thus it is when chip U8 is accessed that the microprocessor learns of the various sensor states.

It should be noted that the five inputs from the modem are connected on FIG. 7 to respective inputs of NAND gate U13, the other three inputs of which are held high. If all of the $\overline{D0-D3}$ and $\overline{CP}$ inputs are high (representing a reset code of 00000), the output of gate U13 goes low. As described above, the reset pulse is extended through capacitor C13 on FIG. 9 to the base of transistor Q5, and following the transmission of another command by the central station, at which time the output of gate U13 goes high, the microprocessor is reset.

All eight of the port 1 bits of the microprocessor are used as outputs. All eight of these outputs, along with output port bit P27, are extended to FIG. 12 for controlling respective functions, as follows:

P10—After buffering in chips U4 and U2, this output bit controls the state of relay K1 over the line-seize conductor.

P11—After buffering in chip U2 this output bit, at terminal 11, is connected over the cable between the remote and control units to the status light in the remote unit.

P12—After buffering in chips U4 and U2, this output bit controls the operation of pre-alarm buzzer DS1 in the control unit. It is also extended to terminal 12, from which it is connected to a corresponding buzzer DS2 in the remote unit.

P13—After buffering in chip U3, this bit appears on terminal 9, from which it is extended to the remote unit to control the interior protection light, as well as controlling the light-emitting-diode LED2A interior protection light on the control unit panel.

P14—After buffering in chips U4 and U2, the potential at this output of the microprocessor controls operation of dial relay K2 on FIG. 9.

P15—After buffering in chip U2, this bit output controls the fire trouble light-emitting-diode LED3A on the control unit panel.

P16—After buffering in chip U2, this bit controls the state of the AC power light-emitting diode LED1A on the control unit panel.

P17—After buffering in chip U2, this bit value appears at terminal 10, from which it is extended to the remote unit to control the "on" light.

P27—This bit output controls operation of an external 555 timer, chip U1, whose output, in conjunction with transistors Q1 and Q4, controls driving of the siren.

Output bit P27 is normally low in potential to hold the 555 timer in the reset state. When it goes high, to apply a positive potential to reset pin 4 of timer chip U1, output pin 3 is no longer held low. Whenever pin 3 is low, pin 7 is low with it to allow capacitor C12 to discharge. When the capacitor discharges to the point at which pin 2, to which it is connected, is at a potential below one-half that of pin 5, output pin 3 goes high. Pin 7, instead of presenting a low impedance path to ground, now presents a high impedance path so that capacitor C12 starts to charge from the 5-volt supply. When the voltage at pin 6, to which the capacitor is also connected, rises to a level equal to that of the potential at pin 5, output pin 3 goes low once again and pin 7 once again presents a low impedance path to ground. Thus it is apparent that the potential at pin 5 determines both the charge and discharge times of capacitor C12, that is, the frequency at which a square wave is developed at output pin 3.

To generate the burglary/emergency "warbled" siren sound, port bit P27 is held high, but approximately once per second it is pulsed low momentarily. The momentary negative pulse from the microprocessor turns on transistor Q2. This causes capacitor C4 to be shorted across the transistor so that it discharges; the turning on of transistor Q2 also causes transistor Q3 to turn on and to apply a maximum potential to pin 5 of the timer, which thus causes the timer to start oscillating at the lowest rate. As soon as transistor Q2 turns off, however, with termination of the momentary negative P27 pulse from the microprocessor, capacitor C4 starts to charge from the 5-volt supply through resistor R8, in parallel with the base-emitter circuit of transistor Q3. As the capacitor charges, there is less and less base drive to transistor Q3 so that the emitter potential of the transistor gets lower and lower. Consequently, the rate at which the 555 timer oscillates increases.

The emergency and burglary siren sound is "warbled" in that the siren sound increases from a minimum frequency to a maximum frequency, and then starts over once again. The minimum and maximum potentials at pin 5 of the timer cause the frequency of the timer to increase from about 500 Hz to about 1 kHz, and the rate at which capacitor C4 charges controls this increase in frequency to take about 1 second. Consequently, as long as the microprocessor applies a momentary negative pulse to output port bit P27 once every second, what is heard is a continuous warbled sound.

The fire sound, on the other hand, is at a constant frequency of 1 kHz. Instead of pulsing output port bit P27 low momentarily once every second, the microprocessor keeps the output bit high continuously—for as long as the siren is to be sounded. When the output bit first goes high, the emitter of transistor Q3 is at its highest possible potential because until the siren is to be sounded the output bit is low, capacitor C4 is held discharged, and there is maximum base drive to transistor Q3. Thus the frequency of the timer is initially 500 Hz. But it takes only about 1 second before the frequency rises to 1 kHz. Because the output bit from the microprocessor remains high, capacitor C4 now remains charged and the minimum possible potential at the emitter of transistor Q3 persists indefinitely. Consequently, after a 1-second rise in frequency from 500 Hz to 1 kHz, the timer oscillates continuously at the highest rate.

Output pin 3 of the timer is initially low since the timer is held in the reset state when the siren is not to be sounded. This causes transistor Q4 to remain off, and the collector of the transistor to be held at the 17-volt potential of the supply to which it is connected. This, in turn, holds transistor Q1 off so that the 17-volt potential is not extended to terminal 19, this terminal and ground terminal 20 being connected across an external siren (not shown). When pin 3 of the timer goes high, however, transistor Q4 turns on, and the low collector potential now turns on transistor Q1 to power the siren. Consequently, the siren frequency is the same as that which appears at output pin 3 of the timer.

Figure 14:
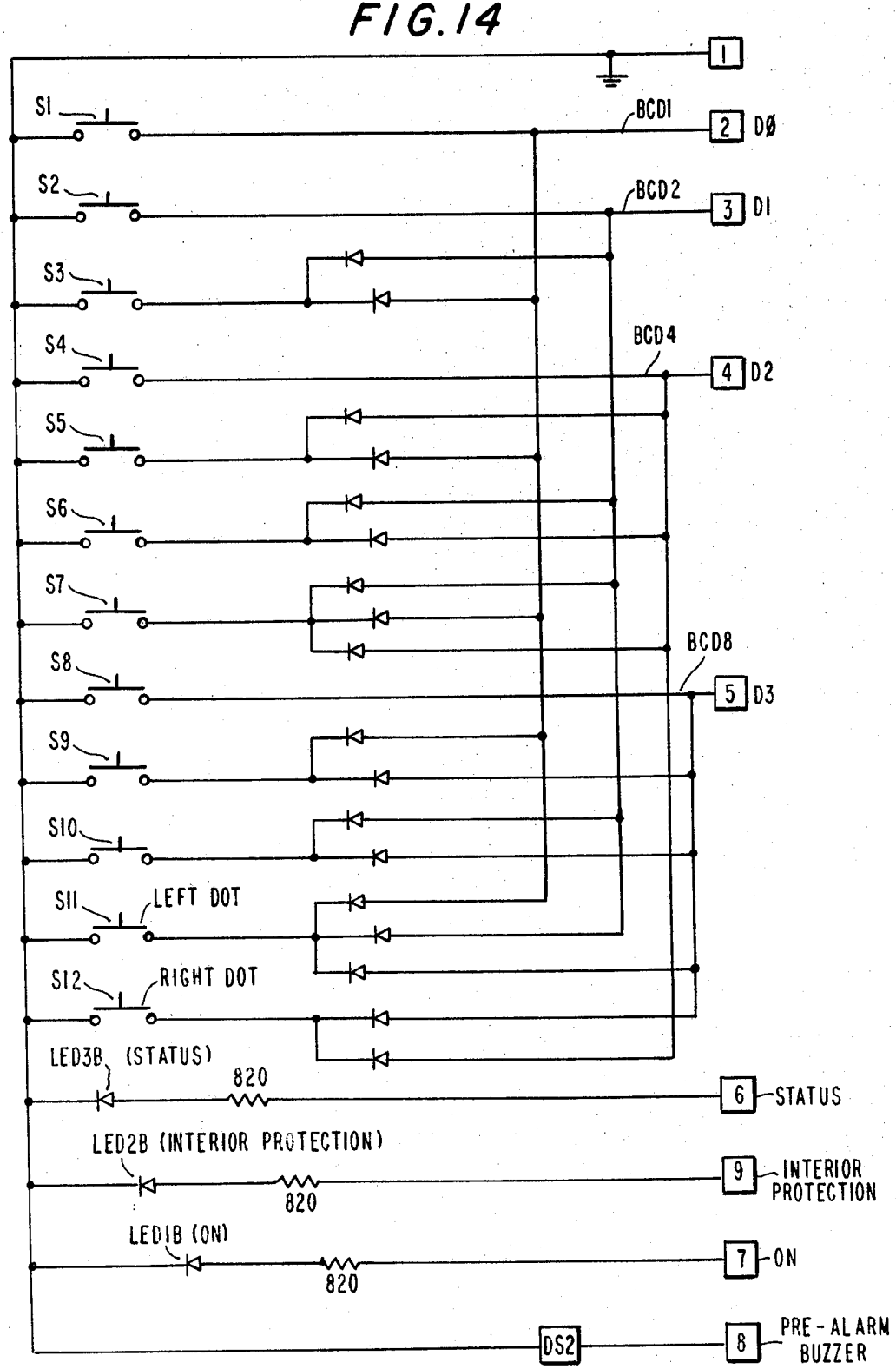
FIG. 14 is a schematic of the remote unit of the illustrative embodiment of the invention which is connected to the main control unit of FIGS. 7–12.

Status terminal 11 on FIG. 12 is connected over a cable to status terminal 6 on the remote unit of FIG. 14, for controlling operation of status light LED3B in the remote unit. Interior protection terminal 9 on FIG. 12 is extended over the same cable to interior protection terminal 9 on FIG. 14 for controlling interior protection light LED2B on the remote unit. Similarly, the third light in the remote unit, "on" light-emitting-diode LED1B, is controlled by connecting terminal 10 on FIG. 12 to terminal 7 on FIG. 14. The fourth connection is that of terminal 12 on FIG. 12 to terminal 8 on FIG. 14, for controlling pre-alarm buzzer DS2 in the remote unit. The remaining terminal 13 on FIG. 12 is connected to terminal 1 in the remote unit so that the two units have a common ground.

The only remaining terminals on the remote unit, terminals 2–5, are labelled D0–D3 and they are connected over the same cable to the same-labelled terminals on FIG. 8. As described above, bit values at the D0–D3 terminals represent a BCD code depending upon which key in the keypad is depressed. Referring to FIG. 8, it will be noted that terminals 14–17 are all returned to the five-volt supply through respective resistors. Referring to FIG. 14 it will be noted that with each of the keypad switches S1–S12 open, terminals 2–5 float. Consequently, with no key operated, all of terminals 14–17 on FIG. 8 are at high potentials to indicate that no key has been operated. But when one of the twelve keys is depressed, the ground potential at terminal 1 on FIG. 14 is extended through isolating diodes to those of the BCD1–BCD8 lines which must be forced low to represent the corresponding BCD code for the operated key. As a single example, consider the operation of switch S11 which corresponds to the left dot key on the keypad. (Switches S1–S9 correspond to keys 1–9, switch S10 corresponds to key 0, and switch S12 corresponds to the right dot key.) A ground potential is extended through switch S11 and the three connected diodes to conductors BCD1, BCD2 and BCD8. These three conductors are thus forced low, while only conductor BCD4 is maintained high by its connection to terminal 16 on FIG. 8. With 1 bits (low potentials) on the three of the four BCD conductors corresponding to digits 1, 2 and 8, it is apparent that a BCD code of decimal 11 is inputted to the microprocessor when buffer U10 is accessed.

It was described above that the microprocessor controls inputting of the data bit values applied to buffers U8, U9 and U10 (FIGS. 7 and 8) by controlling reads at respective addresses C0, 80 and A0. The manner in which this is effected, as well as the manner in which the microprocessor controls storage of a 5-bit code in the modem for transmission to the central station on a poll, the fetching of instructions from program memory chip U7, and the reading of data from PROM chip U16 will now be described with reference to FIGS. 7, 8, 10 and 11.

In fetching an instruction from the program memory, the microprocessor outputs a 12-bit address on the data bus and at port outputs P20–P23. Since program memory chip U7 contains only 2,048 bytes, the most significant address bit (at pin P23) is not required; because this port bit is used as an input to monitor the state of the battery, and because a port bit of the 8035 chip must be set high in order for it to serve as an input, the port bit is set and kept high. Although it goes low on every instruction fetch, the microprocessor automatically causes it to revert to its previously set condition at the end of every instruction fetch.

In order to fetch an instruction, an 11-bit address must be furnished to the program memory. Because the three port bits are not used for anything other than instruction fetches, there is no need to latch their bit values. But because the bus lines are used not only for transmitting eight bits of the address but also for receiving the resulting instruction byte from the program memory, the address bits on the bus are no longer available by the time the instruction byte is to be outputted. Consequently, a mechanism must be provided for storing the eight least significant address bits during the first part of an instruction fetch. During this first part of the cycle, the ALE (address latch enable) output of the microprocessor is high, and after a double inversion by chips U4, clock pins 4 and 12 of both four-bit latches U6 and U11 are pulsed high. Four respective address bits on the 8-bit bus are extended to the inputs of each of latches U6 and U11. At the trailing edge of the ALE pulse, the eight address bits are latched in chips U6 and U11, and they appear at the outputs of the latches on address lines A0–A7.

The upper three address bits appear on address lines A8–A10. Consequently, an 11-bit address appears on the address bus, all eleven bits being applied to the address inputs of program memory chip U7. After the address lines settle and the ALE pulse has terminated, the $\overline{\text{PSEN}}$ output goes low. This output is connected to the enable input of chip U7, so that the memory chip outputs the byte at the addressed location on the 8-bit data bus. By this time the microprocessor no longer applies address bit values to the bus, since the bus is made to float before the $\overline{\text{PSEN}}$ pin is pulsed low. At the rising edge of the $\overline{\text{PSEN}}$ pulse, the microprocessor inputs the instruction byte which appears on the data bus lines DB0–DB7. During an instruction fetch, the $\overline{\text{WR}}$ and $\overline{\text{RD}}$ outputs of the microprocessor both remain high and thus have no effect on decoder U15, all of whose outputs remain high. Program memory chip U7 comes into play only during an instruction fetch, and it plays no part during read and write cycles, when the $\overline{\text{PSEN}}$ output remains high.

Chip U15 comprises two 2-to-4 line decoders. Address bits A5 and A6 are used as the select inputs for each of the decoders, and which decoder operates depends on which of the G1 and G2 inputs is enabled. On a read, when the RD microprocessor output goes low to enable the G2 input of chip U15, one of outputs 2Y0–2Y3 goes low depending upon the values of the A5 and A6 inputs. Only two of the 1Y0–1Y3 outputs of chip U15 are shown because not all of them are required. The G1 input is enabled when the microprocessor performs a write operation and the $\overline{\text{WR}}$ output is pulsed low, at which time address bits A5 and A6 are once again used, this time to determine whether output 1Y0 should go low. (The reason for showing the 1Y1 output will be described below.)

Consider first a write operation. The three buffers U8, U9 and U10 are accessed on read operations because the microprocessor must read the data bits furnished to these chips. Similarly, PROM chip U16 is accessed on a read operation when the microprocessor has to determine the master code, telephone number to be dialed, or station identification number contained in this memory chip. There is only one "write" operation which must be performed and that relates to the outputting by the microprocessor of a 5-bit code for delivery to the modem, so that the modem can subsequently transfer it to the central station over the cable when it is polled. The write operation does not consist of writing to a memory, but rather simply delivering a 5-bit code to output conductors A–E on FIG. 10. Chip U12 controls this operation.

The chip is a HEX D-type flip-flop. That is, it contains six individual D-type flip-flops. The chip is clocked on the rising edge of a pulse applied to clock pin 9. It will be noted that chip U12 bears the label (00) which indicates that it is accessed by writing at address 00. (As described above, the address at which any read or write operation is to be performed is stored in latches U6 and U11 at the start of the cycle by the ALE pulse.) Actually, chip U12 could be accessed by the microprocessor outputting any address whose A5 and A6 bits are both 0, because as long as both of these address bits are 0 when the $\overline{\text{WR}}$ output is pulsed low to enable the G1 input of decoder U15, the 1Y0 output goes low. At the trailing edge of the $\overline{\text{WR}}$ pulse, when the 1Y0 output goes high, chip U12 is clocked and the five data bits on lines DB0–DB4 are clocked into five of the six flip-flops in chip U12. But since any write operation requires an address, some address must be assigned to control operation of chip U12, and HEX address 00 was selected—even though the only "hardware" requirement is that the address contain A5 and A6 bits which are both 0. At the end of the write operation, the 5-bit code outputted by the microprocessor appears at the five outputs of chip U12, also labelled DB0–DB4. These outputs remain available on lines $\overline{A-E}$, and until they are changed constitute the message to be sent to the central station.

It should be noted that in FIG. 10 chip U15 is shown as having a 1Y1 output (pin 5) which is not connected to any other circuit elements. This is because there is only one type of "write" operation which is required of the terminal and that is to store an outputted 5-bit code in chip U12. However, it is contemplated that the security terminal will in the future be modified to accommodate other types of control. For example, depending on certain codes received from the central station and/or various sensors in the home, the terminal could operate different devices for energy and environment management. To operate these devices would require write operations by the microprocessor. For example, an 8-bit byte could be outputted during a "write" operation for storage in another set of flip-flops, the flip-flops perhaps controlling the states of eight respective relays. The provision of chip U15 allows up to three separate groups of eight flip-flops each to be loaded in this manner. For example, the 1Y1 output of chip U15 could be used to clock one set of flip-flops if address bit A5 is a 1 and address bit A6 is a 0. With outputs 1Y1–1Y3 being available for future use, it is apparent that no additional control hardware would be required (other than storage flip-flops) to control up to 24 additional output devices. All that would be required would be to select three respective addresses (whose A5 and A6 bits represent the codes 01, 10 and 11, code 00 already being used to select the 1Y0 output of chip U15), for storage of outputted bytes in three chips comparable to chip U12.

All four of the 2Y0–2Y3 outputs of decoder U15 are utilized because four different chips must be accessed during "read" operations, when the G2 enable input is forced low. These four chips are buffers U8, U9 and U10 and PROM U16. The following table represents which of the four 2Y0–2Y3 outputs of chip U15 is forced low (selected) for each of the four possible combinations of the A5 and A6 bits on a read operation:

| A5 | A6 | OUTPUT |
|---|---|---|
| 0 | 0 | 2Y0 |
| 1 | 0 | 2Y1 |
| 0 | 1 | 2Y2 |
| 1 | 1 | 2Y3 |

Address bit A7 is inverted by chip U4 and it is applied to pin 19, one of the enable inputs, of each of buffers U8, U9 and U10. Consequently, each of these chips can be selected only if address bit A7 is a 1, since the enable inputs of these chips must be low for the chips to extend their inputs to their outputs. The 2Y0, 2Y1 and 2Y2 outputs of decoder U15 are connected to the second enable input of respective ones of the buffers. For example, consider buffer U9. This chip is enabled only when the 2Y0 output of decoder U15 is low (address bits A5 and A6 are both 0), and address bit A7 is a 1. The following chart depicts the values of address bits A5–A7 which are required for selection of each of buffers U8, U9 and U10.

| A5 | A6 | A7 | CHIP SELECTED |
|---|---|---|---|
| 0 | 0 | 1 | U9 |
| 1 | 0 | 1 | U10 |
| 0 | 1 | 1 | U8 |
| 1 | 1 | X | U16 |

It should be noted that chip U16 has only one enable input, which is connected to the 2Y3 output of decoder U15. Consequently, address bit A7 plays no part in the selection of chip U16.

In order to select chip U9 on a read operation, address bits A5 and A6 must both be 0, and address bit A7 must be a 1. Considering only the four least significant address bits, with the least significant address bit being on the right, any address of the form 100XXXXX will result in selection of chip U8. The particular address which has been selected is 10000000—80 in HEX notation. It is for this reason that chip U9 is shown in the drawing as being accessed by HEX address 80.

The address bits required to select chip U10 are 101XXXXX. The particular address selected was 10100000—HEX address A0.

Chip U8 requires for its selection any address of the form 110XXXXX. Address 11000000 was selected, HEX address C0 being shown in the drawing as the access address for chip U8.

Unlike chips U8–U10, chip U16, which contain 32 bytes of data, requires in addition to enabling of its pin 15 (by the 2Y3 output of decoder U15) five address bits for byte selection. Address bits A0–A4 are used for this purpose. Considering just the eight least significant address bits, it is apparent that a data byte will be read out of PROM U16 on any of addresses X11YYYYY, where the five Y bit values identify one of the 32 locations on the chip, and the X bit value may be either a 0 or a 1, as described above, since address bit A7 is not used to select chip U16. In the illustrative embodiment of the invention, a bit value 0 has been selected for bit A7 for each of the 32 addresses which access chip U16. Since bit A4 can be a 0 or a 1 depending on the particular byte to be accessed in the PROM, it is apparent that any HEX address of the form 6X (0110—) or 7X (0111—) will access a data byte in the PROM, where X in each case can be any of the 16 HEX values.

It should be noted that address bit A7 really serves no function in the illustrative embodiment of the invention. Although it is inverted and used to enable chips U8, U9 and U10, pins 19 of these chips could be tied permanently to ground since the selection of the value of A7 to access the three chips is completely arbitrary. However, bit A7 is used as it is with future expansion in mind. In an energy management scheme, for example, it would be necessary for the microprocessor to read in data bits corresponding to the states of various sensors or manual inputs. Three additional buffers, PROMS, etc. could be accessed without requiring any additional control hardware. All that would be required would be to connect each of the 2Y0–2Y2 outputs of docoder U15 to a select input of a respective one of these additional chips, with the A7 bit being connected to another select input on each of the chips. Because the A7 bit is inverted and must be a 1 to select one of chips U8–U10, bit A7 (without inversion) could be used to select one of the additional four devices. The decoder would thus select a particular device in each group, while it would be bit A7 which selects one of the two groups.

Thus the system has been designed with future expansion in mind. Input and output devices may be accessed on an individual basis if they are added, without requiring any additional decoding or select hardware.

The Security Terminal Firmware

The flow charts of FIGS. 15A-18B depict the functional steps performed by the security terminal. An assembled source listing, i.e, the actual program memory code, is included at the end of this application, and will be discussed below. Almost all of the functions controlled by the actual firmware are depicted in the flow charts. For reasons which will become apparent below, the flow charts do not conform to the precise sequences executed under control of the firmware. In other words, the flow charts depict what happens in terms of gross functions, and not exactly how the individual functions are accomplished. But the functional sequencing of the terminal can be best understood by considering the flow charts.

Figure 15A:
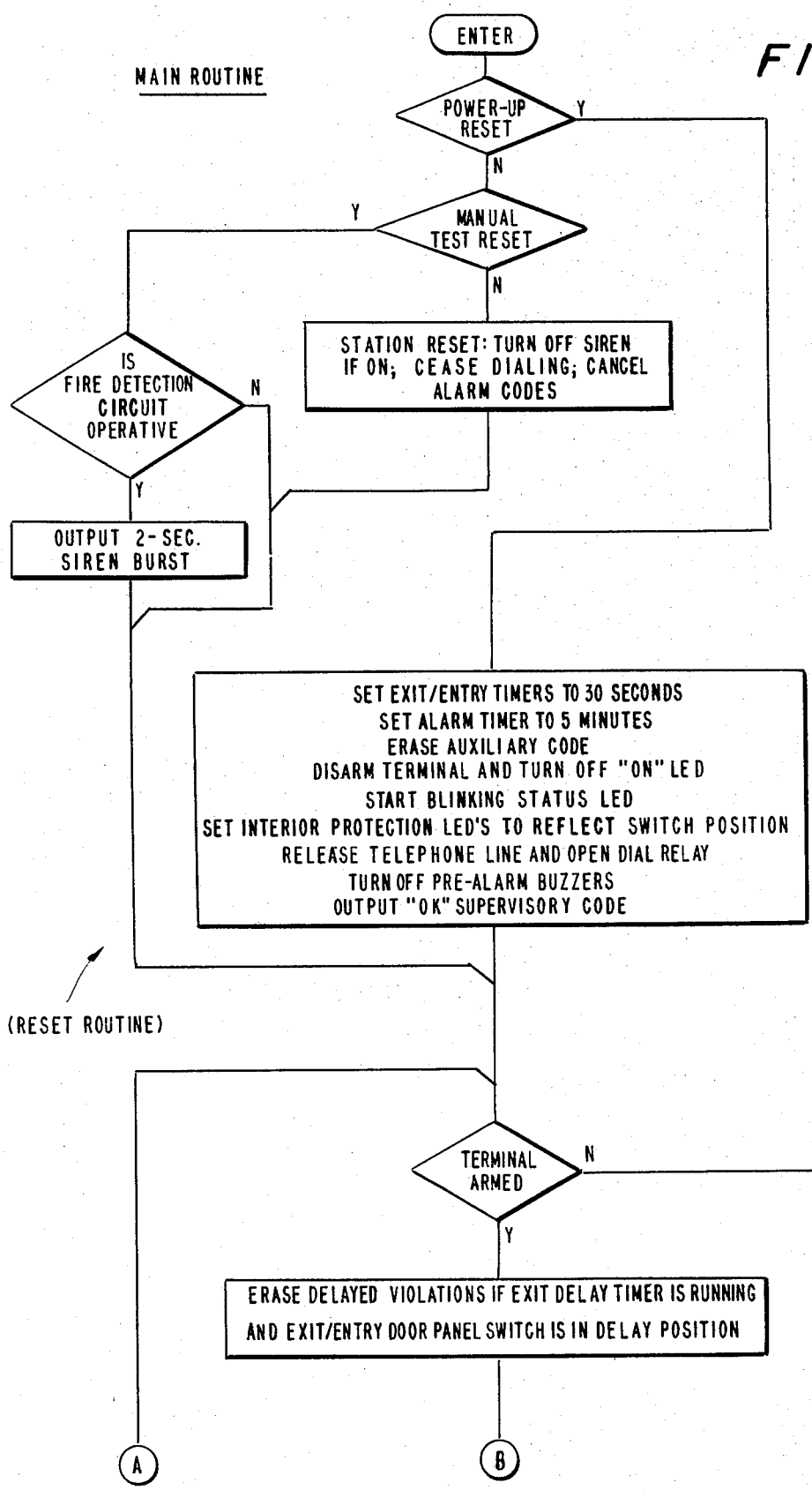

FIGS. 15A-15D inclucde the main routine, or main loop which is repetitively executed. The three other flow charts depict what happens on a keypad entry and a telephone back-up call, as well as what ensues on an interrupt generated by a central station poll. The first part of the main routine, as indicated on FIG. 15A, shows what happens when the system is reset.

There are three kinds of reset—power-up, manual (system test), and central station. After the reset routine is entered, one or two tests are performed to determine the type of reset. As described above, the T1 test input bit together with a byte stored in one of the 64 RAM locations on the microprocessor chip distinguish between the three reset originations.

If the microprocessor determines that what is involved is a power-up reset, several separate actions are taken. First, the exit, entry and siren intervals are set to the default values—30 seconds, 30 seconds, and five minutes, respectively. Even if one or more of these intervals was previously set to a different value by the homeowner, the default time intervals now apply. To indicate to the homeowner that a power-up reset has occurred and that the default parameters are now controlling, the status light on the remote unit starts to blink. It continues to blink until the first time that the master code is inputted.

Similarly, any previously set auxiliary code is erased, the blinking status light also informing the homeowner that it is now only the master code which will be recognized.

Even if the system was previously armed, it is now disarmed. Thus the "on" light on the remote unit is turned off, if it was previously on. Although not indicated in the flow chart, disarming of the system also results in the siren turning off if it was previously on.

Depending on the position of the interior protection switch, the interior protection lights on the control and remote units are turned either on or off. Also, if the telephone line was previously seized, it is now released; similarly, the dial relay K2 is energized and caused to open its contacts (the normal position). If the pre-alarm buzzers were previously on, they are now turned off.

When power is first applied to the security terminal, if precautions are not taken it is possible that an alarm message or erroneous supervisory code will be extended to the modem for transmission to the central station on the next poll. In order to prevent an erroneous transmission, the system automatically outputs an "OK" (normal response) supervisory code to the modem. Even though an alarm condition may exist or there may be trouble with the system, it is not until the system actually determines this that the appropriate message is supplied to the modem. The delay in transmitting the proper code is very short; what is involved is at most a few seconds—the time between successive polls of the security terminal. But by automatically setting the first message to be a normal response, an erroneous code cannot be transmitted when power is first applied to the system.

On a central station reset, which the system determines has taken place if the reset is due neither to a power-up condition nor the performance of a system (manual) test by the homeowner, any dialing in progress is aborted, any alarm code previously set is cancelled, and the siren is turned off if it was previously on. But previously set time intervals and an auxiliary code are not erased. Similarly, the terminal is not disarmed if it was previously armed, nor is the status light caused to blink. A central station reset results in those actions associated with turning off of the siren which would be appropriate, for example, should the homeowner be out of the house so that the master code cannot be inputted to shut off the siren, and it is otherwise determined that the siren should be turned off, e.g., the police have responded to the alarm report.

A manual test reset does not result in any of the functions associated with the two other types of reset. The terminal operation is not changed. Instead, all that happens is that the fire detection circuit is tested (along with the back-up battery) as described above, and if it is in working order the siren is blasted for two seconds.

The main processing loop begins at the bottom of FIG. 15A. A return is made to the start of the main loop from the end of the main loop, as indicated at the bottom of FIG. 15D. The system first checks to see whether the terminal is armed. If it is not, all of the tests and other functions associated with the intrusion sensors are skipped, and a branch is taken to the middle of FIG. 15B at which time tests are performed to see whether emergency, medical or fire alarm conditions exist.

If the terminal is armed, however, the system first insures that any intrusion violation registered by the exit/entry door being open is ignored—provided the exit delay function is indicated by the associated switch and the delay interval has not timed out; during the exit delay, operation of the exit/entry door sensor is ignored. Even through accessing of the data bits applied to buffer U8 may indicate that the exit/entry door is open, if the exit delay interval is in progress, and if the exit/entry door switch on the control unit is in the delay position, the violation is ignored.

Figure 15B:
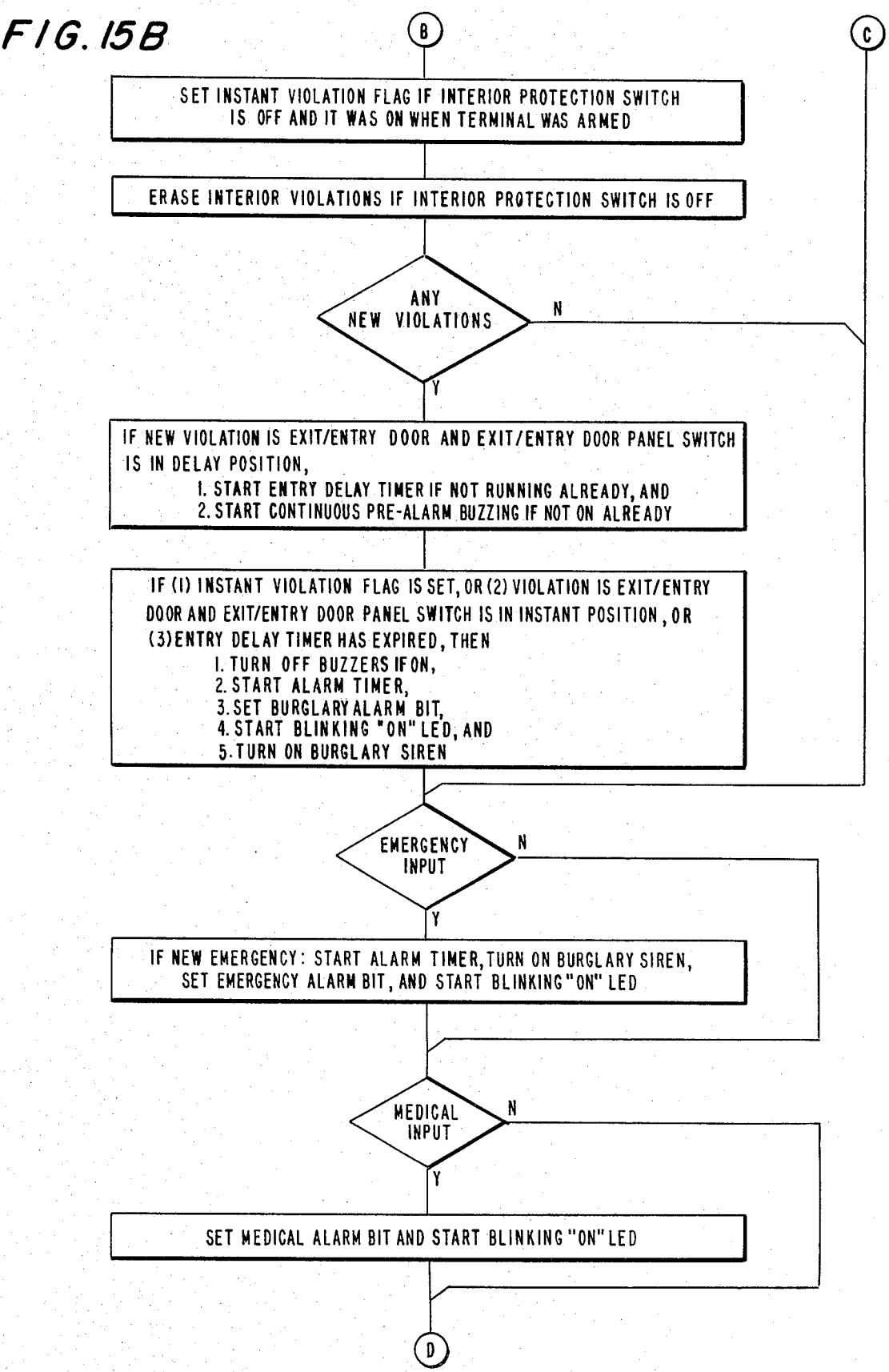
Figure 15C:
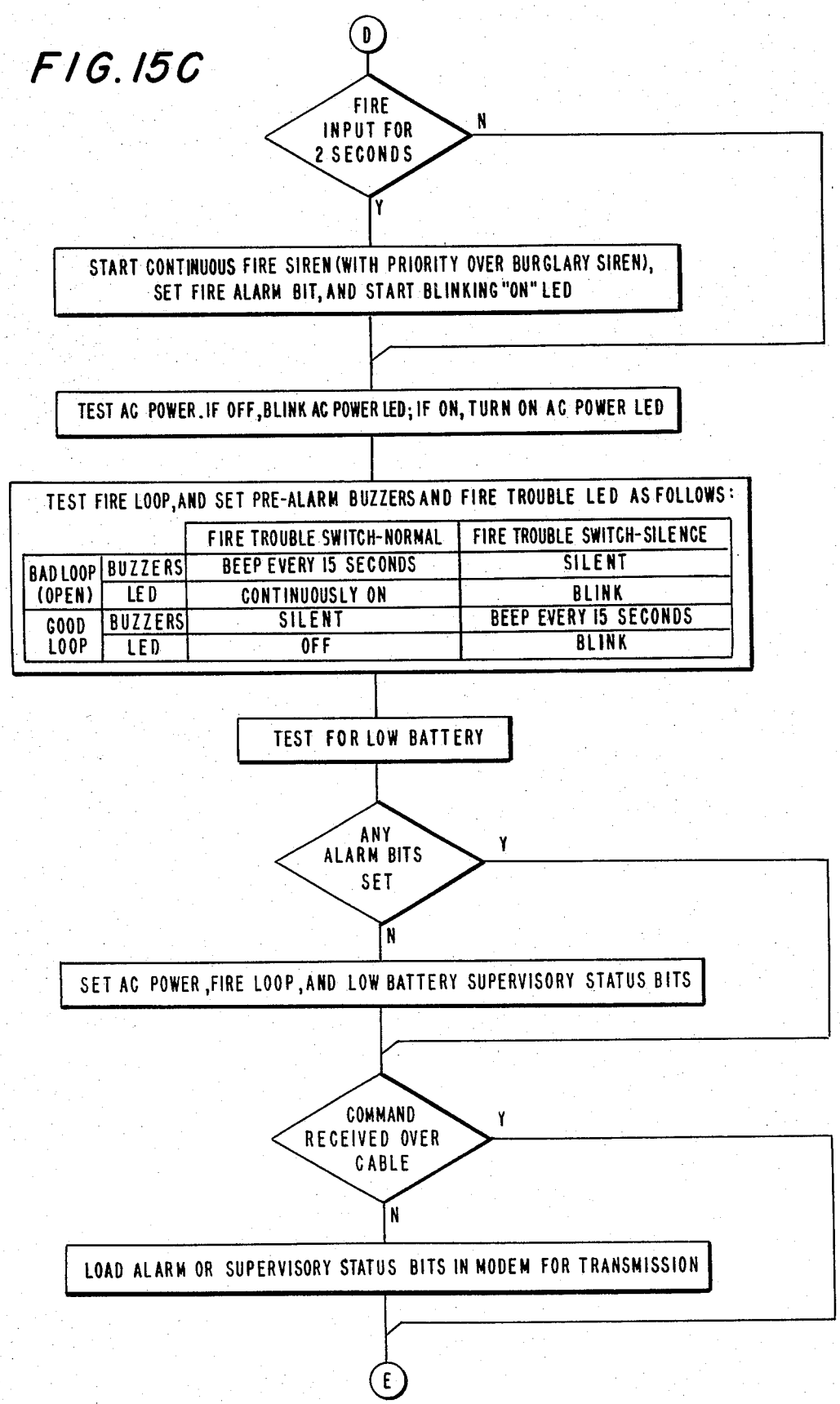
Figure 15D:
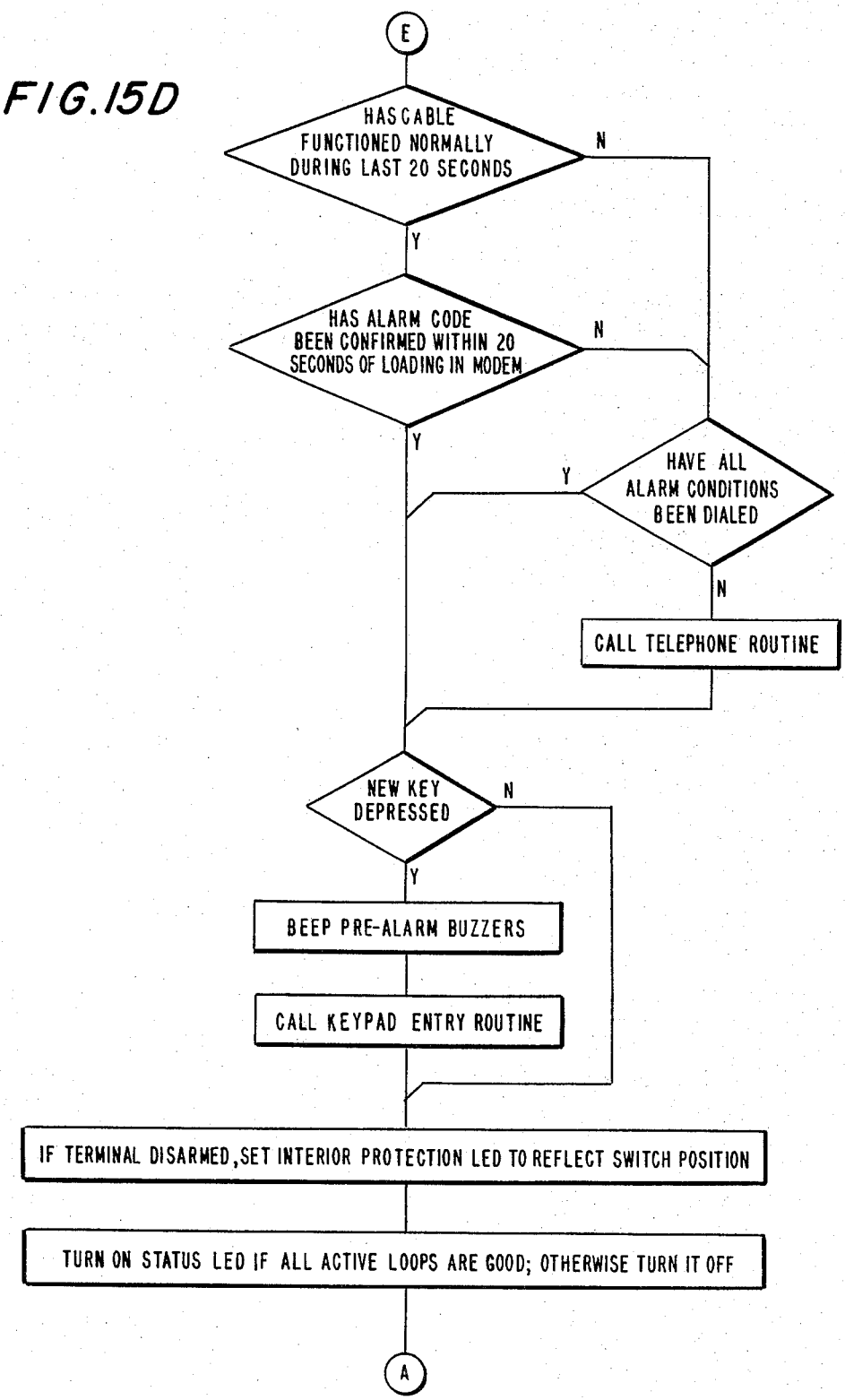

Referring to FIG. 15B, the microprocessor maintains an "instant violation" flag which represents whether the interior protection switch has been turned to the "off" position, if it was in the "on" position when the system was first armed. It will be recalled that this condition should result in the generation of an alarm, in order to protect against a thief who was hiding in the house when the homeowner exited and who turns off the interior protection switch thinking that he will then be free to move around inside the house. If the condition is detected, an "instant violation" flag is set so that it can be used a fraction of a second later to generate a burglary alarm code.

During scanning of the various alarm inputs via buffer chip U8, the microprocessor determines, among other things, whether any of the sensors associated with interior protection devices (coupled to the two "switched zone" terminals on FIG. 7) have been operated, just as it determines whether any of the other intrusion sensors have been operated. But if the interior protection switch is off, the microprocessor ensures that an interior violation will not result in the generation of an alarm code.

The microprocessor then examines the intrusion violations to determine whether any new ones have occurred since the last pass through the main loop. If there are no new violations, a branch is taken to that step which checks whether there is another type of new alarm input. There is no need to change the burglary alarm code bit in an alarm code message even if it was previously a 1; the same alarm code message should be transmitted. But if a new violation has been detected, the system takes several actions.

The first thing that must be done is to check whether the new violation is that of an open exit/entry door. If it is, and the exit/entry door switch is in the delay position, an alarm code is not immediately generated. It will be noted that after the initial test to determine whether the terminal is armed, the system causes any exit/entry door violation to be ignored if the exit/entry door switch is in the delay position, and the exit delay interval is in progress (see bottom of FIG. 15A). The steps now under consideration take into account what happens when the open exit/entry door condition is first detected, i.e., the "any new violation?" test is answered in the affirmative. The new violation cannot be the result of the opening of the exit/entry door during the exit delay interval because such a violation is ignored. Consequently, the violation must be the result of opening the exit/entry door upon the homeowner's return, and thus the entry delay timer is started. At the same time that the entry delay interval is started, the two pre-alarm buzzers are made to sound continuously to indicate that the master code must be inputted in order to prevent generation of an alarm. (The flow chart indicates that the entry delay timer starts running only if it was not running already. It could have been running, even when the exit/entry door was closed, if it was started by operation of one of the sensors in the switched-zone loop connected to terminal 35 of FIG. 7 in the event the interior protection switch was in the on position.)

The system then checks to see whether an alarm code should be generated and the burglary siren should be turned on. Three conditions can result in the generation of a burglary alarm. First, if the instant violation flag was previously set, a burlgary alarm condition exists. Second, if the violation is at the exit/entry door and the exit/entry door switch is in the instant position (i.e., there are no delay intervals), an alarm code must be generated as soon as the door is opened. Third, if the entry delay timer has timed out without the master code having been inputted (as will become apparent below, inputting of the master code resets the entry delay timer, as well as the exit delay timer and the siren timer), an alarm code should be generated. Five steps are now taken. There is no longer a need for the pre-alarm buzzing, so the two buzzers are turned off if they were previously on (they would be on at this stage only if the entry delay interval was in progress as a result of the exit/entry door having been opened and the exit/entry door switch having been in the delay position). The alarm timer is now started to control how long the siren blasts. A burglary alarm bit is set in the internal memory, for subsequent transmission to the central station. (Although not indicated expressly in the flow chart, the burglary alarm bit is also set if the new violation resulted from a sensor in any of the other active burglary loops having been operated.) The "on" light on the remote unit panel starts to blink, to indicate that an alarm condition exists; as mentioned above, although this is not really necessary since the blasting of the siren is indication enough that the system has recognized an alarm condition, the "on" light blinks on all four types of alarm condition even though it is really necessary only in the case of a medical alarm condition when it serves as the sole feedback to the homeowner that his alarm input has been recognized. (The blinking "on" light also serves to indicate that there was an uncleared alarm condition even after the siren has stopped sounding.) As indicated in the flow chart, the siren is also turned on, the burglary "warbled" sound being generated instead of the fire continous tone.

After the sequence relating to burglary monitoring has been completed, or if it was skipped as a result of the terminal not having been armed in the first place, the system checks whether an emergency alarm has been inputted by the homeowner on the keypad or by operation of the special emergency switch (see FIG. 6). If an emergency condition has been inputted for the first time, the alarm timer is started, the burglary siren is turned on, an emergency alarm bit is set in the RAM memory, and the "on" light starts to blink. It should be noted that all four alarm test sequences set respective alarm bits if respective alarm conditions exist; these bits are later examined when the microprocessor decides whether an alarm code should be formed.

The next test involves checking whether a medical alarm condition has been inputted via the keypad or the special medical switch. If it has, a medical alarm bit is set, and the "on" light starts to blink. In this case, the alarm timer is not set because the siren is not turned on.

The fire test is a little bit different in that the system does not determine that a fire alarm condition exists as soon as one of the sensors in the fire loop is operated. Instead, the system checks whether a fire alarm condition has existed continuously for two seconds. Transients affect the fire loop more than any other, and to prevent false fire alarms a fire condition must persist for two seconds before it is validated. If a fire condition does exist, the fire alarm bit is set and the "on" light starts to blink. The alarm timer is not set because in the case of fire the siren sounds continuously, until it is reset by the central station or the master code is inputted. In the event a burglary alarm condition also exists, the fire alarm has priority so that it is the continuous-tone fire sound which is heard, rather than the warbled tone which is generated in the case of a burglary condition.

Before actually deciding which type of message should be sent to the central station, the system determines not only which alarm conditions exist, but also whether there is a problem with the AC power circuit, the back-up battery or the fire loop (in which case an appropriate supervisory code may be transmitted). Which message has priority and is actually sent is decided later on, but all of the information pertaining to the status of the terminal is actually derived first. After checking on the four possible alarm conditions, the system checks the AC power circuit; as described above, this involves checking the level of the D5 input at buffer U9. After the AC power circuit is tested, as shown on FIG. 15C, the AC power light is blinked if, for one reason or another, there is no AC power being furnished to the system. If the AC power circuit is functional, the light is held on. The system also registers the condition of the AC power circuit for subsequent formation of a supervisory code.

The fire loop is next tested by examining the D6 input of buffer U10. In addition to registering the loop condition so that an appropriate bit may be set in a supervisory code if necessary, the system operates the pre-alarm buzzers and controls energization of the fire trouble light on the control unit panel, both as depicted in the chart on the flow chart of FIG. 15C. Although not shown in the flow chart, the fire detection circuit test is also performed during this mainline processing so that the fire test condition can be reported when the central station asks for it.

If the fire loop is good, that is, the loop is not open and the potential at terminal 25 (FIG. 7) has not risen to the point that transistor U14/G turns on and grounds input D6 of buffer U10, the buzzers are held off, and so is the fire trouble light. This assumes that the fire trouble switch is in its normal position, the usual case. But if the fire loop is bad, i.e., it is open, the buzzers beep once every fifteen seconds, and the fire trouble light stays on. In order to silence the buzzing, the homeowner moves the fire trouble switch to the silence position. As indicated on the chart, not only do the buzzers stop beeping, but the fire trouble light now blinks instead of staying on continuously. The blinking light serves as a reminder that there is trouble with the fire loop and that it must be repaired. Once it is repaired, the fire trouble switch should be returned to its normal position. As shown in the chart, if it is not switched back to the normal position, the buzzer starts to beep once again to inform the homeowner that he should return the switch to the normal position. As soon as he does, the beeping stops and so does the blinking of the fire trouble light.

After the AC power and fire loop tests are performed, the system tests for a low battery condition by examining input port bit P23, and an appropriate bit in the RAM memory is set if necessary. This concludes the testing for the four alarm conditions and the three potential circuit malfunctions.

The system now decides which message should be sent to the central station. If none of the four alarm bits has been set, then the supervisory status bits are used to form the message to be sent to the central station. It will be recalled that the normal response consists of a 10000 code, while the supervisory code has one or more of the 0 bits set to a 1. Consequently, when the supervisory status bits are set, the normal response code automatically results if there is no trouble with the security terminal circuitry itself. On the other hand, if one or more alarm bits are set, then the supervisory status bits are not used to form the message; instead the previously registered alarm bits are used to form the message which is to be transmitted to the central station.

The four commands transmitted by the central station consist of the normal security poll, and fire test, dialer test and reset commands. The test performed at the bottom of FIG. 15C checks whether a fire test or a dialer test command has been received. If it has, the appropriate fire test or dialer test diagnostic response is used to form the message. Otherwise, the alarm or supervisory status bits are loaded in the modem for transmission, with an alarm code having priority over a supervisory code.

Although the message is loaded in the modem for transmission to the central station, the terminal now checks whether the cable is functioning properly; if it is not, and if one or more alarm conditions exist, resort must be made to the back-up dialer. At the top of FIG. 15D, the system is shown as performing a test to determine whether the cable has functioned normally during the last twenty seconds, i.e., a test to see whether a normal security poll has been received during the last twenty seconds. If it has, the system checks whether a previous transmission of the same alarm code was confirmed within twenty seconds of its having first been furnished to the modem, i.e., whether the echo code was received on time. If both tests are passed, the system goes on to something new—to check whether a new key on the keypad has been depressed. But if there is trouble with the cable, and if an alarm condition exists, resort is made to the back-up dialer. It should be noted that if the cable has not functioned normally during the last twenty seconds, as soon as an alarm condition exists dialing commences. On the other hand, if the cable has been functioning normally, dialing does not begin unitl after twenty seconds have been allowed for an echo confirmation to be received. If during these twenty seconds an incorrect echo is received from the central station, dialing commences immediately.

The system maintains a list of the alarm conditions (a maximum of four) which exist, and which have already been dialed. The telephone routine deletes from the list any condition which is transmitted to the central station over the switched telephone network. After all of them have been sent, there is no need to call the telephone routine any more. Thus the system first checks whether all pending alarm conditions have been dialed. Only if they have not is the telephone subroutine called. The telephone subroutine itself will be described below.

The system then checks whether any new key has been depressed on the keypad in the remote unit. If it has, a confirming tone is fed back to the homeowner by momentarily beeping the pre-alarm buzzers. This reassures him that any message which he is inputting on the keypad is being recognized. If a new key has been depressed, the keypad entry subroutine is called, and this routine will also be described below.

The system now checks whether the terminal is disarmed. If it is, the interior protection lights on the control and remote units are set to reflect the interior protection switch position. It should be appreciated that if the terminal is armed, the interior protection lights reflect the position of the interior protection switch as of the time of arming. The system then turns on the status light on the remote unit if all of the active loops are good. By "active" loops is meant those loops which are involved in intrusion sensing; the two switched zone loops do not affect the status determination if the interior protection switch is in the off position.

A branch is then taken to the start of the main routine (following reset), at the bottom of FIG. 15A.

Figure 16A:
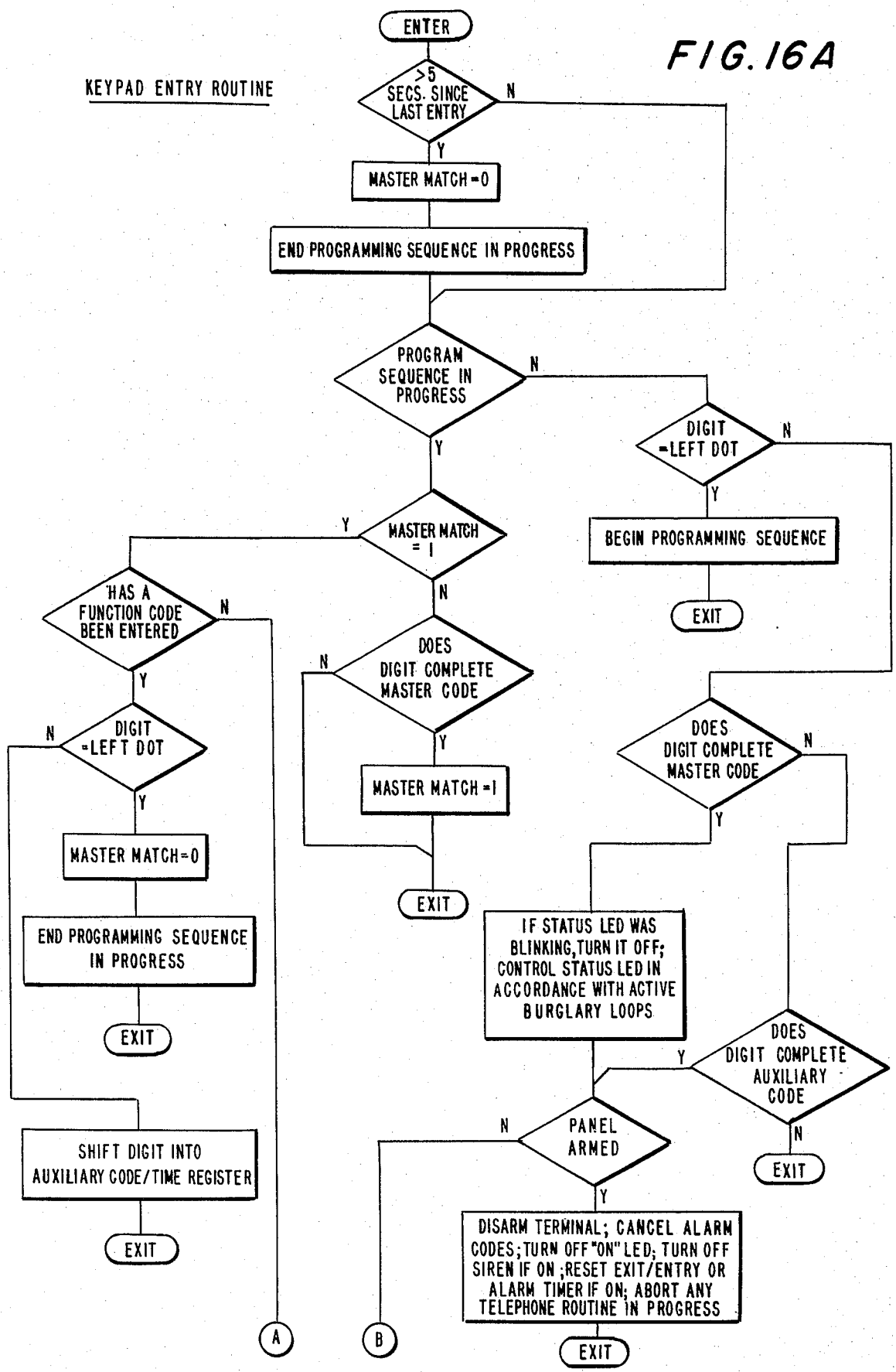

FIGS. 16A and 16B represent the sequence which is executed when the main routine determines that a new key has been depressed and calls the keypad entry subroutine. First, a test is made to see whether five seconds have elapsed since the last key entry. If the master code is inputted, it is immediately recognized and, as will be explained below, a Master Match flag is set to 1 and the appropriate actions are taken. But if five seconds have gone by since the last key was depressed, the Master Match flag is set to a 0. If the master code was previously inputted in order to arm or disarm the terminal, the appropriate action is taken well before five seconds go by, and there is no need to permanently register the fact that the master code was detected. The Master Match flag is also set to a 1 during a program sequence. But if the keys which must be depressed following master code inputting are not depressed for five seconds, whatever program sequence was in progress is terminated, and thus even in this case the Master Match flag must be reset if no key has been depressed for five seconds. For example, if the homeowner was in the process of changing one of the time intervals, and the sequence was aborted without a change having been effected, it is the absence of a new key entry for five seconds that terminates the sequence and wipes the slate clean.

A check is then made to see whether a program sequence is in progress. If it was terminated on the previous step as a result of five seconds having elapsed since the last key input, the answer is in the nagative. But if a program sequence is in progress (to change a time interval, or to enter or delete an alternate code), a test is performed to see whether the Master Match flag is a 1. A program sequence begins with depression of the left dot key, followed by inputting of the master code. If a program sequence is in progress, the left dot key must have been operated. But if the Master Match flag is a 0, it means that the master code has not yet been inputted even though code digits have been arriving at at least 5-second intervals. Thus the system checks whether the digit now inputted completes the master code. If it does not, an exit is made from the routine because at least one more digit must be checked to see if the master code is being inputted, and this digit will be checked the next time that the keypad entry routine is called. The system maintains a record of up to the last three digits entered so that it can determine when the master code has been inputted. When the master code has finally been inputted because the currently operated key is the correct fourth digit, the Master Match key is set to a 1 before an exit is made. The next time that the routine is entered upon depression of another key, and assuming that five seconds do not elapse so that the program sequence in progress is not terminated, the "Master Match=1" question will be answered in the affirmative, and a branch will be taken to the left.

When this branch is taken, the system checks whether a function code has been entered (one of the four digits which represent the particular parameter to be changed). If a function code has not been entered after the master code has been, as shown on FIG. 16B the system checks whether the currently operated key is one of the four valid function codes. If it is, it is recorded so that the next time the keypad routine is called the "Has a function code been entered" question can be answered in the affirmative. On the other hand, if a valid function code was not entered following the setting of the Master Match flag to a 1, and the new digit is not a valid function code, a proper program sequence is not being followed. As shown on FIG. 16B, the Master Match flag is reset to a 0 and the programming sequence in progress is aborted. For all intents and purposes, it is as though no keys were depressed.

But once a valid function code has been entered, and the "Has a function code been entered" question on FIG. 16A is answered in the affirmative, the system checks whether the currently operated key represents the left dot on the keypad. All of the programming sequences require the inputting of two digits (to represent a new timing interval) or four digits (to represent an alternate code) after a function code is inputted, and a second operation of the left dot key at the end of the sequence. If the master code has been inputted, and so has a function code, but the left dot key is not the next entry which follows the inputting of the function code, the inputted digit is simply shifted into a register which is used to store incoming digits for either an auxiliary code or a new time interval. As digits are inputted, it is only the last two or four (depending on the function code) which are saved and operated upon subsequently in the sequence. But once the left dot digit is received, it signals the end of the programming sequence, and the Master Match flag is set to a 0 to indicate that the sequence is over. The program sequence in progress is now terminated by appropriately setting a new time interval, or enabling the inputted alternate code to be recognized or detected, depending upon the previously inputted function code.

The description of the keypad entry subroutine thus far has assumed that an answer to the initial "program sequence in progress" question was in the affirmative. But if the answer is in the negative, it means that the inputted digit is either a digit in the master or an alternate code, or it represents the left dot. In order to initiate a program sequence, the left dot key must be the first which is depressed. If the inputted digit does not represent the left dot key, the system assumes that the master code or alternate code (if previously enabled) is being inputted. Thus the first test which is performed when a program sequence is not in progress is to see whether it is the left dot key which has been depressed. If it is, a program sequence is begun. The next time that the "program sequence in progress" question is asked, it will be answered in the affirmative and the previously described sequencing will occur. But if the first key depressed is not the left dot key, the only remaining possibility can be the inputting of a digit in either the master code or an alternate code.

The first thing that the system does in such a case is to test whether the inputted digit completes the master code. If it does not, a test is made to see whether it completes an auxiliary code which may have been entered previously. If it does not, the routine is exited until another digit is received, with a record being maintained of up to the last three digits inputted.

For the most part, completing the inputting of the master code or the auxiliary code results in the same actions. However, it will be recalled that the first time the master code is inputted following a power-up reset, the status light (which begins to blink when power is first applied to the system) is caused to turn off. Instead of blinking, the status light is turned on if all of the active burglary loops do not sense violations. Thus the flow chart of FIG. 16A shows this additional sequence being performed if a master code is completed by the latest digit, while these steps are skipped if it is a completed auxiliary code which has been inputted.

In either case, however, the next test which is performed is to see whether the panel is armed. If it is, inputting of the master code or an auxiliary code must constitute a command to disarm the terminal and the system does that. Any alarm codes previously generated are cancelled, and the "on" light on the remote unit panel is turned off. If the siren was previously on, it is similarly turned off. Any exit, entry or alarm timer intervals in progress are turned off, and any telephone routine which is in progress is similarly aborted. If the terminal was previously armed, the inputted code is in effect a command not only to disarm the system, but also to terminate anything having to do with burglary conditions.

But if the panel was not previously armed, it is an indication that it is now to become armed. But as described above, the system does not become armed if one of the active burglary loops senses an intrusion (reflected by the status light on the remote unit being off). Were the system to become armed now, it would result in the generation of an alarm. Thus if any of the active burglary loops is bad, as shown in FIG. 16B the Master Match flag is set to a 0 so that the inputted code is ignored, and the keypad entry routine is exited; it is as though the master or alternate code had not been inputted.

But if all of the active burglary loops are good, the system can be armed. Not only is it armed, but the "on" light on the remote unit panel is illuminated, after which the Master Match flag is set to a 0 since the appropriate action has been taken, and an exit is made from the keypad entry routine. But before the arming actually takes place, a test is made to see whether the exit/entry door panel switch is in the delay position. If it is not, then the system is armed without any attention being paid to the exit delay timer. (It is the exit delay timer which is of concern because that is the timer which comes into play when the system is first armed.) On the other hand, if the exit/entry door switch is in the delay position, the exit delay timer is started so that an alarm will be generated only if the exit/entry door is not closed by the time the exit delay interval expires. At the same time that the system is armed, the two pre-alarm buzzers start to beep to warn the homeowner that the exit delay interval is running.

FIG. 17 is a short interrupt routine which depicts what happens when a command (security poll, or one of the fire and dialer tests) is received from the central station over the cable. It will be recalled that the interrupt is actually controlled by the RD pulse from the modem which is coupled to the INT input of the microprocessor. After the 5-bit message from the central station is read at the start of the interrupt routine, by accessing buffer U9 (FIG. 7), a test is made to see whether a fire test command has been received. If it has, the system reports whether the fire detection circuit is operative. If it is, the fire test diagnostic response is furnished to the modem; if the fire detection circuit is not operative, the normal supervisory response is transmitted instead. A return is then made to the main loop processing.

If the system determines that a fire test command has not been received, it next checks whether the dialer test command has been received (referred to in the flow chart as the "auto-dial" command). If it is not a dialer test command which has been received, then what was received was the usual security poll. The interrupt routine is exited because there is nothing further to do inasmuch as the main routine takes care of loading the modem with the message to be transmitted to the central station.

There are two other types of downstream transmission—a central station reset and echoing of an alarm code. The reset is controlled by hardware and thus is not shown in any of the flow charts. As for the echoing of an alarm code, a check whether the alarm code is properly echoed is shown in FIG. 15D, even though strictly speaking the interrupt routine is involved in checking whether an echo has been received. In general, as mentioned above and for reasons to be described below, the flow charts depict the functions which are performed by the system in a logical sequence, rather than representing the actual individual steps which take place under firmware control.

If a dialer test command has been received, the terminal responds with a dialer test diagnostic response over the cable. The diagnostic response informs the central station that the dialer test command has been recognized. The actual dial pulse sequence does not begin until the central station transmits an echo of the previously transmitted verification response. A test is made to see if the verification is received on the next poll; only if it is received is a call made to the telephone routine, at which time the dialing test is actually performed. If the central station does not receive a call over the switched telephone network, it is made aware that something is wrong—either the verification echo response was not received over the cable, or there is something wrong with the dialer itself. Because the telephone routine is not called until after the terminal transmits a verification response and then receives an echo back, the dialer test in effect also enables the central station to determine whether messages are being transmitted correctly in both directions over the cable.

Figure 18A:
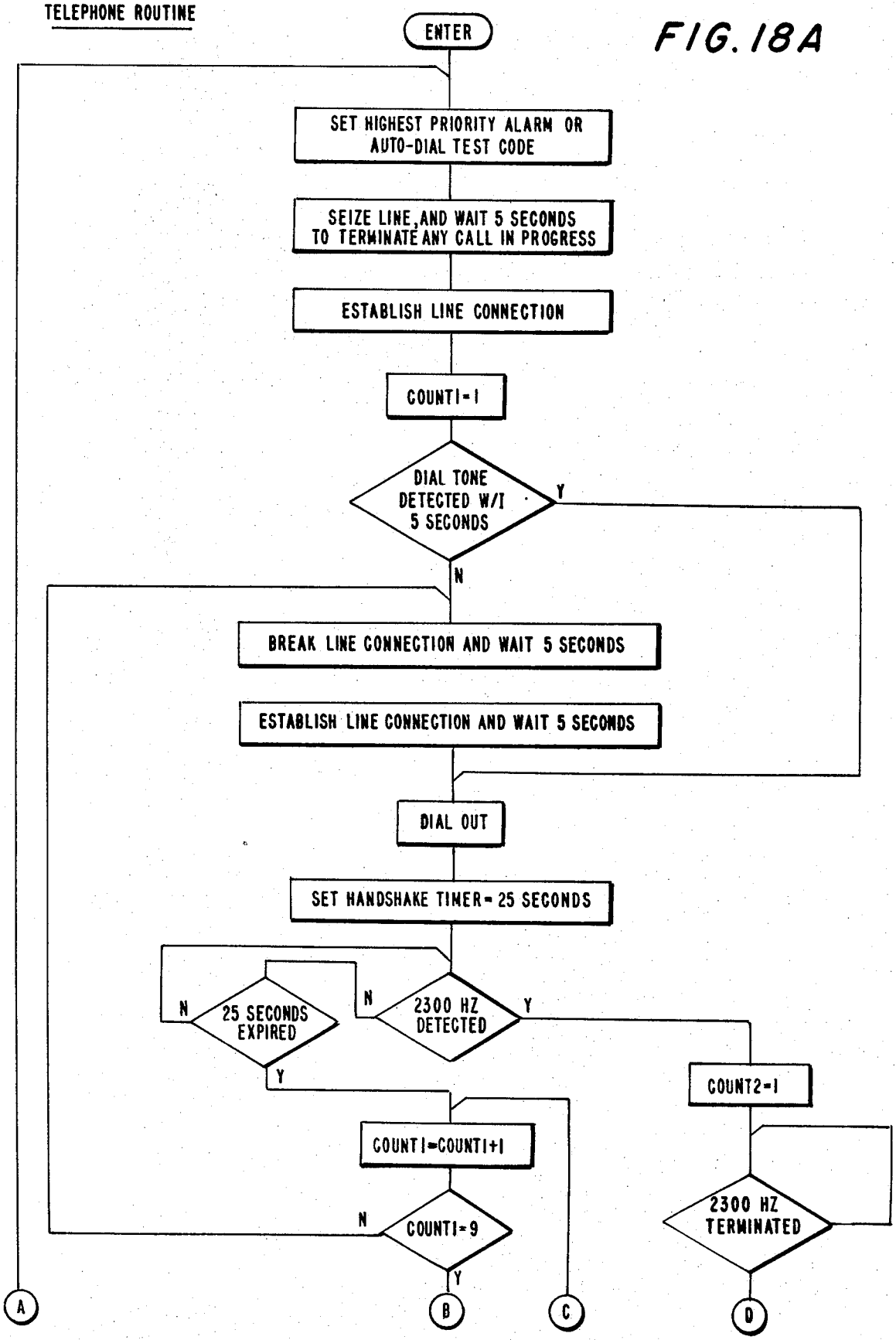
Figure 18B:
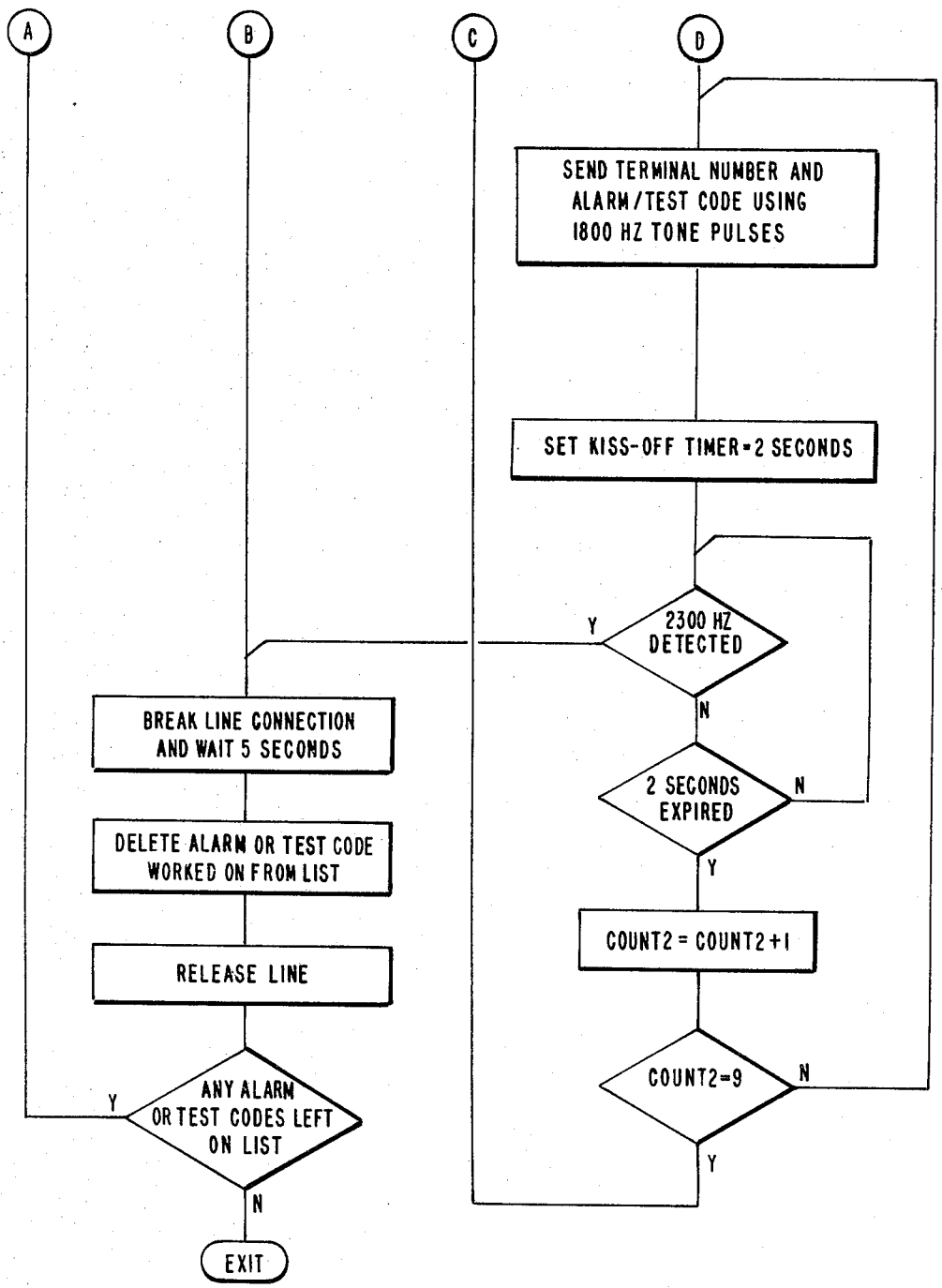

The telephone subroutine itself is depicted in FIGS. 18A and 18B. The system first checks which messages must be transmitted over the switched telephone network. Only one message is transmitted on each call, so that multiple alarm conditions result in multiple calls. Similarly, in response to a dialer test command, the message which is transmitted is simply an indication that it is in response to the dialer test command rather than representing an alarm code. On entry to the telephone test routine, the system decides which of the messages which have to be sent has the highest priority, and sets an appropriate single-digit code for transmission (the code being transmitted only after the terminal identification number is sent).

The telephone line is then seized by outputting the appropriate potential at port bit P10, and a 5-second wait loop is entered to allow termination of any call which might be in progress. Because the contacts of dial relay K2 are normally open, once relay K1 switches to the "active" position, line current in the telephone line ceases so that a hang-up condition is simulated. After five seconds have gone by, relay K2 is operated so that its contacts close to simulate an off-hook condition and the origination of a call.

Up to eight attempts are made to successfully transmit the message whose test code is to be sent. In order to count the number of attempts (and to "give up" if none of them is successful), a count is maintained by the system. The count is labelled COUNT1, and initially it is set equal to 1.

As soon as the line connection is established, the system checks to see whether dial tone from the telephone central office is detected on the line. It will be recalled that the P25 input port bit of the microprocessor is used to detect all tones transmitted over the telephone network to the security terminal; routines for detecting any frequency tone are well known in the art and simply involve testing the rate at which the input port bit switches from 0 to 1, and from 1 to 0. If dial tone is not detected within five seconds, the line is broken by causing the contacts of relay K2 to open. After five seconds have gone by, the line connection is established once again, and the system waits another five seconds. A check is not made to see whether dial tone appears on the line; instead, it is simply assumed that dial tone is present. In fact, during all subsequent dialing attempts, after the first is not successful, the system does not bother to check whether dial tone is on the line. Instead, the line connection is simply broken and then established again, it being assumed that within five seconds of establishing the connection dial tone is present. This avoids any undue delay.

The telephone number in the central station to which the security terminal is assigned is then dialed. The microprocessor accesses PROM U16 in order to determine the telephone number to dial, and causes relay K2 to pulse so that dial pulses can be simulated.

After dialing, a 25-second timer is started. The microprocessor examines input port bit P25 to see whether a 2300-Hz "handshake" tone is detected from the central station, the central station receiver 21 in FIG. 2 applying this tone to telephone line 23 upon receipt of a call. As long as the tone is not detected and the 25-second timer has not expired, the system continues to look for the tone. If the timer expires wihtout the tone having been detected, the COUNT1 count is incremented; the call has not been established and the system keeps track of how many attempts have been made. If COUNT1 does not yet equal 9, it means that fewer than 8 attempts have been made to dial out. A branch is taken to the step at which the line connection is broken so that another attempt at dialing can begin. On the other hand, if 8 attempts to establish a connection have been made, the system gives up. As shown in FIG. 18B, the line connection is broken, and the system then waits five seconds so that the attempted call can be terminated. Rather than to try dialing again, the alarm code which was the subject of the last 8 attempts is deleted from the list of alarm codes to be sent, and the line is then released by returning relay K1 to the nonactive position. If there are any other alarm codes left on the list, the system returns to the start of the telephone routine, at which time the next highest priority alarm code is set and an entirely new dialing sequence is begun. If there are no alarm codes left on the list, an exit is made from the telephone routine.

It should not be thought that nothing else takes place in the security terminal while the telephone routine is executed. On the contrary, the telephone routine is executed simultaneously with the main-line sequencing. The flow charts of FIGS. 18A and 18B simply show the telephone-related functions by themselves.

Referring back to FIG. 18A, if during any of the attempts to dial out and transmit the alarm or test code which has been set, the 2300-Hz handshake tone is detected as having been sent from the central station, the system assumes that a connection to the central station has been established. But establishing a connection does not guarantee that a message will actually be transmitted properly. Up to eight attempts are made to transmit the message itself, the message consisting of the security terminal identification number (accessed from PROM U16) and the message code set at the beginning of the routine. Another counter is used to count the number of attempts made to transmit the message, and COUNT2 is initially set to 1. The system then waits until the 2300-Hz tone from the central station is terminated.

At the cessation of the tone, the terminal transmits its message—its identification number and the alarm or test code. This is accomplished by pulsing output port bit P26 at an 1800 cycle per second rate. The square-wave pulses are rounded, as described above, so that an 1800-Hz tone code is transmitted to the central station to inform it of the message.

After the message is sent, the system sets a "kiss-off" timer to two seconds. Successful transmission of the message is verified by the central station transmitting another 2300-Hz tone which is detected in the same way that the initial handshake tone is detected. If the tone is detected within two seconds of the message transmission, the line connection is broken, the alarm or test code sent is deleted from the list, and the line is released. The system then returns to the start of the telephone routine if there is another message to be sent, or it exits from the routine if the list is empty.

But if the 2300-Hz tone is not detected within two seconds of the termination of message transmission, the system tries again. The COUNT2 count is incremented and tested to see if it is equal to 9. If not, a branch is taken to the point at which the tone message is outputted. But if 8 attempts have already been made to transmit the message, the system assumes that there is something wrong with the connection. Even though a confirming 2300-Hz tone was detected at the start of the routine to indicate that the connection was originally established, something must have gone wrong since then. If successful message transmission is not accomplished, a branch is made to that point in the telephone routine which controls an attempt at a new dialing sequence. The COUNT1 count is incremented, and if it is not equal to 9 another attempt is made to establish a connection all over again. But if 8 tries have been made, the alarm or test code being worked on is deleted from the list as described above.

Although not shown in the flow charts, if an alarm code is being dialed when a dialer test command is received from the central station, the command is ignored. The system just continues to transmit the alarm codes on its list.

The actual assembled source listing, i.e., the object code contained in the program memory chip U7, is as follows:

```
ISIS-II MCS-48/UPI-41 MACRO ASSEMBLER, V2.0
COPYRIGHT-1980-DTI-SECURITY

LOC   OBJ        SEQ        SOURCE STATEMENT

1   $TITLE('COPYRIGHT-1980-DTI-SECURITY')
                  2   ;
                  3   ;
                  4   ;
                  5   ;    XTAL=3.58 MHZ => MC=4.19 MICROSECONDS
                  6   ;    THIS IS CASEY'S SECTION
0038              7   GCR EQU 38H
0000              8   M   EQU 0000H
                  9   ;
                 10   ;
03A0             11   ORG 3A0H
03A0 0000        12      DW  M,M,M,M
03A2 0000
03A4 0000
03A6 0000
03A8 0000        13      DW  M,M,M,M
03AA 0000
03AC 0000
03AE 0000
03B0 0000        14      DW  M,M,M,M
03B2 0000
03B4 0000
03B6 0000
03B8 0000        15      DW  M,M,M,M
03BA 0000
03BC 0000
03BE 0000
03C0 0000        16      DW  M,M,M,M
03C2 0000
03C4 0000
03C6 0000
03C8 0000        17      DW  M,M,M,M
03CA 0000
03CC 0000
03CE 0000
03D0 0000        18      DW  M,M,M,M    ;3D8H
03D2 0000
03D4 0000
03D6 0000
03D8 0000        19      DW  M,M,M,M
03DA 0000
03DC 0000
03DE 0000
03E0 0000        20      DW  M,M,M,M
03E2 0000
03E4 0000
03E6 0000
03E8 0000        21      DW  M,M,M,M
03EA 0000
03EC 0000
03EE 0000
03F0 0000        22      DW  M,M,M,M
```

```
LOC   OBJ        SEC       SOURCE STATEMENT

03F2  0000
03F4  0000
03F6  0000
03F8  0000        23  DW M,M,M,M   ; 400H
03FA  0000
03FC  0000
03FE  0000
0400  0000        24  DW M,M,M,M
0402  0000
0404  0000
0406  0000

25  ;
07E0              26  ORG 7E0H
07E0  0000        27  DW M,M,M,M
07E2  0000
07E4  0000
07E6  0000
07E8  0000        28  DW M,M,M,M   ; 7F0
07EA  0000
07EC  0000
07EE  0000
07F0  0000        29  DW M,M,M,M
07F2  0000
07F4  0000
07F6  0000
07F8  0000        30  DW M,M,M,M
07FA  0000
07FC  0000
07FE  0000

31  ;
0000              32  ORG 000H
0000  4416        33  RSIN: JMP RESET
0002  00          34  NOP
0003  D5          35  EXIN: SEL RB1  ; USE UPPER REG BANK
0004  A9          36  MOV R1,A       ; SAVE ACC
0005  2414        37  JMP EXINT      ; JMP TO EXTERNAL INT ROUTINE
                  38  ; 10 MS TIMER INTERUPT
0007  3446        39  STMIT: CALL ENINT ; ENABLE EXTERNAL INT
0009  2E          40  XCH A,R6       ; GET P2 STATUS
000A  4360        41  ORL A,#60H     ; SET P25-6 HIGH
000C  2E          42  XCH A,R6       ; RESTORE ACC
000D  C5          43  SEL RB0        ; LOWER REG BANK IS USED
000E  AA          44  MOV R2,A       ; SAVE ACC
000F  23B5        45  MOV A,#0B5H    ; (EXPERL) SET TIMER
0011  62          46  MOV T,A
0012  383E        47  MOV R0,#3EH    ; GET GCR
0014  F0          48  MOV A,@R0
0015  55          49  STRT T         ; TO FINE TUNE TIMER
0016  53F8        50  ANL A,#0F8H    ; IF OUPUTING TONE, EXIT
0018  D320        51  XRL A,#20H     ; (GCR=28)
001A  C622        52  JZ RT1         ; I.E. TEL,DATA, AND 1ST 60 MS
001C  144C        53  CALL TMTS      ; DO 10 MS TIMER ACTIONS
001E  B820        54  RTON: MOV R0,#20H ; OUTPUT PT1 STATUS TO PT1
0020  F0          55  MOV A,@R0
0021  39          56  OUTL P1,A
```

```
LOC  OBJ       SEQ          SOURCE STATEMENT

0022 B838      57  RT1: MOV R0,#38H  ; INC 10 MS COUNTER
0024 10        58       INC @R0
0025 B81F      59       MOV R0,#1FH  ; ADDRESS OF P2 CONTROL
0027 F0        60       MOV A,@R0    ; GET SIREN CONTROL BIT
0028 C8        61       DEC R0       ; ADDRESS OF P2 STATUS
0029 5380      62       ANL A,#80H   ; MASK ALL SAVE SIREN BIT
002B 20        63       XCH A,@R0    ; GET P2 STATUS
002C 537F      64       ANL A,#7FH   ; MASK SIREN OUT BIT
002E 40        65       ORL A,@R0    ; COMBINE
002F A0        66       MOV @R0,A    ; PUT INTO STATUS REG
0030 FB        67       MOV A,R3
0031 D5        68       SEL RB1
0032 9236      69       JB4 WAB      ; R3/4=1 => WARBLE
0034 BA10      70       MOV R2,#10H
0036 EA48      71  WAB: DJNZ R2,NTFIN ; DEC PERIOD
0038 C5        72       SEL RB0      ; WILL BE USING R0
0039 F0        73       MOV A,@R0    ; GET STATUS REG
003A 537F      74       ANL A,#7FH   ; SET OUTPUT LOW
003C 3A        75       OUTL P2,A
003D B930      76       MOV R1,#30H  ; TIMEOUT
003F E93F      77  EERE: DJNZ R1,EERE
0041 F0        78       MOV A,@R0
0042 4328      79       ORL A,#28H   ; P23,25 HIGH
0044 3A        80       OUTL P2,A    ; RESTORE PT2
0045 D5        81       SEL RB1
0046 BA40      82       MOV R2,#40H
0048 C5        83  NTFIN: SEL RB0
0049 FA        84  RT2: MOV A,R2    ;  RESTORE ACC
004A D5        85       SEL RB1
004B 83        86       RET          ; RETURN TO SIREN
               87  ;*******************************************
               88  ;
               89  ;
               90  ;*******************************************
               91  ; WHERE IN THE 100 MS TIME IS THE PROGRAM?
004C F0        92  TMTS: MOV A,@R0  ; GET 10 MSC (R0=38)
004D 530F      93       ANL A,#0FH   ; MASK OFF MSN
004F D308      94       XRL A,#08H   ;  DIALER TIME
0051 C6F7      95       JZ EMSI      ;  "8"
0053 D303      96       XRL A,#03H   ; LAST 10 MS INT
0055 C660      97       JZ EMSF      ; "B"
0057 D30F      98       XRI A,#0FH   ; READ FREQ IF ITS/ESS/KOS
0059 CE68      99       JZ RDFQ      ; "4"
005B D308     100       XRL A,#08H   ; FIRST INT
005D C6A4     101       JZ FRST      ; "C"
005F 83       102       RET
              103  ;
              104  ;  AT LAST INT
              105  ;  R0=38   LSN OF GCR = B
0060 C8       106  EMSF: DEC R0      ; EMSC ADDR
0061 14D3     107       CALL DCR     ; DEC EMSC IF NOT ZERO
0063 14E1     108       CALL SSW     ; SENSE SWITCHES (SECOND TIME)
0065 7463     109       CALL MART    ;  CALL MAIN ROUTINE
0067 83       110       RET
              111  ;
```

```
LOC   OBJ      SRC        SOURCE STATEMENT

112 ; AT FOURTH 10MS INT
0068 2306      113 RDFC: MOV A,#06  ; SET 10 MSC TO 6
006A B936      114      MOV R1,#36H  ; DDIR ADDR FOR TONE SEARCH
006C 30        115      XCHD A,@R0   ; R0=GCR (3E)
006D F0        116      MOV A,@R0    ; GET GCR
006E 261D      117      MOV R0,#1DH  ; SET UP FOR FREQ SEARCH
0070 97        118      CLR C
0071 D306      119      XRL A,#06H   ; FOR KCS (06)
0073 C67E      120      JZ HFS
0075 D340      121      XRL A,#40H   ; FOR HSS (46)
0077 C67E      122      JZ HFS
0079 D310      123      XRL A,#10H   ; FOR LTS (56)
007B C691      124      JZ LFS
007D 83        125      RET ;   NO TONE SEARCH
               126 ;
               127 ; HI FREQ SEARCH
007E F0        128 HFS: MOV A,@R0 ; GET ZXINGS COUNT
               129 ; 2300 HZ FOR 40 MS = 184 ZXINGS
007F 1314      130      ADDC A,#14H  ;   CPL OF MAX
0081 F69C      131      JC NFT ; NOT FOUND TONE
0083 1344      132      ADDC A,#44H  ; MAX-MIN
0085 E69C      133      JNC NFT
0087 F1        134 CNTST: MOV A,@R1  ;  GET DDIR
0088 F28E      135      JB7 TDBF ; WAS THERE A TONE BEFORE?
008A 07        136      DEC A  ;   DDIR IS USED TO STORE THE DETECT STATUS
               137 ;          DURING A FREQ SEARCH
008B A1        138      MOV @R1,A
008C 9690      139      JNZ EXT ;  DETECTING A TONE
               140 ;      COUNTS DOWN FROM 3 TO 0
008E B182      141 TDBF: MOV @R1,#82H ; THEN A 82 REMAINS UNTIL
               142 ;                    LOSS OF TONE
0090 83        143 EXT: RET
               144 ;
               145 ;  LOW FREQ SEARCH
0091 F0        146 LFS: MOV A,@R0 ; GET ZXINGS
               147 ;    100 TO 1000 HZ IS OK
0092 1380      148      ADDC A,#80H  ;  IN 40 MS = 8 TO 80 ZXINGS
0094 F69C      149      JC NFT ; NO FOUND TONE (TOO HI)
0096 1348      150      ADDC A,#48H  ; MAX-MIN
0098 E69C      151      JNC NFT ;  TOO LOW
009A 0487      152      JMP CNTST ;  CONTINUE TEST
               153 ;
009C F1        154 NFT: MOV A,@R1  ; GET DDIR
009D F2A1      155      JB7 DBFR ; WAS THERE A PREVIOUS TONE
009F 2304      156      MOV A,#04H  ; IF STILL NO TONE
               157 ;
00A1 07        158 DBFR: DEC A  ; IF LOSS OF TONE COUNT DOWN FROM 82
00A2 A1        159      MOV @R1,A
00A3 83        160      RET
               161 ;
               162 ; R0=GCR 10 MSC=C
00A4 F0        163 TRST: MOV A,@R0  ; DATA OUT IN PROGRESS?
00A5 D32C      164      XRL A,#2CH
00A7 96A9      165      JNZ TONS
00A9 0322      166      ADD A,#02H  ; IF SO, SET 10 MSC =2
```

| LOC | OBJ | SEC | SOURCE STATEMENT |
|---|---|---|---|

```
00AB  30         167  TONS: XCHD A,@R0
00AC  18         168  INC R0 ; SET R0=39
00AD  F0         169  MOV A,@R0
                 170  ;  ENABLE IS 39/6 BIT
00AE  5340       171  ANL A,#40H ; ENABLE TONE OUT?
00B0  B91F       172  MOV R1,#1FH
00B2  41         173  ORL A,@R1
00B3  A1         174  MOV @R1,A
00B4  F0         175  MOV A,@R0 ; OPEN DIAL RELAY?
00B5  5310       176  ANL A,#10H
00B7  14D5       177  CALL CP1B ; LOW ON P14 OPENS THE DIAL RELAY
00B9  B91D       178  MOV R1,#1DH ; CLEAR ZXINGS COUNTER
00BB  B100       179  MOV @R1,#00
00BD  83         180  RET
                 181  ;
                 182  ;
                 183  ;   HANG UP AND PICK THE PHONE ROUTINES
                 184  ;
00BE  B937       185  HUPT: MOV R1,#37H ; SET THE EMSC FOR 5.0 S
00C0  3132       186  MOV @R1,#32H
00C2  2310       187  HUP:  MOV A,#10H ; HANG UP THE PHONE
00C4  14D5       188  CALL CP1B ; (OPEN DIAL RELAY)
00C6  83         189  RET
                 190  ;
00C7  B937       191  PUPT: MOV R1,#37H ; SET EMSC = 5.0 S
00C9  3132       192  MOV @R1,#32H
00CB  2310       193  PUP:  MOV A,#10H ; PICK UP THE PHONE
00CD  14D0       194  CALL SP1B ; (CLOSE DIAL RELAY)
00CF  83         195  RET
                 196  ;
00D0  B820       197  SP1B: MOV R0,#20H ; SET PORT 1 BITS
00D2  40         198  ORL A,@R0 ; P1 STATUS IS @ 20
00D3  A0         199  MOV @R0,A
00D4  83         200  RET
                 201  ;
00D5  B820       202  CP1B: MOV R0,#20H ; CLEAR PORT 1 BITS
00D7  37         203  CPL A ; 1 MEANS CLEAR THAT BIT
00D8  50         204  ANL A,@R0 ; P1 STATUS IS AT 20
00D9  A0         205  MOV @R0,A
00DA  83         206  RET
                 207  ;
00DB  F0         208  DCR:  MOV A,@R0 ; GET TIMER REG
00DC  C6E0       209  JZ NDEC ; IF ZERO, DO NOTHING
00DE  07         210  DEC A
00DF  A0         211  MOV @R0,A
00E0  83         212  NDEC: RET
                 213  ;   THIS SUBROUTINE IS HERE TO
                 214  ;   SOLVE PAGE BOUNDRY PROBLEMS
                 215  ;
                 216  ; SENSE THE SWITCHES
0000             217  SWN EQU 00H
00E1  B8A0       218  SSW:  MOV R0,#0A0H
00E3  80         219  MOVX A,@R0 ; GET SWITCH DATA
00E4  DD         220  XRL A,R5  ; COMPARE WITH LAST TIME
                 221  ;(CURRENT DATA)
```

```
LCC   OBJ       SEQ       SOURCE STATEMENT

00E5  96F2      222       JNZ CNSD
00E7  FD        223       MOV A,R5   ; GET CURRENT DATA
00E8  DC        224       XRL A,R4   ; COMPARE CURRENT AND LAST DATA
00E9  532F      225       ANL A,#0FE ; HAS A NEW DIGIT KEY BEEN PRESSED?
00EB  FD        226       ANL A,R5   ; BCD 0 MEANS NO KP (ZERO IS A)
00EC  C6F0      227       JZ NNKP
00EE  A5        228       CLR F1 ; SET NEW KEY PRESSED FLAG
00EF  B5        229       CPL F1
00F0  FD        230  NNKP: MOV A,R5
                231       ; IF KEY IS DEBOUNCED PUT INTO LAST DATA
00F1  AC        232       MOV R4,A
00F2  B8A0      233  CNSD: MOV R0,#0A0H
00F4  80        234       MOVX A,@R0 ; PUT SWITCH DATA INTO CURRENT DATA
00F5  AD        235       MOV R5,A
00F6  83        236       RET
                237       ;
                238       ;   THIS IS THE "8" 10 MS INT
                239       ;   R0=39 (GCR)
00F7  D5        240  EMSI: SEL RB1   ; TONE CONTROLS IN RB1
00F8  FF        241       MOV A,R7   ; TURN OFF TONE
00F9  53BF      242       ANL A,#0BFH ; TONE ENABLE BIT IS R'7/6
00FB  AF        243       MOV R7,A
00FC  C5        244       SEL RB0 ;KILL BIT EATER!!!
00FD  18        245       INC R0 ; SET R0=39H
00FE  F0        246       MOV A,@R0  ; DISABLE TONE
00FF  53DF      247       ANL A,#0DFH
0101  A0        248       MOV @R0,A
                249       ;
                250       ;
0068            251       ALN EQU 68H
                252       ; PART OF THE 100 MS LOOP
                253       ; THE 100 MS LOOP IS PART OF THE TIMER INTERRUPT
                254       ; ROUTINE
0102  B8C0      255  INPS: MOV R0,#0C0H ; (TIMER USES RB0)
0104  80        256       MOVX A,@R0 ; GET ALARM INPUTS
0105  D368      257       XRL A,#ALN ; NORMALIZE
                258       ; PAST SENSE IS R7
0107  5F        259       ANL A,R7   ; COMPARE WITH LAST SENSE FOR DEBOUNCE
                260       ; NEW ALARMS AT 21
0108  B921      261       MOV R1,#21H
010A  41        262       ORL A,@R1  ; ADD IN TO NEW ALARM REG.
010B  A1        263       MOV @R1,A
                264       ; STORE SENSE DATA
010C  80        265       MOVX A,@R0
010D  D368      266       XRL A,#ALN ; NORMALIZE
010F  AF        267       MOV R7,A
                268       ; THIS ROUTINE ASSUMES THAT
                269       ; WHEN AN ALARM IS ACTED UPON IT IS REMOVED FROM
                270       ; THE NEW
                271       ; ALARMS AND PUT INTO THE CURRENT ALARMS
                272       ; AND WHEN THE ALARM TIMER TIMES OUT
                273       ;   ANY VIOLATED LOOPS ARE PUT
                274       ; INTO THE CURRENT ALARMS WITHOUT STARTING THE
                275       ; ALARM COUNTER OR ALARMS
                276       ;
```

```
LOC   OBJ       SEQ        SOURCE STATEMENT 0110  14E1      277  CALL SSW    ; SENSE THE SWITCHES
0112  2472      278  JMP CBOCK
                279  ;
0035            280  TLR  EQU 35H
0036            281  DDIR EQU 36H
0037            282  EMSC EQU 37H
                283  ;
                284  ;
                285  ;    EXTERNAL INTERUPT
0114  8614      286  EXINT: JNI EXINT  ; WAIT UNTIL INT GONE
0116  B83F      287  MOV R0,#3FH  ; GET ALARM REG
0118  F0        288  MOV A,@R0
0119  53BF      289  ANL A,#0BFH  ; CLEAR NOT-INT BIT
011B  4380      290  ORL A,#80H   ; SET COMMAND RES BIT
011D  A0        291  MOV @R0,A
011E  B820      292  MOV R0,#20H  ; GET DATA COM OUT
0120  80        293  MOVX A,@R0
0121  531F      294  ANL A,#1FH   ; MASK ALL SAVE DATA COM
0123  D325      295  XRL A,#25H   ; FIRE TEST?
0125  C647      296  JZ FIRT      ; FIRE TEST COM. IS 1A
0127  D301      297  XRL A,#01H   ; DIALER TEST?
0129  C654      298  JZ DILT      ; DIAL COM. IS 1B
012B  B83F      299  MOV R0,#3FH
012D  D327      300  XRL A,#07H
012F  963B      301  JNZ NAD      ; AUTO DIAL SEC COM. IS 1C
0131  F0        302  MOV A,@R0    ; AD BIT MUST BE SET (3F/5)
0132  37        303  CPL A
0133  B23B      304  JB5 NAD      ; NO AUTO DIAL
0135  54A2      305  CALL STEL2   ; START TELEPHONE DIAL
0137  B83D      306  MOV R0,#3DH  ; STORE TEST CODE
0139  30F9      307  MOV @R0,#0F9H
013B  B83F      308  NAD: MOV R0,#3FH ; CLEAR AD AND COM RES BITS
013D  F0        309  MOV A,@R0
013E  531F      310  ANL A,#1FH
0140  A0        311  MOV @R0,A
0141  B820      312  CLRI: MOV R0,#20H ; OUTPUT TO BS1210
0143  37        313  CPL A        ; LOW TRUE
0144  90        314  MOVX @R0,A
0145  F9        315  MOV A,R1     ; RESTORE ACC
0146  93        316  ENINT: RETR  ; OR ENABLE EXT INT
                317  ;
0147  B825      318  FIRT: MOV R0,#25H ; GET FIRE TEST RESULT
0149  F0        319  MOV A,@R0
014A  F250      320  JB7 FTB      ; WAS FIRE TEST BAD
014C  2312      321  MOV A,#12H   ; IF TESTED GOOD
014E  2441      322  JMP CLRI
                323  ;
                324  ;
0150  2312      325  FTB:MOV A,#10H  ; IF TESTED BAD
0152  2441      326  JMP CLRI
                327  ;
0154  B83F      328  DILT:MOV R0,#3FH ; SET AUTODIAL BIT
0156  F0        329  MOV A,@R0
0157  4320      330  ORL A,#20H
0159  A0        331  MOV @R0,A
```

| LOC | OBJ | | SEQ | SOURCE STATEMENT |
|---|---|---|---|---|

```
015A 231C         332 MOV A,#1CH  ;  CODE TO BS1010
015C 2441         333 JMP CLRI
                  334 ;
                  335 ;
                  336 ; THE TELEPHONE JMP TABLE MUST
                  337 ; BE BEFORE THE JMPP @A IS DEFINED
015E 4468         338 XSVT: JMP KOS  ; "08"
0160 448F         339 JMP STEL  ;  START TELEPHONE ROUTINE "18"
0162 4456         340 JMP DATA  ;  "28"
0164 44E0         341 JMP DIAL  ;  "38"
0166 6403         342 JMP ESS   ;  "48"
0168 642D         343 JMP DTS   ;  "58"
016A 6444         344 JMP ON    ;  "68"
016C 6451         345 JMP OFF   ;  "78"
                  346 ; INDIRECT JMP TABLE
005E              347 N EQU LOW XSVT
016E 5E           348 IRVT: DB N,N+2,N+4,N+6,N+8
016F 60
0170 62
0171 64
0172 66
0173 68           349 DB N+10,N+12
0174 6A
                  350 ;
0175 6C           351 SRGT: DB N+14 ;START OF REG TABLE
0176 29           352 DB 29H,2CH,30H,34H
0177 2C
0178 30
0179 34
017A 3A           353 DB 3AH,3BH,33H
017B 3B
017C 33
                  354 ;
                  355 ;
                  356 ;
                  357 ; CABLE CHECK AND OUTPUT TO BS1010
017D B83F         358 CBOCK: MOV R0,#3FH  ; GET DATA COM REG
017F B980         359 MOV R1,#80H  ; DATA COM ADDR
0181 F0           360 MOV A,@R0
0182 D291         361 JB6 NINT  ; NO INT SINCE LAST TIME?
0184 928D         362 CCBK: JB4 NALM ; NO ALARM?
0186 81           363 MOVX A,@R1 ; READ DATA COM
0187 37           364 CPL A  ; BS1010 HAS LOW TRUE OUTPUTS
0188 I0           365 XRL A,@R0 ; COMPARE WITH ALARM
0189 531F         366 ANL A,#1FH  ; LOWER 5 BITS ONLY
018B 9691         367 JNZ NINT  ; IF NOT PROPER ALARM ECHO
018D 3934         368 NALM: MOV R1,#34H  ; SET DATA READY TIMER TO 20
018F B114         369 MOV @R1,#14H
0191 F0           370 NINT: MOV A,@R0 ; GET DATA COM REGISTER
0192 B900         371 MOV R1,#00H  ; BS1010 INPUT ADDR.
0194 F29A         372 JB7 CRES  ; B7=> COM RES
0196 531F         373 DCOUT: ANL A,#1FH  ; LOWER 5 BITS TO DATA COM
0198 37           374 CPL A  ; DISABLE 7474 CLR AND OUTPUT LOW TRUE
0199 91           375 MOVX @R1,A  ; TO DATA COM
019A F0           376 CRES: MOV A,@R0 ; GET DATA COM REG
```

```
LOC  OBJ       SEQ         SOURCE STATEMENT 0198 4340      377  CRL A,#40H    ; SET INT-NOT BIT
019D A0        378  MOV @R0,A
019E 92AD      379  DIALC: JB4 TUDT ; ALARM?
01A0 B834      380  MOV R0,#34H   ; DIAL TIMER DONE?
01A2 F0        381  MOV A,@R0
01A3 96AD      382  JNZ TUDT
01A5 B838      383  MOV R0,#38H   ; DIAL IN PROGRESS?
01A7 F0        384  MOV A,@R0
01A8 37        385  CPL A         ; BIT 38/7=0 => DIALER
01A9 F2AD      386  JB7 TUDT
01AB B018      387  MOV @R0,#18H  ; START DIAL
               388  ;
               389  ; USED TO DEC TIMERS TO ZERO
01AD B81E      390  TUDT: MOV R0,#1EH ; SEC REG
01AF 10        391  INC @R0       ; LSN OF R'6 IS SEC REG
01B0 F0        392  MOV A,@R0     ; =A? (10)
01B1 530F      393  ANL A,#0FH
01B3 D30A      394  XRL A,#0AH
01B5 96D4      395  JNZ BTEL      ; IF NOT NO TIMER CHANGE
01B7 30        396  XCHD A,@R0    ; IF SO CLEAR
01B8 18        397  INC R0
01B9 10        398  INC @R0       ; INC MIN REG
01BA F0        399  MOV A,@R0     ; GET MIN REG
01BB 533F      400  ANL A,#3FH    ; MASK OFF TONE AND SIREN ENABLE
01BD D33C      401  XRL A,#3CH    ; 60 YET?
01BF 96C9      402  JNZ NMIN      ; IF NOT NO MIN
01C1 F0        403  MOV A,@R0
01C2 53C0      404  ANL A,#0C0H   ; CLR MIN REG
01C4 A0        405  MOV @R0,A
01C5 B82F      406  MOV R0,#2FH   ; LOACATION OF MIN COUNTER
01C7 14DB      407  CALL DCR      ; DEC MIN COUNTER
               408  ;
               409  ;
01C9 B907      410  NMIN: MOV R1,#07 ; #  OF SEC TIMERS TO DEC
               411  ;
0075           412  RGT EQU LOW SRGT ; DEFINE START OF REG TABLE
               413  ;
01CB 2375      414  DCAG: MOV A,#RGT
01CD 69        415  ADD A,R1      ; GET ADDR OF TIMER
01CE A3        416  MOVP A,@A
01CF A8        417  MOV R0,A
01D0 14DB      418  CALL DCR      ; DEC REG IF NOT ZERO
01D2 E9CB      419  DJNZ R1,DCAG  ; LAST TIMER?
               420  ;
               421  ;
01D4 B838      422  BTEL: MOV R0,#GCR ; GET GCR
01D6 F0        423  MOV A,@R0
01D7 F2F7      424  JB7 NCON      ; TEL?
01D9 47        425  TEII: SWAP A  ; IF TELEPHONE,
               426  ;               JMP TO DIALER ROUTINES
01DA 5307      427  ANL A,#07H    ; BITS 4-6 ARE USED TO GET VECTOR
               428  ;
006E           429  SVT EQU LOW XRVT ; DEFINE START OF JMP TABLE
               430  ;
01DC 036E      431  ADD A,#SVT    ; FOR VECTOR ADDR
```

| LOC | OBJ | SEQ | SOURCE STATEMENT |
|---|---|---|---|
| 01DE | C8 | 432 | DEC R0 ;  FOR TEL ROUTINES |
| 01DF | B3 | 433 | JMPP @A ;  JMP TO DIALER PROGRAM |
| | | 434 | ; |
| | | 435 | ;****************************************** |
| | | 436 | ; |
| | | 437 | ; DCR (DEC REG) HAS BEEN MOVED TO |
| | | 438 | ; CURE PAGE BOUNDREY PROBLEMS |
| | | 439 | ; |
| | | 440 | ;****************************************** |
| | | 441 | ; |
| | | 442 | ; |
| | | 443 | ;   GET DIAL/DATA DIGIT |
| | | 444 | ;   R0=OFFSET |
| | | 445 | ;   62H FOR TEL. NO. AND 6A FOR ACC CODE |
| 01E0 | B936 | 446 | GDD: MOV R1,#36H ; GET DDIR |
| 01E2 | F1 | 447 | MOV A,@R1 |
| 01E3 | 47 | 448 | SWAP A |
| 01E4 | 97 | 449 | CLR C |
| 01E5 | 67 | 450 | RRC A |
| 01E6 | 68 | 451 | ADD A,R0 ; ADD PROM OFFSET |
| 01E7 | A8 | 452 | MOV R0,A ; ADDR TO R0 |
| 01E8 | F1 | 453 | MOV A,@R1 ; INC DIGIT POINTER |
| 01E9 | 0310 | 454 | ADD A,#10H |
| 01EB | A1 | 455 | MOV @R1,A |
| 01EC | 47 | 456 | SWAP A  ; SET UP CARRY BIT ON ODD |
| 01ED | 67 | 457 | RRC A |
| 01EE | 80 | 458 | MOVX A,@R0 ; GET DIGIT |
| 01EF | F6F2 | 459 | JC EVEN ; IF POINTER |
| | | 460 | ;    IS EVEN, USE LSN |
| 01F1 | 47 | 461 | SWAP A |
| 01F2 | 31 | 462 | EVEN: XCHD A, @R1 |
| 01F3 | B837 | 463 | MOV R0,#37H ; 8 TO HMSC |
| 01F5 | B008 | 464 | MOV @R0,#08H ; 800 MS DELAY |
| 01F7 | 83 | 465 | NCON: RET |
| | | 466 | ; LEAVES WITH R0=HMSC (37H) |
| | | 467 | ; |
| | | 468 | ; |
| 01F8 | B0AA | 469 | SCLR: MOV @R0,#0AAH ; SET UP CHECK BYTE |
| 01FA | C8 | 470 | DEC R0 ; CLEAR FROM 1 TO 3B |
| 01FB | 27 | 471 | CLR A |
| 01FC | A0 | 472 | CLEAR: MOV @R0,A |
| 01FD | E8FC | 473 | DJNZ R0,CLEAR |
| 01FF | B931 | 474 | MOV R1,#31H |
| 0201 | B860 | 475 | MOV R0,#60H |
| 0203 | 80 | 476 | MOVX A,@R0 |
| 0204 | A1 | 477 | MOV @R1,A |
| 0205 | 18 | 478 | INC R0 |
| 0206 | 19 | 479 | INC R1 |
| 0207 | 80 | 480 | MOVX A,@R0 |
| 0208 | A1 | 481 | MOV @R1,A |
| 0209 | B82D | 482 | MOV R0,#2DH |
| 020B | B01E | 483 | MOV @R0,#1EH |
| 020D | 18 | 484 | INC R0 |
| 020E | B005 | 485 | MOV @R0,#05 |
| 0210 | B823 | 486 | MOV R0,#23H |

```
LCC    CBJ        SRC        SOURCE STATEMENT

0212 B01E         487                    MOV      @R0,#1FH
0214 BB20         488                    MOV      R3,#20H  ;SET "ZONE BLINK"
                  489                                      ;FLAG AT POWER UP
0216 B83C         490        RESET:      MOV      R0,#3CH
0218 F0           491                    MOV      A,@R0
0219 D3AA         492                    XRL      A,#0AAH
021B C61F         493                    JZ       CPURST
021D 24F8         494                    JMP      SCLR
021F 4623         495        CPURST:     JNT1     CSRS
0221 6470         496                    JMP      TEST
0223 B81E         497        CSRS:       MOV      R0,#1EH  ;SET PT2 STATUS
                  498 ;                                    AND SEC REG
0225 B0E0         499                    MOV      @R0,#0E0H
                  500 ; ACC=0 FOR CLEARING REG'S
0227 27           501 CLR A
0228 18           502 INC R0   ;  TURN OFF TONE AND SIREN (1F)
0229 A0           503 MOV @R0,A
022A 18           504 INC R0   ;  SET P1 STATUS TO TURN OFF
022B B007         505 MOV @R0,#07H
022D 90           506 MOVX @R0,A  ;  TURN OFF ENV RELAYS
022E 18           507 INC R0   ;  CLEAR ALARMS
022F A0           508 MOV @R0,A
0230 18           509 INC R0
0231 A0           510 MOV @R0,A
0232 A8           511 MOV R0,A  ;  OUTPUT NORM SUPERVISORY TO PS1010
0233 2390         512 MOV A,#90H  ; AND REMOVE 7474 CLR
0235 90           513 MOVX @R0,A
0236 B83F         514                    MOV      R0,#3FH
0238 B050         515                    MOV      @R0,#50H
023A B838         516                    MOV      R0,#38H
023C B080         517                    MOV      @R0,#80H
023E B834         518                    MOV      R0,#34H
0240 B014         519                    MOV      @R0,#14H
0242 A5           520          REENTR:   CLR      F1       ;FOR KBD ROUTINE
                  521 ;  SET FIRST TIMER TO 90H TO SAVE BYTES
                  522 ;  10 MS IS 125 TIMER COUNTS
0243 62           523 MOV T,A
0244 55           524 STRT T
0245 25           525 EN TCNTI
0246 05           526 EN I
0247 D5           527 INSTR: SEL RB1
0248 97           528 TOP: CLR C  ;  CARRY IS USED AS A FLAG BIT
                  529 ;   1 MC
0249 BC06         530 IPAG: MOV R4,#06H  ;  TOTAL MC IS
024B 0A           531 IN A,P2  ;           1+13+2*(14+(2*6))=66
024C DE           532 XRL A,R6  ;  COMPARE TO LAST TONE IN
024D B253         533 JB5 TICN  ;  IF CHANGE
                  534 ;   7 MC
024F 0A           535 IN A,P2  ;  WASTE TIME
0250 00           536 NOP
0251 4459         537 JMP NTICN
                  538 ;   5 MC    FIRST TIME
0253 1D           539 TICN: INC R5  ;  INC ZING COUNTER
0254 FE           540 MOV A,R6
0255 D320         541 XRL A,#20H  ;  CHANGE SENSE OF INPUT BIT
```

```
LOC    OBJ         SEQ       SOURCE STATEMENT

0257   AE          542   MOV R6,A
                   543 ;    5 MC ALTERNATE
0258   EC58        544 NTICN: DJNZ R4,NTICN  ; TIMING LOOP
                   545 ;    2*N MC   (N=6)
025A   F648        546   JC TOP   ; IS IT TIME FOR ANOTHER TIME THROUGH?
                   547 ;    2 MC
025C   FF          548   MOV A,R7  ; SHOULD THERE BE A TONE OUT?
025D   5340        549   ANL A,#40H ; IF SO CHANGE
025F   DE          550   XRL A,R6
0260   AE          551   MOV R6,A
0261   432F        552   ORL A,#2FH
0263   3A          553   OUTL P2,A
0264   A7          554   CPL C  ; CHANGE CARRY BIT
0265   00          555   NOP
0266   4449        556   JMP LPAG
                   557 ;    13 MC
                   558 ;
                   559 ;
                   560 ;   ALL TELEPHONE ROUTINES ENTER WITH R0=37H
                   561 ;
                   562 ;   KISS OFF TONE SEARCH "00"
0268   B936        563 KOS: MOV R1,#36H  ; GET DDIR
026A   F1          564   MOV A,@R1
026B   F289        565   JB7 SOFF  ; IF K.O. TONE, START OFF
026D   F0          566   MOV A,@R0  ; GET EMSC
026E   C671        567   JZ SDATA  ; IF EMSC=0 START DATA OUT
0270   83          568   RET
                   569 ;
0271   C9          570 SDATA: DEC R1 ; GET TLR
0272   11          571   INC @R1  ; INC TLR
0273   F1          572   MOV A,@R1
0274   5307        573   ANL A,#07H ; DATA TRANSMISION  8 TIMES?
0276   C683        574   JZ SHUP ; IF SO, HANG UP
0278   B86A        575   MOV R0,#6AH ; OFFSET FOR DATA
027A   19          576   INC R1   ; DDIR REG LOCATION (36)
027B   B100        577   MOV @R1,#00H  ; DDIR =0 AT START OF DATA OUT
027D   34E0        578   CALL GDD  ; GDD EXITS WITH R0=37
027F   18          579   INC R0
0280   B029        580   MOV @R0,#29H  ; CODE FOR DATA OUT
0282   83          581   RET
                   582 ;
0283   14BE        583 SHUP: CALL HUPT  ; START HANG UP
                   584 ;              SET EMSC=32H (5 SEC)
0285   19          585   INC R1
0286   B168        586   MOV @R1,#68H ; "ON" WORD TO GCR
0288   83          587   RET
                   588 ;
0289   14BE        589 SOFF: CALL HUPT  ; HANG UP AND WAIT 5 SECS
028B   19          590   INC R1 ; "OFF" WORD TO GCR
028C   B178        591   MOV @R1,#78H
028E   83          592   RET
                   593 ;
                   594 ;  START TELEPHONE ROUTINE "18"
                   595 ;  SET BY ALARMS PROGRAM
028F   B93F        596 STEL: MOV R1,#3FH  ; ALARMS ARE HERE
```

```
LOC   OBJ       SEQ         SOURCE STATEMENT

0291  B83D      597  MOV R0,#3DH ; DIALER ALARMS REG
0293  F0        598  MOV A,@R0  ; MSN HAS CPL OF PREVIOUS ALARMS
0294  47        599  SWAP A
0295  51        600  ANL A,@R1  ; MASK OUT PREVIOUS ALARMS
0296  B980      601  MOV R1,#80H ; POINTER BIT
0298  29        602  LKAG: XCH A,R1
0299  F7        603  RL A ; SHIFT POINTER
029A  9289      604  JB4 SOFF ; NO VALID DIAL
029C  29        605  XCH A,R1
029D  67        606  RRC A ; SHIFT INPUT
029E  E698      607  JNC LKAG ; IF NO ALARM LOOK AGAIN
02A0  29        608  XCH A,R1 ; RESTORE POINTER
                609  ; ALARM TO DIALER REG
02A1  30        610  XCHD A,@R0
                611  ; STEL2 IS CALLED IN EXT INT
                612  ; AS A SUBROUTINE BY DIALER TEST
02A2  B835      613  STEL2: MOV R0,#35H ; CLR TLR
02A4  B000      614  MOV @R0,#00H
02A6  B839      615  MOV R0,#39H
02A8  2360      616  MOV A,#60H
02AA  30        617  XCHD A,@R0 ; START TEL DIAL
02AB  20        618  XCH A,@R0  ; WITHOUT AFFECTING THE 10MSC
02AC  C8        619  DEC R0 ; (37)
02AD  B032      620  MOV @R0,#32H ; SET EMSC FOR 5 SEC
02AF  2301      621  MOV A,#01H ; SIEZE LINE
02B1  14D5      622  CALL CP1B
02B3  14C2      623  CALL HUP ; HANG UP THE TELEPHONE
02B5  83        624  RET
                625  ;
                626  ;        "28"
                627  ; ENTER WITH 39/6=0
02B6  F0        628  DATA: MOV A,@R0 ; GET EMSC
02B7  96C5      629  JNZ NAC4 ; IF NOT ZERO DO NOTHING
02B9  C8        630  DEC R0 ; GET LSN OF DDIR
02BA  30        631  XCHD A,@R0
02BB  C6C6      632  JZ NDGO ; IF LAST PULSE OF DIGIT IS DONE
                633  ;        GET NEXT DIGIT
02BD  07        634  DEC A ; DEC DATA PULSE OUT COUNTER
02BE  30        635  XCHD A,@R0
02BF  B839      636  MOV R0,#39H ; SET TONE ENABLE BIT (39/6)
02C1  F0        637  MOV A,@R0
02C2  4340      638  ORL A,#40H
02C4  A0        639  MOV @R0,A
02C5  83        640  NAC4: RET
                641  ;
02C6  B8EA      642  NDGO: MOV R0,#EAH ; OFFSET FOR DATA
02C8  34E0      643  CALL GDD ; GET NEXT DIGIT FROM PROM
02CA  C8        644  DEC R0 ; GDD MAKES R0=38
02CB  F0        645  MOV A,@R0 ; GET DDIR
                646  ; IS IT TIME FOR ALARM OUT?
02CC  F2D9      647  JB6 ALCD ; 4&5 ARE AI & SKOS
02CE  83        648  RET
                649  ;
02CF  B938      650  SKOS: MOV R1,#0CH ; START KISS OFF SEARCH
02D1  B108      651  MOV @R1,#08
```

| LOC | OBJ | SEQ | SOURCE STATEMENT |
|---|---|---|---|

```
02D3 3003        652       MOV @R0,#03H  ;  SET DDIR FOR KO TONE DEBOUNCE
02D5 18          653       INC R0        ;  2 SEC WAIT FOR KOS
02D6 3014        654       MOV @R0,#14H
02D8 83          655       RET
                 656 ;
02D9 92CF        657 ALCD: JB4 SKOS     ;  5 IS SKOS
02DB B93D        658       MOV R1,#3DH   ;  GET ALARM CODE REG
02DD F1          659       MOV A,@R1
02DE 30          660       XCHD A,@R0    ;  PUT INTO DATA NYBBLE OF DDIR
02DF 83          661 NCNTD: RET
                 662 ;
                 663 ;     GCR=38
02E0 14CB        664 DIAL: CALL PUP     ;  CLOSE DIAL RELAY
02E2 B937        665       MOV R1,#37H   ;  IS EMSC=0?
02E4 F1          666       MOV A,@R1
02E5 96DF        667       JNZ NCNTD     ;  IF NOT, NO MORE TO DO
02E7 B839        668       MOV R0,#39H   ;  CLR OPEN DIAL RELAY BIT (39/4)
02E9 F0          669       MOV A,@R0
02EA 53EF        670       ANL A,#0EFH
02EC A0          671       MOV @R0,A
                 672 ;     R1=37
02ED C9          673       DEC R1        ;  GET DDIR
02EE 31          674       XCHD A,@R1    ;  GET LSN OF DDIR
02EF C6F3        675       JZ IND        ;  IF NOT ZERO CONTINUE DIAL PULSES
02F1 6404        676       JMP NND
02F3 B825        677 IND:  MOV R0,#25H   ;  IF ZERO, GET NEXT NYBBLE
02F5 3412        678       CALL GDD
02F7 31          679       MOV A,@R1     ;  LAST DIGIT DONE?
                 680 ;     R0=37H   R1=36H
02F8 530F        681       ANL A,#0FH    ;  PROM HAS A 0
                 682 ;                      AT THE END OF THE TEL #
02FA 96DF        683       JNZ NCNTD     ;  IF SO START HANDSHAKE SEARCH
02FC B103        684       MOV @R1,#03   ;  TONE DEBOUNCE COUNTER
                 685 ;                      INTO DDIR
02FE B0FF        686       MOV @R0,#0FFH ;  SET EMSC TO 25.6 SEC
0300 18          687       INC R0        ;  GCR
0301 B048        688       MOV @R0,#48H
0303 83          689       RET
                 690 ;
0304 07          691 NND:  DEC A         ;  DEC # OF PULSES TO GO
0305 31          692       XCHD A,@R1
                 693 ;     SET DIAL OPEN BIT (39/4)
0306 F0          694       MOV A,@R0
0307 4310        695       ORL A,#10H
0309 A0          696       MOV @R0,A
030A 83          697 PAUL: RET
                 698 ;
                 699 ;
                 700 ;              "49"
030B F0          701 HSS:  MOV A,@R0     ;  GET EMSC
030C 961E        702       JNZ HEST      ;  IF NOT ZERO, HANDSHAKE DECT.?
030E B835        703       MOV R0,#35H   ;  ADD 8 TO TLR
0310 F0          704       MOV A,@R0
0311 0308        705 TRYA: ADD A,#08H
0313 D218        706       JB6 LSTRY     ;  MAX OF 2 DIAL ATTEMPTS
```

```
LOC    OBJ         SEQ     SOURCE STATEMENT

0315   A2          707 MOV @R0,A
0316   4423        708 JMP SPUP ; HANG UP AND WAIT 5 SEC
                   709 ;
0318   143E        710 LSTRY: CALL HUPT ; HANG UP AND WAIT 5 SECS
031A   19          711 INC R1
031B   B178        712 MOV @R1,#78H
031D   83          713 RET
                   714 ;
031E   C8          715 FHST: DEC R0 ; SET R0=36
031F   F0          716 MOV A,@R0 ; GET DDIR
                   717 ; FOUND END OF HAND SHAKE?
0320   D223        718 JB6 SDATA2 ; IF SO, START DATA OUT
0322   83          719 RET
                   720 ;
0323   B000        721 SDATA2: MOV @R0,#00 ; CLEAR DDIR
0325   B86A        722 MOV R0,#6AH ; OFFSET FOR ACC CODE
0327   34E0        723 CALL GDD ; GET FIRST DIGIT
0329   18          724 INC R0 ; GDD EXIT WITH R0=37
032A   B228        725 MOV @R0,#28H ; SET GCP FOR DATA OUT
032C   83          726 RET
                   727 ;
                   728 ;        "58"
                   729 ;    DIAL TONE SEARCH
032D   B936        730 DTS: MOV R1,#36H ; GET DDIR
032F   F1          731 MOV A,@R1 ; WAS DIAL TONE DETECTED?
0330   F23A        732 JB7 STDIL ; IF SO START DIAL
0332   F0          733 MOV A,@R0 ; GET HMSC
0333   9643        734 JNZ CSRE ; IF NOT ZERO CONTINUE SEARCH
                   735 ;
0335   B835        736 DMOR: MOV R0,#35H ; TLR=0?
0337   F0          737 MOV A,@R0 ; I.F. FIRST DIAL TONE SEARCH?
0338   C611        738 JZ TRYA ; IF SO HANG UP AND DIAL AGAIN
033A   B100        739 STDIL: MOV @R1,#00 ; CLR DDIR
033C   B862        740 MOV R0,#62H ; OFFSET FOR DIAL
033E   34E0        741 CALL GDD ; GET FIRST DIAL DIGIT
0340   18          742 INC R0 ; GDD EXITS WITH R0=37
0341   B038        743 MOV @R0,#38H ; SET GCP FOR DIAL
0343   83          744 CSRE: RET
                   745 ;
                   746 ;        "68"
                   747 ; BEFORE PHONE PICKUP BUT AFTER LINE SIEZE
0344   F0          748 ON: MOV A,@R0 ; GET HMSC
0345   9643        749 JNZ CSRE ; STILL IN 5 SEC WAIT?
0347   B936        750 MOV R1,#36H ; SET TONE DECT COUNTER
0349   B103        751 MOV @R1,#03H
034B   14C7        752 CALL PUPT ; PICK UP PHONE AND SET HMSC
034D   19          753 INC R1 ; SET GCP FOR DIAL TONE SEARCH
034E   B158        754 MOV @R1,#58H
0350   83          755 DONT: RET
                   756 ;
                   757 ;        "78"
                   758 ; ENDING OF DIALER ROUTINE BETWEEN
                   759 ; LAST HANG UP AND LINE RELEASE
0351   F0          760 OFF: MOV A,@R0 ; 5 SEC WAIT DONE?
0352   9662        761 JNZ NAC2 ; IF NOT DO NOTHING
```

```
LCC   OBJ        SEQ        SOURCE STATEMENT

0354  B93E       762  MOV R1,#3EH  ; DISABLE OLD ALARMS
0356  F1         763  MOV A,@R1
0357  47         764  SWAP A
0358  37         765  CPL A
0359  61         766  ANL A,@R1
035A  A1         767  MOV @R1,A
035B  18         768  INC R0   ; SET GCR FOR NO TEL
035C  B0E8       769  MOV @R0,#0E8H
035E  2301       770  MOV A,#01H  ; RELEASE LINE
0360  14D0       771  CALL SP1B ; SET PORT 1 BIT
0362  83         772  NAC2: RET
                 773  ;
                 774  ;
0363  9400       775        MART:   CALL   KEYIN
0365  74AD       776                CALL   TAMPER
0367  B4E1       777                CALL   ALARMS
0369  F4C1       778                CALL   FIRET
036B  F48D       779                CALL   BEEPIT
036D  B476       780                CALL   COMBIT
036F  83         781                RET
0370  B83A       782        TEST:   MOV    R0,#3AH
0372  B002       783                MOV    @R0,#02H ;(3A) START TEST
                 784                         ; BURST TIMER
0374  2388       785                MOV    A,#288H
0376  3A         786                OUTL   P2,A    ; RESTORE PORT 2
0377  B820       787                MOV    R0,#20H
0379  27         788                CLR    A
037A  90         789                MOVX   @R0,A   ;(20)
037B  2390       790                MOV    A,#90H  ;FINISH TURNING
                 791                         ;OFF ENV RELAYS
037D  4442       792                JMP    REENTR
                 793  ;***************************************
                 794  ;****  "RESTART" SUBROUTINE;        ******
                 795  ;****     1. RESTART THE ALARM TIMER ******
                 796  ;****     2. TURN ON "SIREN" BIT     ******
                 797  ;****     3. SET "WARBLE" BIT, UNLESS FIRE ******
                 798  ;****        ALARM IS CURRENT        ******
                 799  ;***************************************
                 800  ;      ALARM TIMER       R2F
                 801  ;      ALARM TIMER SAVE  R2E
                 802  ;      SIREN BIT         R1F.7
                 803  ;      WARBLE BIT        R3.4
                 804  ;      FIRBIT            R22.7
                 805  ;
037F  A9         806        RSTRT:  MOV    R1,A    ;SAVE ACC
0380  B82E       807                MOV    R0,#2EH
0382  F0         808                MOV    A,@R0   ;(2E)
0383  18         809                INC    R0      ;(2F)
0384  A0         810                MOV    @R0,A   ;(2F) START
                 811                         ;ALARM TIMER
0385  B81F       812                MOV    R0,#1FH
0387  B080       813                MOV    @R0,#80H;(1F) SET THE
                 814                         ;SIREN BIT, AND
                 815                         ;ZERO THE MINUTES
                 816                         ;TIMER
```

```
LOC   OBJ        SEQ              SOURCE STATEMENT

0389 FB          817                      MOV      A,R3
038A 53EF        818                      ANL      A,#0EFH
038C AB          819                      MOV      R3,A        ;TURN OFF
                 820                                           ;WARBLE BIT
038D B822        821                      MOV      R0,#22H
038F F0          822                      MOV      A,@R0     ;(22)
0390 F296        823                      JB7      $+6
0392 FB          824                      MOV      A,R3
0393 4310        825                      ORL      A,#10H
0395 AB          826                      MOV      R3,A
0396 F9          827                      MOV      A,R1        ;RESTORE ACC
0397 83          828                      RET
                 829  ;***********************************************
                 830  ;***** SUBROUTINE TO SET THE "ARM BLINK" BIT ****
                 831  ;***** R24.1 =1.   *****************************
                 832  ;***********************************************
0398 A9          833           ABLINK: MOV     R1,A       ;SAVE ACC
0399 B824        834                   MOV     R0,#24H
039B F0          835                   MOV     A,@R0     ;(24)
039C 4302        836                   ORL     A,#02
039E A0          837                   MOV     @R0,A     ;(24)
039F F9          838                   MOV     A,R1
03A0 83          839           EABLK:  RET
                 840  ;***********************************************
                 841  ;****** SUBROUTINE TO ZERO THE INTERDIGIT *******
                 842  ;************** TIMER *************************
03A1 B829        843           ZTIMER: MOV     R0,#29H
03A3 27          844                   CLR     A
03A4 A0          845                   MOV     @R0,A
03A5 83          846                   RET
                 847  ;***********************************************
                 848  ;***** SUBROUTINE TO ZERO THE SECOND TIMER *****
                 849  ;***********************************************
03A6 B81E        850           ZERSEC: MOV     R0,#1EH
03A8 F0          851                   MOV     A,@R0     ;(1E)
03A9 53F0        852                   ANL     A,#0F0H
03AB A0          853                   MOV     @R0,A
03AC 83          854                   RET
                 855  ;***********************************************
                 856  ;********** SUBROUTINE "TAMPER" ***************
                 857  ;***********************************************
                 858  ;        THIS SUBROUTINE ARMS THE PANEL AND
                 859  ;        INITIATES A BURGLARY ALARM IF IT
                 860  ;        SENSES A TAMPER VIOLATION; T0 = 1
                 861  ;        IF VIOLATED.
                 862  ;
03AD 36BA        863           TAMPER: JT0     NOTAMP
03AF B820        864                   MOV     R0,#20H
03B1 F0          865                   MOV     A,@R0     ;(20)
03B2 94E0        866                   CALL    ARM3
03B4 B821        867                   MOV     R0,#21H
03B6 F0          868                   MOV     A,@R0     ;(21)
03B7 4310        869                   ORL     A,#10H
03B9 A0          870                   MOV     @R0,A     ;(21) SET INSTANT
                 871                                     ;LOOP VIOLATION
```

```
LOC   OBJ        SEQ       SOURCE STATEMENT 872
03BA E3        873         NOTAMP: RET
               874   ;*********************************************
               875   ;********* SUBROUTINE "KEYIN"*****************
               876   ;*********************************************
               877   ; INPUTS KEY DEPRESSION.
               878   ; CHECKS CODES, ENTERS VALID TIMER CHANGES
               879   ; INTO APPROPRIATE REGISTERS.
               880   ;
               881   ;         INTERDIGIT TIMER      R29
               882   ;         VECTOR                R2A (4-7)
               883   ;         MASTER MATCH FLAG     R3.3
               884   ;         LEFT DOT SAVE         R3.1
               885   ;         ARMED FLAG            R3.0
               886   ;         KEY INPUT DATA        R4
               887   ;         EXIT TIME SAVE        R2D
               888   ;         ENTRY TIME SAVE       R2D
               889   ;         ALARM TIME SAVE       R2E
               890   ;         ALTERNATE CODE        R31 = 2,1
               891   ;                               R32 = 4,3
               892   ;         ENTERED CODE          R26 = 2,1
               893   ;                               R27 = 4,3
               894   ;
               895   ; WHEN THIS SUBROUTINE IS CALLED, F1 = 1
               896   ;     IF A NEW KEY IS DOWN.
               897   ;
               898   ; SUBROUTINE CALLS TO: ROTATE (INCLUDING
               899   ;                              ENTRY POINTS AT
               900   ;                              ROTAT2 AND ROTNIB)
               901   ;                     CODCOM   F0=1 FOR EITHER
               902   ;                              CODE MATCH
               903   ;                              R3.3=1 FOR MASTER
               904   ;                              CODE MATCH
               905   ;                     BCDBIN   NEEDS R0 TO POINT
               906   ;                              AT REGISTER TO
               907   ;                              BE CONVERTED
               908   ;                     ZTIMER   SET INTERDIGIT
               909   ;                              TO 00
0400           910                ORG     400H
0400 B829      911        KEYIN:  MOV     R0,#29H    ;POINT TO
               912                                   ;DIGIT TIMER
0402 F0        913                MOV     A,@R0      ;(29)
0403 18        914                INC     R0         ;(2A)
0404 9612      915                JNZ     DOWN40     ;JUMP IF NOT
               916                                   ;TIMED OUT
0406 FB        917                MOV     A,R3
0407 53F5      918                ANI     A,#0F5H    ;RESET "MASTER"
               919                                   ;AND "LEFT DOT"
               920                                   ;FLAGS
0409 B926      921                MOV     R1,#26H
040B A1        922                MOV     @R1,A
040C 19        923                INC     R1
040D A1        924                MOV     @R1,A      ;(27)CLEAR DIGIT
               925                                   ;ENTRY REGISTERS
040E AB        926                MOV     R3,A
```

| LOC | OBJ | SEQ | | SOURCE STATEMENT | | |
|---|---|---|---|---|---|---|
| 040F | F0 | 927 | | MOV | A,@R0 | ;(2A) |
| 0410 | 9683 | 928 | | JNZ | DOWN41 | ;VECTOR IS |
| | | 929 | | | | ;NON-ZERO; DO |
| | | 930 | | | | ;BCD-BINARY |
| | | 931 | | | | ;CONVERSION ON |
| | | 932 | | | | ;VECTORED REG. |
| 0412 | 7615 | 933 | DOWN40: | JF1 | $+3 | ;JUMP IF NEW |
| | | 934 | | | | ;KEY IS DOWN |
| 0414 | 83 | 935 | | RET | | |
| | | 936 | ; | | | |
| | | 937 | ; | CHECK FOR MEDICAL OR | | |
| | | 938 | ; | PANIC KEY DEPRESSIONS | | |
| | | 939 | ; | | | |
| 0415 | B821 | 940 | | MOV | R0,#21H | |
| 0417 | FC | 941 | | MOV | A,R4 | |
| 0418 | 530F | 942 | | ANL | A,#0FH | |
| 041A | AC | 943 | | MOV | R4,A | |
| 041B | D30B | 944 | | XRL | A,#0BH | |
| 041D | 9623 | 945 | | JNZ | NOMED | ;JUMP IF NO |
| | | 946 | | | | ;MEDICAL |
| 041F | 2340 | 947 | | MOV | A,#40H | |
| 0421 | 8430 | 948 | | JMP | DOWN51 | |
| 0423 | FC | 949 | NOMED: | MOV | A,R4 | |
| 0424 | D30F | 950 | | XRL | A,#0FH | |
| 0426 | 9637 | 951 | | JNZ | DOWN52 | ;JUMP IF |
| | | 952 | | | | ;NOT PANIC |
| 0428 | FB | 953 | | MOV | A,R3 | |
| 0429 | 4301 | 954 | | ORL | A,#01 | |
| 042B | AB | 955 | | MOV | R3,A | ;SET ARMED BIT |
| 042C | 747F | 956 | | CALL | RESTRT | |
| 042E | 2320 | 957 | | MOV | A,#20H | |
| 0430 | 40 | 958 | DOWN51: | ORL | A,@R0 | |
| 0431 | A0 | 959 | | MOV | @R0,A | ;(21) |
| 0432 | 74A1 | 960 | | CALL | ZTIMER | |
| | | 961 | | | | ;RESET "MASTER" |
| | | 962 | | | | ;AND "LEFT DOT" |
| | | 963 | | | | ;FLAGS NEXT PASS |
| 0434 | 7498 | 964 | | CALL | ABLINK | |
| 0436 | 83 | 965 | | RET | | |
| 0437 | B829 | 966 | DOWN52: | MOV | R0,#29H | |
| 0439 | B005 | 967 | | MOV | @R0,#05 | ;(29) RESTART |
| | | 968 | | | | ;DIGIT TIMER |
| 043B | 18 | 969 | | INC | R0 | ;(2A) |
| 043C | F0 | 970 | | MOV | A,@R0 | |
| 043D | 53F0 | 971 | | ANL | A,#0F0H | |
| 043F | 967C | 972 | | JNZ | DOWN42 | ;JUMP IF THERE IS |
| | | 973 | | | | ;A VALID CURRENT |
| | | 974 | | | | ;VECTOR |
| 0441 | FB | 975 | | MOV | A,R3 | |
| 0442 | 37 | 976 | | CPL | A | |
| 0443 | 7245 | 977 | | JB3 | DOWN43 | ;JUMP IF |
| | | 978 | | | | ;"MASTER" = 0 |
| 0445 | FC | 979 | | MOV | A,R4 | |
| 0446 | 47 | 980 | | SWAP | A | |
| 0447 | 53F0 | 981 | | ANL | A,#0F0H | |

```
LOC  OBJ         SEQ           SOURCE STATEMENT

0449 A0          982                   MOV    @R0,A      ;(2A) SET
                 983                                     ;NEW VECTOR
044A 83          984                   RET
044B B467        985           DOWN43: CALL   ROTATE     ;SHIFT IN
                 986                                     ;DIGIT ENTRY
044D B442        987                   CALL   CODCOM     ;COMPARE ENTERED
                 988                                     ;CODE TO MASTER
                 989                                     ;AND ALTERNATE
                 990                                     ;CODES
044F B82A        991                   MOV    R0,#2AH
0451 FB          992                   MOV    A,R3
0452 37          993                   CPL    A
0453 3256        994                   JB1    DOWN44     ;JUMP IF
                 995                                     ;LEFT DOT SAVE =00
0455 83          996                   RET
0456 FC          997           DOWN44: MOV    A,R4
0457 D30C        998                   XRL    A,#0CH
0459 966B        999                   JNZ    DOWN45     ;JUMP IF THE NEW
                1000                                     ;DIGIT IS NOT
                1001                                     ;LEFT DOT
045B FB         1002                   MOV    A,R3
045C 4302       1003                   ORL    A,#02
045E AB         1004                   MOV    R3,A       ;SET "LEFT DOT
                1005                                     ;SAVE" = 1
045F 83         1006                   RET
0460 B663       1007           DOWN45: JF0    $+3        ;JUMP IF MATCH
0462 83         1008                   RET
0463 B93E       1009 MOV R1,#3EH  ; TURN OFF THE DIALER
0465 91F0       1010 MOV @R1,#0F0H ; REENABLE DIALER ALARMS
0467 143E       1011 CALL HUPT    ; HANG UP AND WAIT
0469 B838       1012 MOV R0,#38H  ; SET DIAL END CODE
046B B07B       1013 MOV @R0,#7BH
046D FB         1014                   MOV    A,R3
046E 53DF       1015                   ANL    A,#0DFH
0470 AB         1016                   MOV    R3,A       ;FINISH RESETTING
                1017                                     ;LCD BLINK FLAG
0471 1277       1018                   JB0    $+6        ;JUMP IF ARMED
0473 94CF       1019                   CALL   ARM
0475 8479       1020                   JMP    $+4
0477 94FE       1021                   CALL   DISARM
0479 7441       1022                   CALL   ZTIMER
047B 83         1023                   RET
047C FC         1024           DOWN42: MOV    A,R4        ;VALID VECTOR
047D 530F       1025                   ANL    A,#0FH
047F D30B       1026                   XRL    A,#0BH      ;CHECK FOR
                1027                                      ;LEFT DOT
0481 96A4       1028                   JNZ    DOWN46      ;JUMP IF NOT
                1029                                      ;LEFT DOT
0483 B82B       1030           DOWN41: MOV    R0,#2BH
0485 B92A       1031                   MOV    R1,#2AH
0487 F1         1032                   MOV    A,@R1
0488 D340       1033                   XRL    A,#40H
048A C6A0       1034                   JZ     DOWN47      ;JUMP IF
                1035                                      ;EXIT VECTOR
048C 18         1036                   INC    R0          ;(2C)
```

| LOC | OBJ | SEQ | | SOURCE STATEMENT | | |
|---|---|---|---|---|---|---|
| 048D | 18 | 1037 | | INC | R0 | ;(2D) |
| 048E | F1 | 1038 | | MOV | A,@R1 | ;(2A) |
| 048F | D350 | 1039 | | XRL | A,#50H | |
| 0491 | C6A0 | 1040 | | JZ | DOWN47 | ;JUMP IF |
| | | 1041 | | | | ;ENTRY VECTOR |
| 0493 | 18 | 1042 | | INC | R0 | ;(2E) |
| 0494 | F1 | 1043 | | MOV | A,@R1 | ;(2A) |
| 0495 | D360 | 1044 | | XRL | A,#60H | |
| 0497 | C6A0 | 1045 | | JZ | DOWN47 | ;JUMP IF |
| | | 1046 | | | | ;ALARM VECTOR |
| 0499 | B82A | 1047 | DOWN48: | MOV | R0,#2AH | |
| 049B | B000 | 1048 | | MOV | @R0,#00 | ;(2A) ZERO THE |
| | | 1049 | | | | ;VECTOR |
| 049D | 74A1 | 1050 | | CALL | ZTIMER | ;ZERO THE |
| | | 1051 | | | | ;"MASTER" FLAG |
| | | 1052 | | | | ;AND "LEFT DOT |
| | | 1053 | | | | ;SAVE" FLAGS |
| | | 1054 | | | | ;NEXT PASS |
| 049F | 83 | 1055 | | RET | | |
| 04A0 | 341C | 1056 | DOWN47: | CALL | BCDBIN | ;R0 HAS BEEN |
| | | 1057 | | | | ;LEFT POINTING |
| | | 1058 | | | | ;TO THE PROPER |
| | | 1059 | | | | ;REGISTER |
| 04A2 | 8499 | 1060 | | JMP | DOWN48 | |
| 04A4 | B92A | 1061 | DOWN46: | MOV | R1,#2AH | ;SHIFT NIBBLE |
| 04A6 | F1 | 1062 | | MOV | A,@R1 | ;(2A) |
| 04A7 | D330 | 1063 | | XRL | A,#30H | |
| 04A9 | 96B2 | 1064 | | JNZ | DOWN49 | ;JUMP IF DON'T |
| | | 1065 | | | | ;HAVE TO SHIFT |
| | | 1066 | | | | ;DIGIT INTO |
| | | 1067 | | | | ;ALTERNATE CODE |
| 04AB | B932 | 1068 | | MOV | R1,#32H | |
| 04AD | B831 | 1069 | | MOV | R0,#31H | |
| 04AF | B46B | 1070 | | CALL | ROTAT2 | ;SHIFT IN |
| 04B1 | 83 | 1071 | | RET | | |
| 04B2 | B82E | 1072 | DOWN49: | MOV | R0,#2EH | |
| 04B4 | F1 | 1073 | | MOV | A,@R1 | ;(2A) |
| 04B5 | D340 | 1074 | | XRL | A,#40H | |
| 04B7 | C6CA | 1075 | | JZ | DOWN50 | ;JUMP IF |
| | | 1076 | | | | ;EXIT VECTOR |
| 04B9 | 18 | 1077 | | INC | R0 | ;(2C) |
| 04BA | 18 | 1078 | | INC | R0 | ;(2D) |
| 04BB | F1 | 1079 | | MOV | A,@R1 | |
| 04BC | D350 | 1080 | | XRL | A,#50H | |
| 04BE | C6CA | 1081 | | JZ | DOWN50 | ;JUMP IF |
| | | 1082 | | | | ;ENTRY VECTOR |
| 04C0 | 18 | 1083 | | INC | R0 | ;(2E) |
| 04C1 | F1 | 1084 | | MOV | A,@R1 | ;(2A) |
| 04C2 | D360 | 1085 | | XRL | A,#60H | |
| 04C4 | C6CA | 1086 | | JZ | DOWN50 | ;JUMP IF |
| | | 1087 | | | | ;ALARM VECTOR |
| | | 1088 | ; | | | |
| | | 1089 | ; | | NO MATCH TO VALID VECTOR; | |
| | | 1090 | ; | | ZERO EVERYTHING | |
| | | 1091 | ; | | | |

| LOC | OBJ | SEQ | SOURCE STATEMENT | | | |
|---|---|---|---|---|---|---|
| 04C6 | 74A1 | 1092 | | CALL | ZTIMER | ;RESET "MASTER" |
| | | 1093 | | | | ;AND "LEFT OUT" |
| | | 1094 | | | | ;FLAGS NEXT PASS |
| 04C8 | A1 | 1095 | | MOV | @R1,A | ;(2A) ZERO THE |
| | | 1096 | | | | ;VECTOR AND |
| | | 1097 | | | | ;DIGIT COUNTER |
| 04C9 | 83 | 1098 | | RET | | |
| 04CA | F8 | 1099 | DOWN5Ø: | MOV | A,R0 | |
| 04CB | A9 | 1100 | | MOV | R1,A | |
| 04CC | 346F | 1101 | | CALL | ROTNIB | ;ROTATE THE |
| | | 1102 | | | | ;VECTORED |
| | | 1103 | | | | ;NIBBLE |
| 04CE | 83 | 1104 | | RET | | |
| | | 1105 | ;******************************************* | | | |
| | | 1106 | ;*************** SUBROUTINE "ARM" *************** | | | |
| | | 1107 | ;******************************************* | | | |
| 04CF | B822 | 1108 | ARM: | MOV | R0,#22H | |
| 04D1 | F0 | 1109 | | MOV | A,@R0 | |
| 04D2 | C6D7 | 1110 | | JZ | ARM2 | |
| 04D4 | 94FE | 1111 | | CALL | DISARM | ;DON'T ARM IF ANY |
| | | 1112 | | | | ;CURRENT ALARMS |
| 04D6 | 83 | 1113 | | RET | | |
| 04D7 | 74A6 | 1114 | ARM2: | CALL | ZERSEC | |
| 04D9 | B820 | 1115 | | MOV | R0,#20H | |
| 04DB | F0 | 1116 | | MOV | A,@R0 | ;(20) |
| 04DC | 32E0 | 1117 | | JB1 | ARM3 | ;DON'T ALLOW ARM |
| | | 1118 | | | | ;IF LOOP IS BAD |
| 04DE | 84FD | 1119 | | JMP | FAULT | |
| 04E0 | 438C | 1120 | ARM3: | ORL | A,#8CH | |
| 04E2 | A0 | 1121 | | MOV | @R0,A | ;(20) TURN ON |
| | | 1122 | | | | ;"ARMED" LED |
| 04E3 | 18 | 1123 | | INC | R0 | ;(21) |
| 04E4 | F0 | 1124 | | MOV | A,@R0 | ;(21) |
| 04E5 | B925 | 1125 | | MOV | R1,#25H | |
| 04E7 | 32ED | 1126 | | JB1 | $+6 | ;JUMP IF D/N |
| | | 1127 | | | | ;LOOP IS BAD |
| 04E9 | F1 | 1128 | | MOV | A,@R1 | ;(25) |
| 04EA | 4302 | 1129 | | ORL | A,#02 | |
| 04EC | A1 | 1130 | | MOV | @R1,A | ;(25) SET |
| | | 1131 | | | | ;"D/N GOOD |
| | | 1132 | | | | ;WHEN ARMED" BIT |
| 04ED | FB | 1133 | | MOV | A,R3 | |
| 04EE | 4301 | 1134 | | ORL | A,#01 | |
| 04F0 | AB | 1135 | | MOV | R3,A | ;SET "ARMED" BIT |
| 04F1 | 56FD | 1136 | | JT1 | FAULT | ;JUMP IF TAMPER |
| 04F3 | C9 | 1137 | | DEC | R1 | (24) |
| 04F4 | F1 | 1138 | | MOV | A,@R1 | ;(24) |
| 04F5 | 4328 | 1139 | | ORL | A,#28H | |
| | | 1140 | | | | ;TURN ON |
| | | 1141 | | | | ;"EXIT TIMER |
| | | 1142 | | | | ;RUNNING" AND |
| | | 1143 | | | | ;"BEEP" FLAGS |
| 04F7 | A1 | 1143 | | MOV | @R1,A | ;(24) |
| 04F8 | B82B | 1144 | | MOV | R0,#2BH | |
| 04FA | F0 | 1145 | | MOV | A,@R0 | ;(2B) |
| 04FB | 18 | 1146 | | INC | R0 | ;(2C) |
| 04FC | A0 | 1147 | | MOV | @R0,A | ;(2C) START |
| | | 1148 | | | | ;EXIT TIMER |

| LOC | OBJ | SEQ | SOURCE STATEMENT | | |
|---|---|---|---|---|---|
| 04FD 83 | | 1149 | FAULT: RET | | |
| | | 1150 | ;*********************************** | | |
| | | 1151 | ;********** SUBROUTINE "DISARM" ************** | | |
| | | 1152 | ;*********************************** | | |
| 04FE B81F | | 1153 | DISARM: MOV | R0,#1FH | |
| 0500 F0 | | 1154 | MOV | A,@R0 | ;(1F) |
| 0501 537F | | 1155 | ANL | A,#7FH | |
| 0503 A0 | | 1156 | MOV | @R0,A | ;(1F) RESET |
| | | 1157 | | | ; SIREN BIT |
| 0504 18 | | 1158 | INC | R0 | ;(20) |
| 0505 F0 | | 1159 | MOV | A,@R0 | ;(20) |
| 0506 537F | | 1160 | ANL | A,#7FH | |
| 0508 A0 | | 1161 | MOV | @R0,A | ;(20) |
| 0509 27 | | 1162 | CLR | A | |
| 050A 18 | | 1163 | INC | R0 | ;(21) |
| 050B A0 | | 1164 | MOV | @R0,A | ;(21)CLEAR NEW |
| | | 1165 | | | ;ALARMS |
| 050C 18 | | 1166 | INC | R0 | ;(22) |
| 050D A0 | | 1167 | MOV | @R0,A | ;(22)CLEAR |
| | | 1168 | | | ;CURRENT ALARMS |
| 050E AB | | 1169 | MOV | R3,A | ;CLEAR R3 |
| 050F 18 | | 1170 | INC | R0 | ;(23) |
| 0510 18 | | 1171 | INC | R0 | ;(24) |
| 0511 A0 | | 1172 | MOV | @R0,A | ;(24)CLEAR R24 |
| 0512 18 | | 1173 | INC | R0 | ;(25) |
| 0513 A0 | | 1174 | MOV | @R0,A | ;(25) RESET: |
| | | 1175 | | | ;"PAD FIRE" |
| | | 1176 | | | ;"LOW BATT" |
| | | 1177 | | | ;"L/N GOOD |
| | | 1178 | | | ;WHEN ARMED" |
| 0514 B82C | | 1179 | MOV | R0,#2CH | |
| 0516 A0 | | 1180 | MOV | @R0,A | ;(2C)CLEAR |
| | | 1181 | | | ;E/E TIMER |
| 0517 B82F | | 1182 | MOV | R0,#2FH | |
| 0519 B000 | | 1183 | MOV | @R0,#00 | ;CLEAR ALARM |
| | | 1184 | | | ;TIMER |
| 051B 83 | | 1185 | RET | | |
| | | 1186 | ;*********************************** | | |
| | | 1187 | ;******* THIS IS BCDBIN ************************ | | |
| | | 1188 | ; R0= POINT TO REG WHICH MUST BE CONVERTED | | | |
| | | 1189 | ; R1= TEMPORARY STORAGE OF CONVERTED DATA. | | | |
| | | 1190 | ; THE NIBBLES ARE SWAPPED ON ENTRY | | | |
| | | 1191 | ;*********************************** | | |
| 051C F0 | | 1192 | BCDBIN: MOV | A,@R0 | ;GET DATA TO BE |
| | | 1193 | | | ;CONVERTED |
| 051D B439 | | 1194 | CALL | CONV | |
| 051F E7 | | 1195 | RL | A | |
| 0520 A9 | | 1196 | MOV | R1,A | |
| 0521 E7 | | 1197 | RL | A | |
| 0522 E7 | | 1198 | RL | A | |
| 0523 69 | | 1199 | ADD | A,R1 | |
| 0524 A9 | | 1200 | MOV | R1,A | ;SAVE BINARY VALUE |
| | | 1201 | | | ;OF TENS |
| 0525 F0 | | 1202 | MOV | A,@R0 | ;GET ONES |
| 0526 47 | | 1203 | SWAP | A | |
| 0527 B439 | | 1204 | CALL | CONV | ;A TO 2 |
| 0529 69 | | 1205 | ADD | A,R1 | |
| 052A A0 | | 1206 | MOV | @R0,A | |
| 052B F8 | | 1207 | MOV | A,R0 | |
| 052C D32E | | 1208 | XRL | A,#2EH | |
| 052E C631 | | 1209 | JZ | $+3 | |
| 0530 10 | | 1210 | INC | @R0 | |

```
LOC  OBJ      SEQ        SOURCE STATEMENT

0531 B82E    1211                MOV     R0,#2EH  ;POINT TO
             1212                                 ;ALARM TIMER
0533 F0      1213                MOV     A,@R0    ;(2E)
0534 9639    1214                JNZ     $+4
0536 B001    1215                MOV     @R0,#01  ;(2E) DON'T ALLOW
             1216                                 ;ALARM TIME=00
0538 83      1217                RET
0539 530F    1218        CONV:   ANL     A,#0FH   ;MASK OFF MSN
053B D30A    1219                XRL     A,#0AH   ;ZERO?
053D C641    1220                JZ      ZER
053F D30A    1221                XRL     A,#0AH   ;IF NOT, RESTORE
0541 83      1222        ZER:    RET
             1223   ;*********************************************
             1224   ;*** SUBR "CODCOM" - COMPARES ENTERED 4-DIGIT ***
             1225   ;*** CODE TO MASTER AND/OR AUXILIARY CODES. *****
             1226   ;*********************************************
             1227   ;       SETS F0 = 1 FOR EITHER CODE MATCH
             1228   ;       SETS R3.3 = 1 FOR MATCH TO MASTER CODE
             1229   ;
             1230   ;       AUX     R31=2,1  R32=4,3
             1231   ;       ENTERED R26=2,1  R27=4,3
             1232   ;       MASTER  @60,2,1  @61=4,3
             1233   ;
0542 85      1234        CODCOM: CLR     F0
0543 B960    1235                MOV     R1,#60H  ;POINT TO
             1236                                 ;MASTER CODE
0545 B826    1237                MOV     R0,#26H  ;POINT TO
             1238                                 ;ENTERED CODE
0547 F1      1239                MOVX    A,@R1    ;(60) MASTER 2,1
             1240                                 ;TO ACC
0548 D0      1241                XRL     A,@R0    ;(26) COMPARE
             1242                                 ;TO ENTERED 2,1
0549 9657    1243                JNZ     CHKAUX   ;JUMP IF NO MATCH
054B 18      1244                INC     R0       ;(27)
054C 19      1245                INC     R1       ;(61)
054D F1      1246                MOVX    A,@R1    ;(61) MASTER
             1247                                 ;4,3 TO ACC
054E D0      1248                XRL     A,@R0    ;(27) COMPARE
             1249                                 ;TO ENTERED 4,3
054F 9657    1250                JNZ     CHKAUX   ;JUMP IF NO MATCH
0551 95      1251                CPL     F0       ;FLAG A MATCH
0552 FB      1252                MOV     A,R3
0553 4308    1253                ORL     A,#08H   ;SET MASTER MATCH
0555 AB      1254                MOV     R3,A
0556 83      1255                RET
0557 B826    1256        CHKAUX: MOV     R0,#26H  ;POINT TO
             1257                                 ;ENTERED CODE
0559 B931    1258                MOV     R1,#31H  ;POINT TO
             1259                                 ;AUX CODE
055B F1      1260                MOV     A,@R1    ;(31) AUX 2,1
             1261                                 ;TO ACC
055C D0      1262                XRL     A,@R0    ;(26) COMPARE
             1263                                 ;TO ENTERED 2,1
055D 9666    1264                JNZ     BLITZ    ;JUMP IF NO MATCH
055F 18      1265                INC     R0       ;(27)
0560 19      1266                INC     R1       ;(32)
0561 F1      1267                MOV     A,@R1    ;(32)
0562 D0      1268                XRL     A,@R0    ;(27) COMPARE
             1269                                 ;TO ENTERED 4,3
0563 9666    1270                JNZ     BLITZ    ;JUMP IF NO MATCH
0565 95      1271                CPL     F0       ;SET "MATCH" FLAG
```

| LOC | OBJ | SEQ | SOURCE STATEMENT | | | |
|---|---|---|---|---|---|---|
| 0566 | 83 | 1272 | BLITZ: | RET | | |
| | | 1273 | ;************************************** | | | |
| | | 1274 | ;********** SUBROUTINE "ROTATE" ********* | | | |
| | | 1275 | ;************************************** | | | |
| 0567 | B826 | 1276 | ROTATE: | MOV | R0,#26H | ;DIGITS 2,1 |
| 0569 | B927 | 1277 | | MOV | R1,#27H | ;DIGITS 4,3 |
| 056B | F0 | 1278 | ROTAT2: | MOV | A,@R0 | ;(26) |
| 056C | 31 | 1279 | | XCHD | A,@R1 | ;(27) |
| 056D | 47 | 1280 | | SWAP | A | |
| 056E | A0 | 1281 | | MOV | @R0,A | ;(26) R26 = 3,2 |
| | | 1282 | ; | | | R27 = 4,1 |
| 056F | F1 | 1283 | ROTNIB: | MOV | A,@R1 | ;(27) |
| 0570 | 53F0 | 1284 | | ANL | A,#0F0H | |
| 0572 | 4C | 1285 | | ORL | A,R4 | ;ADD NEW DIGIT |
| 0573 | 47 | 1286 | | SWAP | A | |
| 0574 | A1 | 1287 | | MOV | @R1,A | ;(27) R26 = 3,2 |
| | | 1288 | ; | | | R27 = 5,4 |
| 0575 | 83 | 1289 | | RET | | |
| | | 1290 | ;************************************** | | | |
| | | 1291 | ;***** SUBROUTINE "COMBYT" ; GENERATES THE ***** | | | |
| | | 1292 | ;***** APPROPRIATE ALARM/SUPERVISORY CODES ***** | | | |
| | | 1293 | ;***** FOR THE PIONEER DATACOM. ***** | | | |
| | | 1294 | ;************************************** | | | |
| | | 1295 | ; R22 = CURRENT ALARMS | | | |
| | | 1296 | ; R3F = OUTPUT TO DATACOM | | | |
| | | 1297 | ; | | | |
| 0576 | BE00 | 1298 | COMBYT: | MOV | R6,#00 | ;CLEAR SAVE REG |
| 0578 | B822 | 1299 | | MOV | R0,#22H | ;POINT CURRENT |
| 057A | B93F | 1300 | | MOV | R1,#3FH | ;POINT OUTPUT |
| 057C | F0 | 1301 | | MOV | A,@R0 | ;(22) |
| 057D | C68A | 1302 | | JZ | NOLARM | ;JUMP IF NO |
| | | 1303 | | | | ;ALARMS NOW |
| 057F | F7 | 1304 | | RLC | A | ;"FIRE" TO CARRY |
| 0580 | 2E | 1305 | | XCH | A,R6 | |
| 0581 | 67 | 1306 | | RRC | A | |
| 0582 | 2E | 1307 | | XCH | A,R6 | |
| 0583 | F7 | 1308 | | RLC | A | ;MEDICAL TO CARRY |
| 0584 | 2E | 1309 | | XCH | A,R6 | |
| 0585 | 67 | 1310 | | RRC | A | |
| 0586 | 97 | 1311 | | CLR | C | ;CLEAR "BA" BIT |
| 0587 | 67 | 1312 | | RRC | A | |
| 0588 | 2E | 1313 | | XCH | A,R6 | |
| 0589 | F7 | 1314 | | RLC | A | |
| 058A | 2E | 1315 | | XCH | A,R6 | ;EMGCY TO CARRY |
| 058B | 67 | 1316 | | RRC | A | |
| 058C | 47 | 1317 | | SWAP | A | |
| 058D | 530F | 1318 | | ANL | A,#0FH | |
| 058F | 2E | 1319 | | XCH | A,R6 | |
| 0590 | 53F8 | 1320 | | ANL | A,#0F8H | ;CHECK BA BITS |
| 0592 | C6BA | 1321 | | JZ | STORE | ;NO BA NOW; |
| | | 1322 | ; | | | |
| | | 1323 | ; R6 CONTAINS FINISHED DATACOM BYTE | | | |
| | | 1324 | ; | | | |
| 0594 | 2304 | 1325 | | MOV | A,#04 | |
| 0596 | 4E | 1326 | | ORL | A,R6 | ;SET BA BIT |
| 0597 | AE | 1327 | | MOV | R6,A | |
| 0598 | A4BA | 1328 | | JMP | STORE | |
| | | 1329 | ; | | | |
| | | 1330 | ; NO CURRENT ALARMS; | | | |
| | | 1331 | ; OUTPUT SUPERVISORY CODE | | | |
| | | 1332 | ; | | | |
| 059A | 2310 | 1333 | NOLARM: | MOV | A,#10H | |
| 059C | 4E | 1334 | | ORL | A,R6 | |

| LOC | OBJ | SEQ | SOURCE STATEMENT | | |
|---|---|---|---|---|---|
| 059F | AE | 1335 | MOV | R6,A | ;SET SUPERVISORY |
|  |  | 1336 |  |  | ;BIT |
| 05A0 | B825 | 1337 | MOV | R0,#25H |  |
| 05A2 | F0 | 1338 | MOV | A,@R0 | ;(25) |
| 05A3 | 37 | 1339 | CPL | A |  |
| 05A4 | 92A8 | 1340 | JB4 | $+6 | ;JUMP IF BATTERY |
|  |  | 1341 |  |  | ;VOLTAGE OK |
| 05A6 | 2308 | 1342 | MOV | A,#08 |  |
| 05A8 | 4E | 1343 | ORL | A,R6 |  |
| 05A9 | AE | 1344 | MOV | R6,A | ;SET "LOW |
|  |  | 1345 |  |  | ;BATTERY" BIT |
| 05AA | C8 | 1346 | DEC | R0 | ;(24) |
| 05AB | F0 | 1347 | MOV | A,@R0 | ;(24) |
| 05AC | 37 | 1348 | CPL | A |  |
| 05AD | F2B1 | 1349 | JB7 | $+6 | ;JUMP IF NO |
|  |  | 1350 |  |  | ;FIRE TROUBLE |
| 05AF | 2301 | 1351 | MOV | A,#01 |  |
| 05B1 | 4E | 1352 | ORL | A,R6 |  |
| 05B2 | AE | 1353 | MOV | R6,A | ;SET FIRE TROUBLE |
| 05B3 | B880 | 1354 | MOV | R0,#80H | ;XRAM |
| 05B5 | 80 | 1355 | MOVX | A,@R0 | ;(80) |
| 05B6 | B2BA | 1356 | JB5 | $+6 | ;JUMP IF AC |
|  |  | 1357 |  |  | ;POWER OK |
| 05B8 | 2302 | 1358 | MOV | A,#02 |  |
| 05BA | 4E | 1359 | ORL | A,R6 |  |
| 05BB | AE | 1360 | MOV | R6,A | ;SET AC PWR DOWN |
| 05BC | F1 | 1361 | STORE: MOV | A,@R1 |  |
| 05BD | 53E0 | 1362 | ANL | A,#0E0H |  |
| 05BF | 4E | 1363 | ORL | A,R6 |  |
| 05C0 | A1 | 1364 | MOV | @R1,A | ;PUT COMPLETED |
|  |  | 1365 |  |  | ;CODE BYTE INTO |
|  |  | 1366 |  |  | ;DATACOM OUTPUT |
|  |  | 1367 |  |  | ;REGISTER |
| 05C1 | B83A | 1368 | MOV | R0,#3AH | ;POINT TO TEST |
|  |  | 1369 |  |  | ;BURST COUNTER |
| 05C3 | B925 | 1370 | MOV | R1,#25H | ;POINT TO FIRE |
|  |  | 1371 |  |  | ;TEST FAILURE |
| 05C5 | F1 | 1372 | MOV | A,@R1 | ;(25) |
| 05C6 | F2CF | 1373 | JB7 | DONE7 | ;JUMP IF FIRE |
|  |  | 1374 |  |  | ;TEST FAILED |
| 05C8 | F0 | 1375 | MOV | A,@R0 | ;(3A) |
| 05C9 | B81F | 1376 | MOV | R0,#1FH |  |
| 05CB | C6CF | 1377 | JZ | DONE7 | ;JUMP IF NOT |
|  |  | 1378 |  |  | ;CURRENTLY OUTPUTTING |
|  |  | 1379 |  |  | ;A SIREN TEST BURST |
| 05CD | F0 | 1380 | MOV | A,@R0 | ;(1F) |
| 05CE | 4380 | 1381 | ORL | A,#80H |  |
| 05D0 | A0 | 1382 | MOV | @R0,A | ;TURN ON SIREN |
| 05D1 | FB | 1383 | DONE7: MOV | A,R3 |  |
| 05D2 | 37 | 1384 | CPL | A |  |
| 05D3 | B2E0 | 1385 | JB5 | DONE8 | ;JUMP IF DON'T |
|  |  | 1386 |  |  | ;BLINK LOOP LED |
| 05D5 | B81E | 1387 | MOV | R0,#1EH |  |
| 05D7 | F0 | 1388 | MOV | A,@R0 | ;(1E) |
| 05D8 | 47 | 1389 | SWAP | A |  |
| 05D9 | F7 | 1390 | RLC | A |  |
| 05DA | 18 | 1391 | INC | R0 | ;(1F) |
| 05DB | 18 | 1392 | INC | R0 | ;(20) |
| 05DC | F0 | 1393 | MOV | A,@R0 | ;(20) |
| 05DD | 77 | 1394 | RR | A |  |
| 05DE | 77 | 1395 | RR | A |  |
| 05DF | F7 | 1396 | RLC | A |  |
| 05E0 | E7 | 1397 | RL | A |  |
| 05E1 | A0 | 1398 | MOV | @R0,A |  |
|  |  | 1399 | ; |  |  |

```
LOC   OBJ        SEQ       SOURCE STATEMENT

1400 ;              FINISHED COPYING MSBIT OF SECONDS
                 1401 ;              COUNTER TO LOOP LED
                 1402 ;
05E0  83         1403      DONE8:  RET
                 1404 ;*************************************************
                 1405 ;************ SUBROUTINE "ALARMS" ****************
                 1406 ;*************************************************
05E1  B825       1407      ALARMS: MOV     R0,#25H
05E3  F0         1408              MOV     A,@R0       ;(25)
05E4  37         1409              CPL     A
05E5  72F2       1410              JB3     DOWN13      ;JUMP IF ZONES
                 1411                                  ;WERE NOT IN
                 1412                                  ;WEEN ARMED
05E7  FB         1413              MOV     A,R3
05E8  D2F8       1414              JB6     DOWN12      ;JUMP IF ZONES
                 1415                                  ;ARE IN
05EA  B821       1416              MOV     R0,#21H
05EC  F0         1417              MOV     A,@R0
05ED  4304       1418              ORL     A,#04
05EF  A0         1419              MOV     @R0,A       ;SET BA CODE
                 1420                                  ;FOR ZONE SWITCH
                 1421                                  ;VIOLATION
05F0  A4F8       1422              JMP     DOWN12
05F2  B821       1423      DOWN13: MOV     R0,#21H     ;MUST ERASE
                 1424                                  ;ZONE VIOLATIONS
05F4  F0         1425              MOV     A,@R0       ;(21)
05F5  53F3       1426              ANL     A,#0F3H
05F7  A0         1427              MOV     @R0,A       ;(21) ERASE
                 1428                                  ;COMPLETE
05F8  B821       1429      DOWN12: MOV     R0,#21H
05FA  97         1430              CLR     C
05FB  A7         1431              CPL     C
05FC  F0         1432              MOV     A,@R0       ;(21)
05FD  531D       1433              ANL     A,#1DH
05FF  C602       1434              JZ      $+3
0601  A7         1435              CPL     C
0602  C8         1436              DEC     R0          ;(20)
0603  F0         1437              MOV     A,@R0       ;(20)
0604  77         1438              RR      A
0605  77         1439              RR      A
0606  F7         1440              RLC     A
0607  E7         1441              RL      A
0608  A0         1442              MOV     @R0,A       ;(20)
                 1443 ;
                 1444 ;            FINISHED SETTING LOOP STATUS LED
                 1445 ;            TO PROPER STATE
                 1446 ;
0609  B82F       1447      DOWN14: MOV     R0,#2FH     ;POINT TO
                 1448                                  ;ALARM TIMER
060B  F0         1449              MOV     A,@R0       ;(2F)
060C  C612       1450              JZ      NOTRUN      ;JUMP IF TIMER
                 1451                                  ;IS NOT RUNNING
060E  7498       1452      UP20:   CALL    ABLINK
0610  C41D       1453              JMP     DOWN15      ;TIMER IS RUNNING
0612  B821       1454      NOTRUN: MOV     R0,#21H
0614  B922       1455              MOV     R1,#22H
0616  F0         1456              MOV     A,@R0       ;(21)
0617  41         1457              ORL     A,@R1       ;(22)
0618  D0         1458              XRL     A,@R0       ;(21)
0619  531F       1459              ANL     A,#1FH
061B  D1         1460              XRL     A,@R1       ;(22)
061C  A1         1461              MOV     @R1,A       ;(22)
                 1462 ;
                 1463 ;            FINISH RESETTING OLD BURGLARY
                 1464 ;            VIOLATIONS THAT ARE OK NOW.
                 1465 ;
```

| LOC | OBJ | SEQ | SOURCE STATEMENT | | |
|---|---|---|---|---|---|
| 061D | B821 | 1466 | DOWN15: MOV | R0,#21H | |
| 061F | B924 | 1467 | MOV | R1,#24H | |
| | | 1468 ; | | | |
| | | 1469 ; | SAVE STATUS OF D/N LOOP | | |
| | | 1470 ; | FOR BEEPING PA IF BAD. | | |
| | | 1471 ; | | | |
| 0621 | F0 | 1472 | MOV | A,@R0 | ;(21) |
| 0622 | 67 | 1473 | RRC | A | |
| 0623 | 67 | 1474 | RRC | A | |
| 0624 | FB | 1475 | MOV | A,R3 | |
| 0625 | 17 | 1476 | RL | A | |
| 0626 | 67 | 1477 | RRC | A | ;COPY D/N INTO |
| | | 1478 | | | ;"15-SEC BEEP" BIT |
| 0627 | AB | 1479 | MOV | R3,A | |
| 0628 | F0 | 1480 | MOV | A,@R0 | ;(21) |
| 0629 | B930 | 1481 | MOV | R1,#30H | |
| 062B | F231 | 1482 | JB7 | DOWN16 | ;JUMP IF IS |
| | | 1483 | | | ;NEW FIRE BIT = 1 |
| 062D | B100 | 1484 | MOV | @R1,#00 | ;(30)CLEAR FIRE |
| | | 1485 | | | ;TIMER |
| 062F | C441 | 1486 | JMP | DOWN17 | |
| 0631 | F1 | 1487 | DOWN16: MOV | A,@R1 | ;(30) |
| 0632 | D301 | 1488 | XRL | A,#01 | |
| 0634 | C641 | 1489 | JZ | DOWN17 | ;JMP IF FIRE |
| | | 1490 | | | ;TIMER = 01 |
| 0636 | F0 | 1491 | MOV | A,@R0 | ;(21) |
| 0637 | 537F | 1492 | ANL | A,#7FH | |
| 0639 | A0 | 1493 | MOV | @R0,A | ;(21) REMOVE FIRE |
| | | 1494 | | | ;BIT FROM "NEW" |
| | | 1495 | | | ;REGISTER |
| 063A | F1 | 1496 | DOWN18: MOV | A,@R1 | ;(30) |
| 063B | 9641 | 1497 | JNZ | DOWN17 | ;JUMP IF FIRE |
| | | 1498 | | | ;TIMER NOT = 00 |
| 063D | B103 | 1499 | MOV | @R1,#03 | ;(30)SET TIMER |
| | | 1500 | | | ;= 2 SECONDS; |
| | | 1501 | ;THIS IS NOT A MISTAKE, AS THE | | |
| | | 1502 | ;TIMER IS CONSIDERED TIMED | | |
| | | 1503 | ;OUT WHEN IT DECREMENTS TO "01" | | |
| | | 1504 | ; | | |
| 063F | 7416 | 1505 | CALL | ZERSEC | |
| 0641 | B822 | 1506 | DOWN17: MOV | R0,#22H | |
| 0643 | F0 | 1507 | MOV | A,@R0 | ;(22) |
| 0644 | 37 | 1508 | CPL | A | |
| 0645 | F249 | 1509 | JB7 | $+4 | ;JUMP IF NO |
| | | 1510 | | | ;CURRENT FIRE |
| 0647 | 747F | 1511 | CALL | RESTET | |
| 0649 | FB | 1512 | NABLK: MOV | A,R3 | |
| 064A | B821 | 1513 | MOV | R0,#21H | |
| 064C | 1254 | 1514 | JB0 | DUMMY | ;JUMP IF ARMED |
| 064E | F0 | 1515 | MOV | A,@R0 | ;(21) |
| 064F | 53E0 | 1516 | ANL | A,#0E0H | |
| 0651 | A0 | 1517 | MOV | @R0,A | ;(21)ERASE BA |
| | | 1518 | | | ;VIOLATIONS FROM |
| | | 1519 | | | ;"NEW ALARMS" |
| 0652 | C49A | 1520 | JMP | NOTARM | ;JUMP; NOT ARMED |
| 0654 | B925 | 1521 | DUMMY: MOV | R1,#25H | |
| 0656 | F1 | 1522 | MOV | A,@R1 | ;(25) |
| 0657 | 43FD | 1523 | ORL | A,#0FDH | |
| 0659 | 50 | 1524 | ANL | A,@R0 | ;(21)ERASE D/N |
| | | 1525 | | | ;BIT IF LOOP WAS |
| | | 1526 | | | ;BAD WHEN ARMED |
| 065A | A0 | 1527 | MOV | @R0,A | ;(21) |
| 065B | B922 | 1528 | MOV | R1,#22H | |
| 065D | F1 | 1529 | MOV | A,@R1 | ;(22) |
| 065E | 50 | 1530 | ANL | A,@R0 | ;(21) |
| 065F | 531F | 1531 | ANL | A,#1FH | |

| LOC | OBJ | SRC | SOURCE STATEMENT | | | |
|---|---|---|---|---|---|---|
| 0661 | D0 | 1532 | | ORL | A,@R0 | ;(21) |
| 0662 | A0 | 1533 | | MOV | @R0,A | ;(21) |
| | | 1534 | ; | | | |
| | | 1535 | ; | FINISH ERASING "OLD" VIOLATIONS | | |
| | | 1536 | ; | FROM "NEW" REGISTER | | |
| | | 1537 | ; | | | |
| 0663 | B92F | 1538 | | MOV | R1,#2FH | |
| 0665 | F1 | 1539 | | MOV | A,@R1 | ;(2F) |
| 0666 | C67B | 1540 | | JZ | DOWN19 | ;JUMP IF ALARM |
| | | 1541 | | | | ;TIMER NOT RUNNING |
| 0668 | B924 | 1542 | UP10: | MOV | R1,#24H | ;CLEAR E/E BITS |
| 066A | F1 | 1543 | | MOV | A,@R1 | |
| 066B | 53DB | 1544 | | ANL | A,#0DBH | |
| 066D | A1 | 1545 | | MOV | @R1,A | |
| 066E | B92C | 1546 | | MOV | R1,#2CH | ;CLEAR E/E TIMER |
| 0670 | B100 | 1547 | | MOV | @R1,#00 | |
| 0672 | F0 | 1548 | | MOV | A,@R0 | ;(21) |
| 0673 | 531F | 1549 | | ANL | A,#1FH | |
| 0675 | C69A | 1550 | | JZ | NOTARM | ;NO BURG LOOPS |
| | | 1551 | | | | ;VIOLATED; JUMP |
| 0677 | 747F | 1552 | UP11: | CALL | RESTRT | ;RESTART |
| | | 1553 | | | | ;ALARM TIMER |
| 0679 | C49A | 1554 | | JMP | NOTARM | |
| 067B | B9A0 | 1555 | DOWN19: | MOV | R1,#0A0H | ;SET UP MOVX ADDR |
| 067D | 81 | 1556 | | MOVX | A,@R1 | ;(A0) |
| 067E | B924 | 1557 | | MOV | R1,#24H | |
| 0680 | 9292 | 1558 | | JB4 | UP13 | ;SWITCH IS IN |
| | | 1559 | | | | ;INSTANT POSITION; |
| | | 1560 | | | | ;GO CHECK FOR ANY |
| | | 1561 | | | | ;VIOLATIONS |
| 0682 | F0 | 1562 | | MOV | A,@R0 | ;(21) |
| 0683 | 128C | 1563 | | JB0 | UP70 | ;JUMP IF E/E |
| | | 1564 | | | | ;LOOP IS VIOLATED |
| 0685 | 728C | 1565 | | JB3 | UP70 | ;JUMP IF DELAYED |
| | | 1566 | | | | ;ZONE IS VIOLATED |
| 0687 | F1 | 1567 | | MOV | A,@R1 | ;(24) |
| 0688 | 5324 | 1568 | | ANL | A,#24H | |
| 068A | C695 | 1569 | | JZ | UP90 | |
| 068C | E495 | 1570 | UP70: | JMP | DOWN20 | ;JUMP IF EXIT OR |
| | | 1571 | | | | ;ENTRY TIMER IS |
| | | 1572 | | | | ;RUNNING |
| 068E | E465 | 1573 | UP71: | JMP | DOWN31 | ;GO START ALARM |
| | | 1574 | | | | ;IF SOMEONE |
| | | 1575 | | | | ;PUSHED SWITCH TO |
| | | 1576 | | | | ;INSTANT DURING |
| | | 1577 | | | | ;AN ENTRY DELAY |
| | | 1578 | | | | ; |
| | | 1579 | | | | ;DON'T ALLOW |
| | | 1580 | | | | ;ERASE E/E FLAGS |
| | | 1581 | | | | ;IF ENTRY TIMER |
| | | 1582 | | | | ;RUNNING |
| 0690 | F1 | 1583 | UP13: | MOV | A,@R1 | ;(24) |
| 0691 | 528E | 1584 | | JB2 | UP71 | ;JUMP IF ENTRY |
| | | 1585 | | | | ;TIMER RUNNING |
| 0693 | C468 | 1586 | | JMP | UP10 | |
| 0695 | F0 | 1587 | UP90: | MOV | A,@R0 | ;(21) |
| 0696 | 5316 | 1588 | | ANL | A,#16H | |
| 0698 | 9677 | 1589 | | JNZ | UP11 | ;INSTANT LOOP(S) |
| | | 1590 | | | | ;VIOLATED; |
| | | 1591 | | | | ;GO START ALARM |
| 069A | B821 | 1592 | NOTARM: | MOV | R0,#21H | |
| 069C | 27 | 1593 | | CLR | A | |
| 069D | 20 | 1594 | | XCH | A,@R0 | |
| | | 1595 | | | | ;CLEAR NEW |

| LOC | OBJ | SEQ | SOURCE STATEMENT | | |
|---|---|---|---|---|---|
| | | 1596 | | | ;VIOLATIONS |
| 069E | 85 | 1597 | CLR | F0 | |
| 069F | B2A2 | 1598 | JB5 | $+3 | |
| 06A1 | 95 | 1599 | CPL | F0 | |
| 06A2 | 18 | 1600 | INC | R0 | ;(22) |
| 06A3 | 40 | 1601 | ORL | A,@R0 | ;(22) |
| 06A4 | A0 | 1602 | MOV | @R0,A | ;(22)UPDATE |
| | | 1603 | | | ;CURRENT ALARMS |
| 06A5 | 5360 | 1604 | ANL | A,#60H | |
| 06A7 | C6AB | 1605 | JZ | $+4 | |
| 06A9 | 7498 | 1606 | CALL | ABLINK | ;BLINK ARM LED |
| | | 1607 | | | ;FOR MED OR PANIC |
| 06AB | B6B3 | 1608 | JF0 | $+8 | ;ARM AND START |
| | | 1609 | | | ;ALARM IF PANIC |
| 06AD | FB | 1610 | MOV | A,R3 | |
| 06AE | 4301 | 1611 | ORL | A,#01 | |
| 06B0 | AB | 1612 | MOV | R3,A | |
| 06B1 | 747F | 1613 | CALL | RESTRT | |
| 06B3 | B820 | 1614 | MOV | R0,#20H | |
| 06B5 | B980 | 1615 | MOV | R1,#80H | ;MOVX POINTER |
| 06B7 | F0 | 1616 | MOV | A,@R0 | ;(20) |
| 06B8 | 4340 | 1617 | ORL | A,#40H | |
| 06BA | A0 | 1618 | MOV | @R0,A | ;SET AC POWER OK |
| 06BB | 81 | 1619 | MOVX | A,@R1 | |
| 06BC | B91E | 1620 | MOV | R1,#1EH | ;POINT SECS CNTR |
| 06BE | B2C7 | 1621 | JB5 | DOWN21 | ;JUMP IF AC OK |
| 06C0 | F1 | 1622 | MOV | A,@R1 | ;(1E) GET CNTR |
| 06C1 | 72C7 | 1623 | JB3 | DOWN21 | |
| 06C3 | F0 | 1624 | MOV | A,@R0 | ;(20) |
| 06C4 | 53BF | 1625 | ANL | A,#0BFH | |
| 06C6 | A0 | 1626 | MOV | @R0,A | ;(20)SET AC |
| | | 1627 | | | ;POWER NOT OK |
| 06C7 | B824 | 1628 | DOWN21: MOV | R0,#24H | |
| 06C9 | F0 | 1629 | MOV | A,@R0 | ;(24) |
| 06CA | 37 | 1630 | CPL | A | |
| 06CB | 32D6 | 1631 | JB1 | DOWN22 | ;JUMP IF ARM BLNK |
| | | 1632 | | | ;BIT NOT = 1 |
| 06CD | B820 | 1633 | MOV | R0,#20H | |
| | | 1634 | ; | | |
| | | 1635 | ; COPY MSBIT OF SECONDS | | |
| | | 1636 | ; TIMER TO ARMED LED | | |
| | | 1637 | ; | | |
| 06CF | F1 | 1638 | MOV | A,@R1 | ;(1E) |
| 06D0 | 47 | 1639 | SWAP | A | |
| 06D1 | F7 | 1640 | RLC | A | |
| 06D2 | F0 | 1641 | MOV | A,@R0 | ;(20) |
| 06D3 | E7 | 1642 | RL | A | |
| 06D4 | 67 | 1643 | RRC | A | |
| 06D5 | A0 | 1644 | MOV | @R0,A | ;(20)RESTORE PORT |
| | | 1645 | | | ;1 SAVE REGISTER |
| 06D6 | FB | 1646 | DOWN22: MOV | A,R3 | |
| 06D7 | 53BF | 1647 | ANL | A,#0BFH | ;TURN OFF |
| | | 1648 | | | ;"ZONE IN" BIT |
| 06D9 | AB | 1649 | MOV | R3,A | |
| 06DA | B8A0 | 1650 | MOV | R0,#2A0H | |
| 06DC | 80 | 1651 | MOVX | A,@R0 | ;(A0)CHECK |
| | | 1652 | | | ;ZONE SWITCH |
| 06DD | B2E3 | 1653 | JB5 | DOWN23 | ;JUMP IF ZONE |
| | | 1654 | | | ;SWITCHED OUT |
| 06DF | FB | 1655 | MOV | A,R3 | |
| 06E0 | 4340 | 1656 | ORL | A,#40H | |
| 06E2 | AB | 1657 | MOV | R3,A | ;TURN ON ZONE IN |
| | | 1658 | | | ;BIT |
| 06E3 | FB | 1659 | DOWN23: MOV | A,R3 | |
| 06E4 | 37 | 1660 | CPL | A | |

| LOC | OBJ | SEQ | SOURCE STATEMENT | | | |
|---|---|---|---|---|---|---|
| 06E5 | 12E9 | 1661 | | JB0 | $+4 | ;JUMP IF ARMED |
| 06E7 | E403 | 1662 | | JMP | DOWN24 | |
| 06E9 | 37 | 1663 | | CPL | A | |
| 06EA | B825 | 1664 | | MOV | R0,#25H | |
| 06EC | F7 | 1665 | | RLC | A | |
| 06ED | F7 | 1666 | | RLC | A | |
| 06EE | F0 | 1667 | | MOV | A,@R0 | ;(25) |
| 06EF | 47 | 1668 | | SWAP | A | |
| 06F0 | E7 | 1669 | | RL | A | |
| 06F1 | 67 | 1670 | | RRC | A | |
| 06F2 | 47 | 1671 | | SWAP | A | |
| 06F3 | A0 | 1672 | | MOV | @R0,A | ;(25)REMEMBER |
| | | 1673 | | | | ;POSITION OF ZONE |
| | | 1674 | | | | ;SWITCH IN R25.3 IF |
| | | 1675 | | | | ;PANEL IS NOT ARMED |
| 06F4 | B822 | 1676 | | MOV | R0,#22H | |
| 06F6 | F0 | 1677 | | MOV | A,@R0 | |
| 06F7 | 37 | 1678 | | CPL | A | |
| 06F8 | 72FC | 1679 | | JB7 | $+4 | |
| 06FA | 140A | 1680 | | JMP | LRUN | |
| 06FC | B82C | 1681 | | MOV | R0,#2CH | |
| 06FE | 27 | 1682 | | CLR | A | |
| 06FF | A0 | 1683 | | MOV | @R0,A | |
| 0700 | B82F | 1684 | | MOV | R0,#2FH | |
| 0702 | A0 | 1685 | | MOV | @R0,A | |
| 0703 | B82F | 1686 | DOWN24: | MOV | R0,#2FH | |
| 0705 | B91F | 1687 | | MOV | R1,#1FH | |
| 0707 | F0 | 1688 | | MOV | A,@R0 | |
| 0708 | C60C | 1689 | | JZ | $+4 | |
| 070A | E410 | 1690 | LRUN: | JMP | LETRUN | |
| 070C | F1 | 1691 | | MOV | A,@R1 | ;ALARM TIMER =0? |
| 070D | 537F | 1692 | | ANL | A,#7FH | ;TURN OFF SIREN |
| 070F | A1 | 1693 | | MOV | @R1,A | ;(1F) |
| 0710 | 85 | 1694 | LETRUN: | CLR | F0 | |
| 0711 | B820 | 1695 | | MOV | R0,#20H | |
| 0713 | FB | 1696 | | MOV | A,R3 | |
| 0714 | D301 | 1697 | | XRL | A,#01 | |
| 0716 | 121A | 1698 | | JB0 | $+4 | ;DON'T CHANGE |
| | | 1699 | | | | ;ZONE LED |
| | | 1700 | | | | ;IF ARMED |
| 0718 | E425 | 1701 | | JMP | NOZONE | |
| 071A | D21D | 1702 | | JB6 | $+3 | |
| 071C | 95 | 1703 | | CPL | F0 | ;F0=1 IF ZONE OUT |
| 071D | F0 | 1704 | | MOV | A,@R0 | ;(20) |
| 071E | 53F7 | 1705 | | ANL | A,#0F7H | |
| 0720 | B624 | 1706 | | JF0 | $+4 | |
| 0722 | 4308 | 1707 | | ORL | A,#08H | ;TURN ON |
| | | 1708 | | | | ;ZONE LED |
| 0724 | A0 | 1709 | | MOV | @R0,A | ;(20)FINISH |
| | | 1710 | | | | ;UPDATE ZONE |
| | | 1711 | | | | ;LED |
| 0725 | B92F | 1712 | NOZONE: | MOV | R1,#2FH | |
| 0727 | F1 | 1713 | | MOV | A,@R1 | ;(2F) |
| 0728 | 9650 | 1714 | | JNZ | DOWN25 | ;DON'T TEST FIRE |
| | | 1715 | | | | ;IF ALARM TIMER |
| | | 1716 | | | | ;IS RUNNING |
| 072A | B9C0 | 1717 | | MOV | R1,#0C0H | |
| 072C | 81 | 1718 | | MOVX | A,@R1 | ;(C0)CHECK |
| | | 1719 | | | | ;FIRE LOOP |
| 072D | 37 | 1720 | | CPL | A | |
| 072E | F232 | 1721 | | JB7 | $+4 | |
| 0730 | E448 | 1722 | | JMP | DOWN26 | ;JUMP IF FIRE |
| 0732 | B825 | 1723 | | MOV | R0,#25H | |
| 0734 | F0 | 1724 | | MOV | A,@R0 | ;(25) |
| 0735 | 4320 | 1725 | | ORL | A,#20H | |

```
LOC  OBJ        SEQ         SOURCE STATEMENT

0737 A0         1726                    MOV     @R0,A       ;(25)SET FIRE
                1727                                        ;LOOP BAD
0738 B91E       1728        MOV R1,#1EH  ; GET P2 STATUS
073A F1         1729        MOV A,@R1
073B 4310       1730        ORL A,#10H   ; TURN ON THE FIRE TEST BIT
073D 3A         1731        OUTL P2,A
073E B925       1732        MOV R1,#25H  ; RESTORE R0
0740 F1         1733                    MOVX    A,@R1       ;(2C0)
0741 37         1734                    CPL     A
0742 F248       1735                    JB7     DOWN26      ;JUMP IF
                1736                                        ;FIRE CIRCUIT STILL
                1737                                        ;TESTS OK; IT SHOULD
                1738                                        ;NOT
0744 F0         1739                    MOV     A,@R0       ;(25)
0745 537F       1740                    ANL     A,#7FH
0747 A0         1741                    MOV     @R0,A       ;(25)SET FIRE
                1742                                        ;LOOP OK
0748 B91E       1743        DOWN26: MOV R1,#1EH  ; P2 STATUS ALL.
074A F1         1744        MOV A,@R1
074B 4320       1745        ORL A,#20H   ; RESTORE P2
074D 53EF       1746        ANL A,#0EFH  ; TURN OFF FIRE TEST BIT
074F 3A         1747        OUTL P2,A
0750 B8C0       1748        DOWN25: MOV     R0,#0C0H
0752 E852       1749        DELAY:  DJNZ    R0,DELAY
0754 83         1750                    RET
                1751        ;
                1752        ;           EITHER THE E/E (OR DELAYED ZONE)
                1753        ;           LOOP IS VIOLATED, OR THE E/E
                1754        ;           TIMER IS RUNNING
                1755        ;
0755 B924       1756        DOWN20: MOV     R1,#24H     ;TIMER FLAGS
0757 B82C       1757                    MOV     R0,#2CH     ;E/E TIMER
0759 F1         1758                    MOV     A,@R1       ;(24)
075A 5260       1759                    JB2     DOWN27      ;JUMP IF ENTRY
                1760                                        ;TIMER RUNNING
075C B282       1761                    JB5     DOWN28      ;JUMP IF EXIT
                1762                                        ;TIMER RUNNING
075E E473       1763                    JMP     DOWN29      ;EXIT TIMER HAS
                1764                                        ;ALREADY EXPIRED;
                1765                                        ;START ENTRY TIME
                1766        ;
                1767        ;           ENTRY TIMER IS RUNNING
                1768        ;
0760 F0         1769        DOWN27: MOV     A,@R0       ;(2C)GET E/E TIMR
0761 D301       1770                    XRL     A,#01
0763 967A       1771                    JNZ     DOWN30      ;JUMP IF TIMER
                1772                                        ;NOT EXPIRED
0765 F1         1773        DOWN31: MOV     A,@R1       ;(24)
0766 53DB       1774                    ANL     A,#0DBH     ;RESET ENTRY OR
                1775                                        ;EXIT TIMER
                1776                                        ;RUNNING BIT
0768 A1         1777                    MOV     @R1,A       ;(24)
0769 747F       1778                    CALL    RESTRT      ;TURN ON SIREN,
                1779                                        ;ETC.
076B B821       1780                    MOV     R0,#21H
076D F0         1781                    MOV     A,@R0       ;(21)
076E 4305       1782                    ORL     A,#05
0770 A0         1783                    MOV     @R0,A       ;(21) FINISH SET
                1784                                        ;DELAYED ZONE AND
                1785                                        ;E/E VIOLATIONS
                1786                                        ;INTO "NEW"
0771 C49A       1787                    JMP     NOTARM
                1788        ;
                1789        ;           EXIT TIMER HAS ALREADY EXPIRED;
                1790        ;           START ENTRY TIMER
                1791        ;
```

| LOC | OBJ | SEQ | SOURCE STATEMENT | | | |
|---|---|---|---|---|---|---|
| 0773 | 4304 | 1792 | DOWN29: | ORI | A,#04 | |
| 0775 | A1 | 1793 | | MOV | @R1,A | ;(24) FLAG ENTRY |
| | | 1794 | | | | ;TIMER RUNNING |
| 0776 | 18 | 1795 | | INC | R0 | ;(2D) |
| 0777 | F0 | 1796 | | MOV | A,@R0 | ;(2D) |
| 0778 | C8 | 1797 | | DEC | R0 | ;(2C) |
| 0779 | A0 | 1798 | | MOV | @R0,A | ;(2C) START TIMER |
| 077A | B821 | 1799 | DOWN30: | MOV | R0,#21E | |
| 077C | F0 | 1800 | | MOV | A,@R0 | ;RESET BOTH E/E |
| | | 1801 | | | | ;AND DELAYED ZONE |
| | | 1802 | | | | ;VIOLATIONS |
| 077D | 53F6 | 1803 | | ANI | A,#0F6E | |
| 077F | A0 | 1804 | | MOV | @R0,A | ;(21) |
| 0780 | 0495 | 1805 | | JMP | UP80 | ;GO LOOK FOR |
| | | 1806 | | | | ;INSTANT |
| | | 1807 | | | | ;VIOLATIONS |
| | | 1808 | ; | | | |
| | | 1809 | ; | EXIT TIMER IS RUNNING | | |
| | | 1810 | ; | | | |
| 0782 | F0 | 1811 | DOWN28: | MOV | A,@R0 | ;(2C)GET TIMER |
| 0783 | D301 | 1812 | | XRL | A,#01 | |
| 0785 | 967A | 1813 | | JNZ | DOWN30 | ;JUMP IF TIMER IS |
| | | 1814 | | | | ;NOT EXPIRED YET |
| | | 1815 | ; | | | |
| | | 1816 | ; | EXIT TIMER JUST EXPIRED | | |
| | | 1817 | ; | | | |
| 0787 | F1 | 1818 | | MOV | A,@R1 | ;(24) |
| 0788 | 53DF | 1819 | | ANI | A,#0DFE | ;RESET "EXIT |
| | | 1820 | | | | ;TIMER RUNNING" |
| | | 1821 | | | | ;FLAG |
| 078A | A1 | 1822 | | MOV | @R1,A | ;(24) |
| 078B | 047A | 1823 | | JMP | DOWN30 | |
| | | 1824 | ;********************************************* | | | |
| | | 1825 | ;************ SUBROUTINE "BEEPIT" ************ | | | |
| | | 1826 | ;*************** (PREALARMS) ***************** | | | |
| | | 1827 | ;********************************************* | | | |
| 078D | 85 | 1828 | BEEPIT: | CLR | F0 | ;F0 WILL BE USED |
| | | 1829 | | | | ;LOCALLY TO STORE |
| | | 1830 | | | | ;CURRENT PA STATUS |
| 078E | B824 | 1831 | | MOV | R0,#24E | |
| 0790 | B933 | 1832 | | MOV | R1,#3BE | |
| 0792 | FB | 1833 | | MOV | A,R3 | |
| 0793 | F7 | 1834 | | RLC | A | |
| | | 1835 | ; | | | |
| | | 1836 | ; | CHECK FOR FIRE TROUBLE OR | | |
| | | 1837 | ; | BAD D/N LOOP | | |
| | | 1838 | ; | | | |
| 0794 | E69C | 1839 | | JNC | NOBEEP | |
| 0796 | F1 | 1840 | | MOV | A,@R1 | ;(3B)PAUSE TIMER |
| 0797 | 969C | 1841 | | JNZ | NOBEEP | ;JUMP IF PAUSE |
| | | 1842 | | | | ;IS IN PROGRESS. |
| 0799 | B12F | 1843 | | MOV | @R1,#15 | ;R1=3B,RESTART |
| | | 1844 | | | | ;PAUSE TIMER |
| | | 1845 | | | | ;=15 SECONDS |
| 079B | 95 | 1846 | | CPL | F0 | ;WAS=0,NOW=1 |
| 079C | F0 | 1847 | NOBEEP: | MOV | A,@R0 | ;R0=24 |
| 079D | 37 | 1848 | | CPL | A | ;CHECK IF EXIT |
| | | 1849 | | | | ;TIMER RUNNING. |
| 079E | B2A9 | 1850 | | JB5 | NOEXIT | |
| 07A0 | F0 | 1851 | | MOV | A,@R0 | ;R0=24 |
| 07A1 | D310 | 1852 | | XRL | A,#10E | |
| 07A3 | A0 | 1853 | | MOV | @R0,A | ;(24) COMPLEMENT |
| | | 1854 | | | | ;PA SAVE |
| 07A4 | 85 | 1855 | | CLR | F0 | |
| 07A5 | 37 | 1856 | | CPL | A | |
| 07A6 | 92A9 | 1857 | | JB4 | NOEXIT | ;COPY PA SAVE |
| 07A8 | 95 | 1858 | | CPL | F0 | ;TO PA |

```
LOC  OBJ       SEQ     SOURCE STATEMENT
07A9 76AD      1859    NOEXIT: JF1      $+4
07AB E4AF      1860            JMP      NOBIP
07AD 85        1861            CLR      F0
07AE 95        1862            CPL      F0          ;PA ON THIS PASS
               1863                                 ;FOR LED "BEEP"
07AF F0        1864    NOBIP:  MOV      A,@R0       ;(20)
07B0 37        1865            CPL      A
07B1 52B5      1866            JB2      POUT        ;JUMP IF NO
               1867                                 ;ENTRY DELAY
07B3 85        1868            CLR      F0
07B4 95        1869            CPL      F0          ;SET PA=1
07B5 B920      1870    POUT:   MOV      R1,#20H     ;POINT TO P1 SAVE
07B7 F1        1871            MOV      A,@R1       ;R1=20
07B8 53FB      1872            ANL      A,#0FBH     ;TURN PA ON
07BA B6BE      1873            JF0      $+4         ;JMP IF MUST
               1874                                 ;LEAVE PA ON
07BC 4304      1875            ORL      A,#04
07BE A1        1876            MOV      @R1,A
07BF A5        1877            CLR      F1
07C0 83        1878            RET
               1879    ;*****************************************
               1880    ;******** THIS IS FIRE TROUBLE ROUTINE *********
               1881    ;*****************************************
07C1 B9A0      1882    FIRET:  MOV      R1,#0A0H    ;SET UP ADDR TO
               1883                                 ;INPUT LOW BATT
               1884                                 ;BIT.
07C3 81        1885            MOVX     A,@R1       ;R1=A0
07C4 85        1886            CLR      F0
07C5 D2C8      1887            JB6      FIRE1       ;FIRE SUP
07C7 95        1888            CPL      F0          ;FIRE SUP BAD
07C8 B825      1889    FIRE1:  MOV      R0,#25H
07CA 0A        1890            IN       A,P2
07CB 5308      1891            ANL      A,#08H      ;MASK LO BATT BIT
07CD E7        1892            RL       A
07CE A9        1893            MOV      R1,A
07CF F0        1894            MOV      A,@R0       ;R0=25
07D0 53EF      1895            ANL      A,#0EFH
07D2 49        1896            ORL      A,R1        ;RESTORE CURRENT
               1897                                 ;"LOW BATT" BIT
07D3 A0        1898            MOV      @R0,A       ;R0=25
07D4 B820      1899            MOV      R0,#20H     ;POINT TO
               1900                                 ;P1 SAVE
07D6 F0        1901            MOV      A,@R0       ;(20)
07D7 53DF      1902            ANL      A,#0DFH     ;TURN OFF
               1903                                 ;TROUBLE LED
07D9 A0        1904            MOV      @R0,A       ;(20)
07DA 03        1905            MOV      A,P3
07DB 37        1906            CPL      A
07DC F924      1907            MOV      R1,#24H
07DE 95        1908            CPL      F0
07DF 52EE      1909            JB2      NOTRBL      ;JUMP IF NO
               1910                                 ;TROUBLE SAVE
07E1 B6E5      1911            JF0      $+4         ;JUMP IF
               1912                                 ;TROUBLE NOW
07E3 04D8      1913            JMP      TRBNOW
07E5 F3        1914    STOPIT: MOV      A,P3
07E6 53FB      1915            ANL      A,#0FBH     ;RESET
               1916                                 ;TROUBLE SAVE
07E8 AB        1917            MOV      R3,A
07E9 F1        1918    NOW:    MOV      A,@R1       ;(24)
07EA 537F      1919            ANL      A,#7FH      ;RESET FIRE
               1920                                 ;TROUBLE BIT
07EC A1        1921            MOV      @R1,A       ;(24)
07ED 83        1922    DONE1:  RET
07EE F1        1923    NOTRBL: MOV      A,@R1
07EF 537F      1924            ANL      A,#7FH
07F1 A1        1925            MOV      @R1,A
07F2 B6F8      1926            JF0      DOWN0
```

| LOC | OBJ | SEQ | SOURCE STATEMENT | | | |
|---|---|---|---|---|---|---|
| 07F4 | FB | 1927 | | MOV | A,R3 | |
| 07F5 | 4304 | 1928 | | ORL | A,#04 | |
| 07F7 | AB | 1929 | | MOV | R3,A | ;SET TROUBLE |
| | | 1930 | | | | ;SAVE BIT=1 |
| 07F8 | 74CE | 1931 | DOWN60: | CALL | BYPAS? | |
| 07FA | E6ED | 1932 | | JNC | DONE1 | ;RETURN IF NOT |
| | | 1933 | | | | ;BYPASSED |
| 07FC | 74D3 | 1934 | | CALL | SETBEP | |
| 07FE | 04C0 | 1935 | | JMP | BLINKF | |
| | | 1936 | ;*********************************************** | | | |
| | | 1937 | ;***** ROUTINE: OUTPUTS MSB OF "SECONDS" ****** | | | |
| | | 1938 | ;***** COUNTER TO R20.5. R0 ALREADY = 20 ****** | | | |
| | | 1939 | ;*********************************************** | | | |
| 03C0 | | 1940 | | ORG | 3C0H | |
| 03C0 | B91E | 1941 | BLINKF: | MOV | R1,#1EH | ;POINT TO |
| | | 1942 | | | | ;SEC TIMER |
| 03C2 | F0 | 1943 | | MOV | A,@R0 | ;(20) |
| 03C3 | 53DF | 1944 | | ANI | A,#0DFH | |
| 03C5 | A0 | 1945 | | MOV | @R0,A | ;(20)TURN OFF |
| | | 1946 | | | | ;LED BIT |
| | | 1947 | | | | ;TEMPORARILY |
| 03C6 | F1 | 1948 | | MOV | A,@R1 | ;(1E) |
| 03C7 | 5308 | 1949 | | ANI | A,#08 | ;MASK BLINK BIT |
| 03C9 | E7 | 1950 | | RL | A | |
| 03CA | E7 | 1951 | | RL | A | |
| 03CB | 40 | 1952 | | ORL | A,@R0 | ;(20) |
| 03CC | A0 | 1953 | | MOV | @R0,A | ;(20) RESTORE LED |
| 03CD | 83 | 1954 | | RET | | |
| 03CE | B9A0 | 1955 | BYPAS?: | MOV | R1,#0A0H | |
| 03D0 | 81 | 1956 | | MOVX | A,@R1 | ;(A0) |
| 03D1 | F7 | 1957 | | RLC | A | |
| 03D2 | 83 | 1958 | GETOUT: | RET | | |
| 03D3 | FB | 1959 | SETBEP: | MOV | A,R3 | |
| 03D4 | 4380 | 1960 | | ORI | A,#80H | |
| 03D6 | AB | 1961 | | MOV | R3,A | ;SET "16-SEC BEEP" |
| | | 1962 | | | | ;BIT = 1 |
| 03D7 | 83 | 1963 | | RET | | |
| 03D8 | F0 | 1964 | TRBNOW: | MOV | A,@R0 | ;(20) |
| 03D9 | 4320 | 1965 | | ORL | A,#20H | |
| 03DB | A0 | 1966 | | MOV | @R0,A | ;(20) |
| 03DC | F1 | 1967 | | MOV | A,@R1 | ;(24) |
| 03DD | 4320 | 1968 | | ORL | A,#20H | |
| 03DF | A1 | 1969 | | MOV | @R1,A | ;(24) |
| 03E0 | 74CE | 1970 | | CALL | BYPAS? | |
| 03E2 | F6C0 | 1971 | | JC | BLINKF | |
| 03E4 | 74D3 | 1972 | | CALL | SETBEP | |
| 03E6 | 83 | 1973 | | RET | | |
| | | 1974 | | END | | |

USER SYMBOLS

| ABLINK | 0398 | ALARMS | 05E1 | ALCD | 02D9 | ALN | 00E8 | ARM | 04CF |
|---|---|---|---|---|---|---|---|---|---|
| ARM2 | 04D7 | ARM3 | 04E0 | BCDBIN | 051C | BEEPIT | 078D | BLINKF | 03C0 |
| BLITZ | 0566 | BTEL | 01D4 | BYPAS? | 03CE | CBOCK | 017D | CCBK | 0184 |
| CEKAUX | 0557 | CLEAR | 01FC | CLRI | 0141 | CNSD | 00F2 | CNTST | 00E7 |
| COICOM | 0542 | COMEYT | 0576 | CONV | 0539 | CP1B | 00D5 | CPURST | 021F |
| CRES | 019A | CSRE | 0343 | CSRS | 0223 | DATA | 02E6 | DBFR | 00A1 |
| DCAG | 01CB | DCOUT | 0196 | DCR | 00DB | DDIR | 0036 | DELAY | 0752 |
| DIAL | 02E0 | DIALQ | 019E | DILT | 0154 | DISARM | 04FE | DMOR | 0335 |
| DONE1 | 07ED | DONE7 | 05CF | DONE8 | 05E0 | DONT | 0350 | DOWN12 | 05F8 |
| DOWN13 | 05F2 | DOWN14 | 0609 | DOWN15 | 061D | DOWN16 | 0631 | DOWN17 | 0641 |
| DOWN18 | 063A | DOWN19 | 067B | DOWN20 | 0755 | DOWN21 | 06C7 | DOWN22 | 06D6 |
| DOWN23 | 06E3 | DOWN24 | 0703 | DOWN25 | 0750 | DOWN26 | 0743 | DOWN27 | 0760 |
| DOWN28 | 0782 | DOWN29 | 0773 | DOWN30 | 077A | DOWN31 | 0765 | DOWN40 | 0412 |
| DOWN41 | 0423 | DOWN42 | 047C | DOWN43 | 0443 | DOWN44 | 0456 | DOWN45 | 0460 |

| | | | | | | | | | |
|---|---|---|---|---|---|---|---|---|---|
| DOWN46 | 04A4 | DOWN47 | 04A0 | DOWN48 | 04B9 | DOWN49 | 04B2 | DOWN50 | 04CA |
| DOWN51 | 0430 | DOWN52 | 0437 | DOWN60 | 07F9 | DTS | 032D | DUMMY | 0654 |
| EABLE | 03AC | EMSI | 00F7 | ENINT | 0146 | EVEN | 0132 | EXIN | 0003 |
| EXINT | 0114 | EXT | 0290 | FAULT | 04FD | FHST | 031E | FIRE1 | 07C9 |
| FIRET | 07C1 | FIRT | 0147 | FRST | 00A4 | FT3 | 0150 | GCR | 0036 |
| GTD | 01E0 | GETOUT | 23D2 | HERE | 003F | FFS | 007E | HMSC | 0037 |
| HMSF | 006C | ESS | 03CB | HUP | 00C2 | EUPT | 00EE | IND | 02F3 |
| INPS | 0122 | INSIR | 0247 | IFYIN | 0400 | KOS | 0268 | IETRON | 0712 |
| LFS | 0091 | LIAG | 0299 | LPAG | 0249 | LRUN | 070A | LSTRY | 0318 |
| M | 0000 | MART | 0363 | N | 005E | NABLE | 0649 | NAC2 | 0362 |
| NAC4 | 02C5 | NAD | 0133 | NALM | 015D | NCNTD | 02DF | NCCN | 01F7 |
| NDEC | 001C | NEGO | 02C6 | NFT | 009C | NINT | 0191 | NMIN | 01C9 |
| NND | 0304 | NAKP | 00F0 | NOBEEP | 079C | NOBIP | 07AF | NOEXIT | 07A9 |
| NOIARM | 059A | NOMED | 0423 | NOTAMP | 03BA | NOTARM | 069A | NOTRBL | 07FE |
| NOTRUN | 0612 | NOW | 07E9 | NOZONE | 0725 | NTFIN | 0048 | NTICN | 0258 |
| CFJ | 0351 | CN | 0344 | PAUL | 03CA | POUT | 0735 | PUP | 00CB |
| PUPT | 00C7 | RDFC | 00F8 | REENTR | 0242 | RESET | 0216 | RESTRT | 2377 |
| FGT | 0075 | POTAT2 | 256B | ROTATE | 0567 | ROTNI3 | 05EF | RSIN | 0000 |
| RT1 | 0022 | RT2 | 0049 | RTCN | 001E | SCLR | 0173 | SDATA | 0271 |
| SDATA2 | 0323 | SETBEP | 03D3 | SHUP | 0253 | SKCS | 02CF | SOFF | 0289 |
| SPIE | 00D0 | SFGT | 0175 | SSW | 00E1 | STDIL | 033A | STEI | 025F |
| STEL2 | 02A2 | STMIT | 0007 | STOPIT | 07E5 | STORE | 05EA | SVT | 00EE |
| SWN | 0000 | TAMPER | 03AD | TDBF | 00EE | TELI | 01D9 | TEST | 0370 |
| TICN | 0253 | TIR | 0235 | TMTS | 004C | TONS | 00A3 | TCP | 0248 |
| TRENOW | 0318 | TRYA | 0311 | TUDT | 01AD | UP10 | 0668 | UP11 | 0677 |
| UP13 | 0690 | UP20 | 062E | UP7C | 068C | UP71 | 068F | UP80 | 0695 |
| WA3 | 0036 | XFVT | 01EE | XSVT | 01EE | ZER | 0541 | ZERSEC | 03A6 |
| ZTIMER | 03A1 | | | | | | | | |

ASSEMBLY COMPLETE, NO ERRORS
COPIED--:F1:PCTAL.LST TO :C0:

The above source listing is the actual listing generated for the security terminal of the illustrative embodiment of the invention. It has not been edited for style, and includes some comments which obviously have nothing to do with the invention (e.g., line 6 on page 1 which attributes the first section of the listing to "Casey"). Comments, of course, are ignored in the assembly process. The references to "BS1010", at lines 312 and 332, and elsewhere in the source listing, are to the particular Pioneer modem employed in the system and described above. References in the comments to "zone" refer to what has been described above as interior protection, and references to a "panic" condition in the source listing are to the emergenecy condition discussed above.

The source listing will be understood by those skilled in the art in view of the numerous comments provided. The listing may be thought of as representing an alternative embodiment of the invention, although for the most part it implements all of the functions depicted in the flow charts depicted above. To understand how the system operates, the flow charts are the most useful. That is because they are concerned with gross functions, rather than hundreds of individual steps. But when it comes to actually implementing these functions, they cannot be controlled in the precise order shown in the flow charts due to timing constraints. For example, the system can hardly be expected to hang up for twenty seconds as indicated in FIG. 15D while it waits for confirmation of a transmitted alarm code from the central station. Similarly, the telephone routine may require several minutes to complete, and the microprocessor does not stop main-line processing just because telephone dialing and message outputting is called for. It is because of timing constraints that the actual coding is considerably different in implementation from the sequencing shown in the flow charts, even though the order of the gross functions which are performed are similar in the two cases.

The control technique implemented in the actual firmware is as follows. The 8035 internal timer is set by the firmware to control internal timer interrupts of the main routine at 10-millisecond intervals. One of the RAM locations is used as a counter to count the number of timer interrupts which have occurred. Ten interrupts are counted, and then the count starts over again. The main routine is executed continuously, but all functions executed during timer interrupts are controlled once every 100 milliseconds, during respective interrupt sequencings.

Actually, very little is done during the main routine itself. The most severe timing constraints on the microprocessor relate to the detection of dial tone and the 2300-Hz handshake tone from the central station on the telephone line, and the outputting of 1800-Hz tones when they are required. All of these functions are necessary only during telephone call processing. But because control of the detection and generation of tones is a "full-time" job when it is required, the main routine is designed to attend to this job continuously when needed. If a telephone call is not in progress, the microprocessor performs no useful functions most of the time. The main-line program, in fact, is so short that it is contained in its entirety in source lines 527–556.

Every 10 milliseconds, when an internal timer interrupt is generated, the system checks the state of the RAM counter to see which 10-millisecond interval in a 100-millisecond cycle has been entered. During six of these intervals (with a count of 1-10, during the intervals 2, 3, 4, 6, 8 and 9), there are no special jobs to be done at all. The microprocessor immediately returns to the mainline routine and concerns itself with tone processing if a telephone call is in progress; otherwise, it performs no useful functions. During the other four 10-millisecond intervals, special functions are performed. For example, in the first 10-millisecond interval of each cycle, the dial relay is operated or released in order to effect a dial pulse. In the fifth interval, the frequency of the received tone is checked to see whether it is too high or too low (for either dial tone, or the 2300-Hz handshake tone, depending upon which is expected). During interval 10, the keyboard is scanned, and during interval 7 most of the functions depicted on the flow charts are performed—including the scanning for alarms, another scan of the keyboard, the outputting of a message to the modem, etc.

The various functions depicted as part of the main sequencing in the flow charts are actually divided up into separate processing intervals in this way because for proper tone processing, when it is required, almost continuous attention has to be paid to the detection and outputting of tones. The microprocessor can divert its attention from the tone processing for only very short intervals, or else a tone pulse on the line will be missed or one will not be generated. (When the microprocessor's attention is diverted at the start of any 10-millisecond time interval, a small "glitch" may appear in any tone being outputted, but the disturbance is negligible enough to be ignored.) Even when non-tone processing is executed at the start of a particular 10-millisecond interval, the processing does not require the full 10 milliseconds. On the contrary, the processing time is very short, so that a return is made almost immediately from the special processing routine to the mainline sequencing in order that attention can be paid once again to tone processing during most of the 10-millisecond interval in progress.

Thus while the overall or gross functions actually controlled by the firmware employed are the same as those depicted in the flow charts of the drawing, they are implemented in a different way. Due to the time constraints relating especially to the tone processing, it is just not possible for the system to devote full attention to a particular function until it is completed. For this reason, a form of time multiplexing is employed for executing the required functions.

There is one line in the listing, line 506, which appears to make no sense; the turning off of "ENV" relays refers to environmental relays, and there are no such relays in the illustrative embodiment of the invention. It will be recalled that provision is made for future expansion of the terminal, for example, for implementing an energy management system under control of the central station and the microprocessor. In such a system, energy sensors may be read and relays may be operated for controlling different functions. Whenever the system is reset, the program counter is set to 0 so that the first instruction in the program memory is executed. As shown at line 33 of the source listing, this instruction is a jump to the instruction labelled RESET at line 490. During the reset routine, the MOVX instruction at line 506 causes the outputting of the contents of the accumulator (which are set to 0 at line 501) to the external data memory location whose address is contained in register R0. This address is the address of the output device which controls environmental relays, and thus during resetting of the microprocessor these relays can be released. Although they are not employed in the illustrative embodiment of the invention, and thus there is no reason to release them, the execution of a write command to a memory address which is not recognized by chip U12 (the only chip in the illustrative embodiment of the invention which responds to a write command) causes no problem. There is nothing which can be "written" into when the write command of line 506 is executed. The instruction is included only so that the reset routine need not be changed should the system be expanded. (Of course, additional firmware for controlling the new elements would have to be provided.)

Although the invention has been described with reference to particular embodiments, it is to be understood that these embodiments are merely illustrative of the application of the principles of the invention. For example, instead of allowing a single reset command from the central station to reset the terminal, a counter could be provided to count four reset commands on consecutive polls; only in such a case would the terminal reset. This would prevent false resets due to cable noise. Also, to safeguard against microprocessor hang-ups, a timer could be provided to check that one of the periodic functions is indeed occurring at prescribed intervals, e.g., the reading of a particular buffer. If the function is not taking place, a reset pulse could be generated in order to restart the microprocessor. Furthermore, although not shown in the drawing, well-known surge and transient protection schemes may be provided at the various interfaces to external equipment, e.g., the sensor loops. Thus it is to be understood that numerous modifications may be made in the illustrative embodiment of the invention and other arrangements may be devised without departing from the spirit and scope of the invention.

What we claim is:

1. A security terminal for use with a two-way interactive cable system and a switched telephone network; said cable system having a central station including means for transmitting address and control signals over a cable to control communications with interactive television terminals on the premises of respective subscribers, and means for receiving response signals over said cable from said television terminals; said security terminal comprising means for developing an alarm code signal;

control means connected to said cable for recognizing a respective address and in response thereto for transmitting said alarm code signal over said cable to said central station;

said control means being further operative to recognize transmission along said cable from said central station of a confirmation of said alarm code signal; and telephone dialer means connected to a telephone line in said switched telephone network;

said control means being responsive to a failure to recognize a confirmation of said alarm code signal for causing said telephone dialer means to dial a predetermined telephone number, and for outputting on said telephone line a signal identifying the security terminal and a signal representative of said alarm code signal.

2. A security terminal in accordance with claim 1 wherein said control means is further operative to recognize a dialer test control signal on said cable, and in response thereto to cause said telephone dialer means to dial said predetermined telephone number, and to output on said telephone line a signal identifying the security terminal and a signal indicative that a dialer test control signal was received by the terminal.

3. A security terminal in accordance with claim 2 wherein said alarm code signal developing means develops one of a plurality of predetermined alarm code signals representative of respective alarm conditions.

4. A security terminal in accordance with claim 3 further including means for developing supervisory trouble code signals representative of respective trouble states of the security terminal, said control means being further operative in response to the recognition of said respective address to transmit a developed supervisory trouble code signal to said central station over said cable.

5. A security terminal in accordance with claim 4 wherein, if both an alarm code signal and a supervisory trouble code signal have been developed, in response to the recognition of said respective address said control means transmits said alarm code signal over said cable.

6. A security terminal in accordance with claim 4 wherein said supervisory trouble code signals represent trouble conditions of a loss of power, a low stand-by battery, and a malfunctioning fire detection loop.

7. A security terminal in accordance with claim 3 wherein said alarm code signals represent fire, medical, burglary and emergency alarm conditions.

8. A security terminal in accordance with claim 2 further including a fire-detection circuit, and wherein said control means is further operative to recognize a fire-detection circuit test control signal, and in response thereto to transmit to said central station over said cable a coded signal representative of the condition of said fire-detection circuit.

9. A security terminal in accordance with claim 2 wherein said control means, in response to the recognition of said dialer test control signal, is further operative to transmit over said cable to said central station a coded verification signal.

10. A security terminal in accordance with claim 1 further including a keyboard, and wherein said alarm code signal developing means includes means for detecting an intrusion of the premises on which the security terminal is located, and said control means is responsive to the inputting on said keyboard of a master code for selectively enabling and disabling the operation of said intrusion detecting means.

11. A security terminal in accordance with claim 10 wherein said control means is responsive to the inputting on said keyboard of said master code, a function code and an alternate code for thereafter allowing the inputting of said alternate code to selectively enable and disable the operation of said intrusion detecting means.

12. A security terminal in accordance with claim 11 wherein said control means is responsive to the inputting on said keyboard of said master code and a release code for thereafter preventing the inputting of said alternate code from selectively enabling and disabling the operation of said intrusion detecting means.

13. A security terminal in accordance with claim 12 wherein said release code consists of said function code and said master code.

14. A security terminal in accordance with claim 10 wherein the enabling of the operation of said intrusion detecting means is delayed following the inputting on said keyboard of said master code, and said control means is responsive to the inputting on said keyboard of said master code, a function code and a time delay for thereafter causing the delay in the operation of said intrusion detecting means to equal the inputted time delay.

15. A security terminal in accordance with claim 14 further including means for sounding a warning signal while the operation of said intrusion detecting means is being delayed.

16. A security terminal in accordance with claim 10 wherein said control means prevents the developing of an alarm code signal if said master code is inputted on said keyboard within a predetermined time interval following the detection of a predetermined intrusion, and said control means is responsive to the inputting on said keyboard of said master code, a function code and a time delay for thereafter causing said predetermined time interval to equal the inputted time delay.

17. A security terminal in accordance with claim 16 further including means for sounding a warning signal during said predetermined time interval following the detection of said predetermined intrusion.

18. A security terminal in accordance with claim 16 further including switch means for controlling development of an alarm code signal immediately upon detection of said predetermined intrusion without waiting for the expiration of said predetermined time interval.

19. A security terminal in accordance with claim 10 further including means for sounding an alarm for a predetermined time interval responsive to the detection of an intrusion by said intrusion detecting means, and wherein said control means is responsive to the inputting on said keyboard of said master code, a function code and a time value for thereafter causing said predetermined time interval to equal the inputted time value.

20. A security terminal in accordance with claim 19 wherein said control means is operative to stop the sounding of said alarm during said predetermined time interval responsive to the inputting on said keyboard of said master code.

21. A security terminal in accordance with claim 19 wherein said control means is operative to stop the sounding of said alarm during said predetermined time interval responsive to receipt over said cable of a special coded signal.

22. A security terminal in accordance with claim 10 further including means for sounding an alarm responsive to the detection of an intrusion by said intrusion detecting means, and switch test means for controlling the sounding of said alarm without allowing said alarm code signal to be developed.

23. A security terminal in accordance with claim 10 further including means for providing a short audible verification responsive to each operation of a key on said keyboard.

24. A security terminal in accordance with claim 10 further including an audible alarm, and wherein said alarm code signal developing means includes means for detecting a fire in the premises on which the security terminal is located, and said control means is responsive to the detection of a fire for sounding said audible alarm and is responsive to the inputting on said keyboard of said master code for shutting off said audible alarm.

25. A security terminal in accordance with claim 10 wherein the enabling of the operation of said intrusion detecting means is delayed following the inputting on said keyboard of said master code, and further including means for sounding a warning signal while the operation of said intrusion detecting means is being delayed.

26. A security terminal in accordance with claim 10 wherein said control means prevents the developing of an alarm code signal if said master code is inputted on said keyboard within a predetermined time interval following the detection of a predetermined intrusion, and further including means for sounding a warning signal during said predetermined time interval following the detection of said predetermined intrusion.

27. A security terminal in accordance with claim 26 further including switch means for controlling development of an alarm code signal immediately upon detection of said predetermined intrusion without waiting for the expiration of said predetermined time interval.

28. A security terminal in accordance with claim 10 further including means for sounding an alarm for a predetermined time interval responsive to the detection of an intrusion by said intrusion detecting means, and wherein said control means is operative to stop the sounding of said alarm during said predetermined time interval responsive to the inputting on said keyboard of said master code.

29. A security terminal in accordance with claim 28 wherein said control means is operative to stop the sounding of said alarm during said predetermined time interval responsive to receipt over said cable of a special coded signal.

30. A security terminal for use with a two-way interactive communications system and a switched telephone network; said communications system having station means for transmitting coded signals over a communications link to control communications with interactive television terminals on the premises of respective subscribers, and station means for receiving response signals over said link from said television terminals; said security terminal comprising
  means for developing an alarm code signal;
  control means connected to said communications link for recognizing station-means-transmitted coded signals representative of a respective address and in response thereto for transmitting said alarm code signal over said link to said receiving station means;
  telephone dialer means connected to a telephone line in said switched telephone network; and
  means responsive to a failure in the transmission of said alarm code signal over said link for causing said telephone dialer means to dial a predetermined telephone number, and for outputting on said telephone line a signal identifying the security terminal and a signal representative of said alarm code signal;
  said control means being further operative to recognize a station-means-transmitted dialer test control signal on said link, and in response thereto to cause said telephone dialer means to dial said predetermined telephone number, and to output on said telephone line a signal identifying the security terminal and a signal indicative that a dialer test control signal was received by the terminal.

31. A security terminal in accordance with claim 30 wherein said alarm code signal developing means develops one of a plurality of predetermined alarm code signals representative of respective alarm conditions.

32. A security terminal in accordance with claim 31 further including means for developing supervisory trouble code signals representative of respective trouble states of the security terminal, said control means being further operative in response to the recognition of said respective address to transmit a developed supervisory trouble code signal to said receiving station means over said link.

33. A security terminal in accordance with claim 32 wherein, if both an alarm code signal and a supervisory trouble code signal have been developed, in response to the recognition of said respective address said control means transmits said alarm code signal over said link.

34. A security terminal in accordance with claim 32 wherein said supervisory trouble code signals represent trouble conditions of a loss of power, a low stand-by battery, and a malfunctioning fire detection loop.

35. A security terminal in accordance with claim 31 wherein said alarm code signals represent fire, medical, burglary and emergency alarm conditions.

36. A security terminal in accordance with claim 30 further including a fire-detection circuit, and wherein said control means is further operative to recognize a fire-detection circuit test control signal, and in response thereto to transmit to said receiving station means over said link a coded signal representative of the condition of said fire-detection circuit.

37. A security terminal in accordance with claim 30 wherein said control means, in response to the recognition of said dialer test control signal, is further operative to transmit over said link to said receiving station means a coded verification signal.

38. A security terminal in accordance with claim 30 further including a keyboard, and wherein said alarm code signal developing means includes means for detecting an intrusion of the premises on which the security terminal is located, and said control means is responsive to the inputting on said keyboard of a master code for selectively enabling and disabling the operation of said intrusion detecting means.

39. A security terminal in accordance with claim 38 wherein said control means is responsive to the inputting on said keyboard of said master code, a function code and an alternate code for thereafter allowing the inputting of said alternate code to selectively enable and disable the operation of said intrusion detecting means.

40. A security terminal in accordance with claim 39 wherein said control means is responsive to the inputting on said keyboard of said master code and a release code for thereafter preventing the inputting of said alternate code from selectively enabling and disabling the operation of said intrusion detecting means.

41. A security terminal in accordance with claim 40 wherein said release code consists of said function code and said master code.

42. A security terminal in accordance with claim 38 wherein the enabling of the operation of said intrusion detecting means is delayed following the inputting on said keyboard of said master code, and said control means is responsive to inputting on said keyboard of said master code, a function code and a time delay for thereafter causing the delay in the operation of said intrusion detecting means to equal the inputted time delay.

43. A security terminal in accordance with claim 42 further including means for sounding a warning signal while the operation of said intrusion detecting means is being delayed.

44. A security terminal in accordance with claim 38 wherein said control means prevents the developing of an alarm code signal if said master code is inputted on said keyboard within a predetermined time interval following the detection of a predetermined intrusion, and said control means is responsive to the inputting on said keyboard of said master code, a function code and a time delay for thereafter causing said predetermined time interval to equal the inputted time delay.

45. A security terminal in accordance with claim 44 further including means for sounding a warning signal during said predetermined time interval following the detection of a predetermined intrusion.

46. A security terminal in accordance with claim 44 further including switch means for controlling development of an alarm code signal immediately upon detection of said predetermined intrusion without waiting for the expiration of said predetermined time interval.

47. A security terminal in accordance with claim 38 further including means for sounding an alarm for a predetermined time interval responsive to the detection of an intrusion by said intrusion detecting means, and wherein said control means is responsive to the inputting on said keyboard of said master code, a function code and a time value for thereafter causing said predetermined time interval to equal the inputted time value.

48. A security terminal in accordance with claim 47 wherein said control means is operative to stop the sounding of said alarm during said predetermined time interval responsive to the inputting on said keyboard of said master code.

49. A security terminal in accordance with claim 47 wherein said control means is operative to stop the sounding of said alarm during said predetermined time interval responsive to receipt over said link of a special coded signal.

50. A security terminal in accordance with claim 38 further including means for sounding an alarm responsive to the detection of an intrusion by said intrusion detecting means, and switch test means for controlling the sounding of said alarm without allowing said alarm code signal to be developed.

51. A security terminal in accordance with claim 38 further including means for providing a short audible verification responsive to each operation of a key on said keyboard.

52. A security terminal in accordance with claim 38 further including an audible alarm, and wherein said alarm code signal developing means includes means for detecting a fire in the premises on which the security terminal is located, and said control means is responsive to the detection of a fire for sounding said audible alarm and is responsive to the inputting on said keyboard of said master code for shutting off said audible alarm.

53. A security terminal in accordance with claim 38 wherein the enabling of the operation of said intrusion detecting means is delayed following the inputting on said keyboard of said master code, and further including means for sounding a warning signal while the operation of said intrusion detecting means is being delayed.

54. A security terminal in accordance with claim 38 wherein said control means prevents the developing of an alarm code signal if said master code is inputted on said keyboard within a predetermined time interval following the detection of a predetermined intrusion, and further including means for sounding a warning signal during said predetermined time interval folowing the detection of said predetermined intrusion.

55. A secuirty terminal in accordance with claim 54 further including switch means for controlling development of an alarm code signal immediately upon detection of said predetermined intrusion without waiting for the expiration of said predetermined time interval.

56. A security terminal in accordance with claim 38 further including means for sounding an alarm for a predetermined time interval responsive to the detection of an intrusion by said intrusion detecting means, and wherein said control means is operative to stop the sounding of said alarm during said predetermined time interval responsive to the inputting on said keyboard of said master code.

57. A security terminal in accordance with claim 56 wherein said control means is operative to stop the sounding of said alarm during said predetermined time interval responsive to receipt over said link of a special coded signal.

58. A security terminal for use with a two-way interactive communications system and a switched telephone network; said communications system having station means for transmitting coded signals over a communications link to control communications with interactive television terminals on the premises of respective subscribers, and station means for receiving response signals over said communications link from said television terminals; said security terminal comprising means for developing an alarm code signal;
control means connected to said communications link for recognizing station-means-transmitted coded signals representative of a respective address and in response thereto for transmitting said alarm code signal over said link to said receiving station means;
telephone dialer means connected to a telephone line in said switched telephone network; and
means responsive to a failure in the transmission of said alarm code signal over said link for causing said telephone dialer means to dial a predetermined telephone number, and for outputting on said telephone line a signal identifying the security terminal and a signal representative of said alarm code signal.

59. A security terminal in accordance with claim 58 wherein said control means is further operative to recognize a station-means-transmitted dialer test control signal on said link, and in response thereto to cause said telephone dialer means to dial said predetermined telephone number and to output on said telephone line a signal identifying the security terminal.

60. A security terminal in accordance with claim 59 wherein said control means, in response to the recognition of said dialer test control signal, is further operative to transmit over said link to said receiving station means a coded verification signal.

61. A security terminal in accordance with claim 58 wherein said alarm code signal developing means develops one of a plurality of predetermined alarm code signals representative of respective alarm conditions.

62. A security terminal in accordance with claim 61 further including means for developing supervisory trouble code signals representative of respective trouble states of the security terminal, said control means being further operative in response to the recognition of said respective address to transmit a developed supervisory trouble code signal to said receiving station means over said link.

63. A security terminal in accordance with claim 62 wherein, if both an alarm code signal and a supervisory trouble code signal have been developed, in response to the recognition of said respective address said control means transmits said alarm code signal over said link.

64. A security terminal in accordance with claim 62 wherein said supervisory trouble code signals represent trouble conditions of a loss of power, a low stand-by battery, and a malfunctioning fire detection loop.

65. A security terminal in accordance with claim 61 wherein said alarm code signals represent fire, medical, burglary and emergency alarm conditions.

66. A security terminal in accordance with claim 58 further including a fire-detection circuit, and wherein said control means is further operative to recognize a fire-detection circuit test control signal, and in response thereto to transmit to said receiving station means over said link a coded signal representative of the condition of said fire-detection circuit.

67. A security terminal in accordance with claim 58 further including a keyboard, and wherein said alarm code signal developing means includes means for detecting an intrusion of the premises on which the security terminal is located, and said control means is responsive to the inputting on said keyboard of a master code for selectively enabling and disabling the operation of said intrusion detecting means.

68. A security terminal in accordance with claim 67 wherein said control means is responsive to the inputting on said keyboard of said master code, a function code and an alternate code for thereafter allowing the inputting of said alternate code to selectively enable and disable the operation of said intrusion detecting means.

69. A security terminal in accordance with claim 68 wherein said control means is responsive to the inputting on said keyboard of said master code and a release code for thereafter preventing the inputting of said alternate code from selectively enabling and disabling the operation of said intrusion detecting means.

70. A security terminal in accordance with claim 69 wherein said release code consists of said function code and said master code.

71. A security terminal in accordance with claim 67 wherein the enabling of the operation of said intrusion detecting means is delayed following the inputting on said keyboard of said master code, and said control means is responsive to the inputting on said keyboard of said master code, a function code and a time delay for thereafter causing the delay in the operation of said intrusion detecting means to equal the inputted time delay.

72. A security terminal in accordance with claim 71 further including means for sounding a warning signal while the operation of said intrusion detecting means is being delayed.

73. A security terminal in accordance with claim 67 wherein said control means prevents the developing of an alarm code signal if said master code is inputted on said keyboard within a predetermined time interval following the detection of a predetermined intrusion, and said control means is responsive to the inputting on said keyboard of said master code, a function code and a time delay for thereafter causing said predetermined time interval to equal the inputted time delay.

74. A security terminal in accordance with claim 73 further including means for sounding a warning signal during said predetermined time interval following the detection of a predetermined intrusion.

75. A security terminal in accordance with claim 73 further including switch means for controlling development of an alarm code signal immediately upon detection of said predetermined intrusion without waiting for the expiration of said predetermined time interval.

76. A security terminal in accordance with claim 67 further including means for sounding an alarm for a predetermined time interval responsive to the detection of an intrusion by said intrusion detecting means, and wherein said control means is responsive to the inputting on said keyboard of said master code, a function code and a time value for thereafter causing said predetermined time interval to equal the inputted time value.

77. A security terminal in accordance with claim 76 wherein said control means is operative to stop the sounding of said alarm during said predetermined time interval responsive to the inputting on said keyboard of said master code.

78. A security terminal in accordance with claim 76 wherein said control means is operative to stop the sounding of said alarm during said predetermined time interval responsive to receipt over said link of a special coded signal.

79. A security terminal in accordance with claim 67 further including means for sounding an alarm responsive to the detection of an intrusion by said intrusion detecting means, and switch test means for controlling the sounding of said alarm without allowing said alarm code signal to be developed.

80. A security terminal in accordance with claim 67 further including means for providing a short audible verification responsive to each operation of a key on said keyboard.

81. A security terminal in accordance with claim 67 further including an audible alarm, and wherein said alarm code signal developing means includes means for detecting a fire in the premises on which the security terminal is located, and said control means is responsive to the detection of a fire for sounding said audible alarm and is responsive to the inputting on said keyboard of said master code for shutting off said audible alarm.

82. A security terminal in accordance with claim 67 wherein the enabling of the operation of said intrusion detecting means is delayed following the inputting on said keyboard of said master code, and means for sounding a warning signal while the operation of said intrusion detecting means is being delayed.

83. A security terminal in accordance with claim 67 wherein said control means prevents the developing of an alarm code signal if said master code is inputted on said keyboard within a predetermined time interval following the detection of a predetermined intrusion, and further including means for sounding a warning signal during said predetermined time interval following the detection of said predetermined intrusion.

84. A security terminal in accordance with claim 83 further including switch means for controlling development of an alarm code signal immediately upon detection of said predetermined intrusion without waiting for the expiration of said predetermined time interval.

85. A security terminal in accordance with claim 67 further including means for sounding an alarm for a predetermined time interval responsive to the detection of an intrusion by said intrusion detecting means, and wherein said control means is operative to stop the sounding of said alarm during said predetermined time interval responsive to the inputting on said keyboard of said master code.

86. A security terminal in accordance with claim 85 wherein said control means is operative to stop the sounding of said alarm during said predetermined time interval responsive to receipt over said link of a special coded signal.

* * * * *